(12) United States Patent
Atarius et al.

(10) Patent No.: US 11,683,858 B2
(45) Date of Patent: *Jun. 20, 2023

(54) ESTABLISHING AN IP MULTIMEDIA SUBSYSTEM SESSION

(71) Applicant: Lenovo (Singapore) PTE. LTD., New Tech Park (SG)

(72) Inventors: Roozbeh Atarius, La Jolla, CA (US); Genadi Velev, Darmstadt (DE); Dimitrios Karampatsis, Ruislip (GB); Andreas Kunz, Ladenburg (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/374,635

(22) Filed: Jul. 13, 2021

(65) Prior Publication Data
US 2021/0345450 A1 Nov. 4, 2021

Related U.S. Application Data

(63) Continuation of application No. 16/376,964, filed on Apr. 5, 2019, now Pat. No. 11,096,242.
(Continued)

(51) Int. Cl.
*H04W 80/10* (2009.01)
*H04W 76/11* (2018.01)
(Continued)

(52) U.S. Cl.
CPC ......... *H04W 80/10* (2013.01); *H04L 65/1104* (2022.05); *H04M 15/66* (2013.01);
(Continued)

(58) Field of Classification Search
CPC ......... H04W 4/08; H04W 8/08; H04W 76/11; H04W 80/10; H04L 64/1006; H04M 15/66
See application file for complete search history.

(56) References Cited

U.S. PATENT DOCUMENTS

2008/0069086 A1 3/2008 Shin et al.
2010/0290392 A1 11/2010 Rasanen et al.
(Continued)

FOREIGN PATENT DOCUMENTS

CN 103069877 A 4/2013

OTHER PUBLICATIONS

3GPP, 3rd Generation Partnership Project; Technical Specification Group Core Network and Terminals; 5G System; Policy Authorization Service; Stage 3 (Release 15), 3GPP TS 29.514 V0.3.0, Mar. 2018, pp. 1-37.
(Continued)

*Primary Examiner* — Brian P Cox
(74) *Attorney, Agent, or Firm* — Kunzler Bean & Adamson

(57) ABSTRACT

Apparatuses, methods, and systems are disclosed for establishing an IP multimedia subsystem session. One method includes receiving, at a first network entity from a user device, a first session initiation protocol message comprising a session description protocol, wherein the first session initiation protocol message is used to establish an internet protocol multimedia subsystem session for an application. The method includes transmitting, from the first network entity to a second network entity, a first message comprising an internet protocol address and an identifier for the application. The method includes receiving, at the first network entity from the second network entity, a status of a radio access technology of the user device, wherein the status of the radio access technology of the user device is received by the second network entity from a third network entity.

20 Claims, 18 Drawing Sheets

Related U.S. Application Data

(60) Provisional application No. 62/664,929, filed on Apr. 30, 2018, provisional application No. 62/653,478, filed on Apr. 5, 2018.

(51) Int. Cl.
  *H04M 15/00* (2006.01)
  *H04W 4/08* (2009.01)
  *H04W 8/08* (2009.01)
  *H04L 65/1104* (2022.01)

(52) U.S. Cl.
  CPC .............. *H04W 4/08* (2013.01); *H04W 8/08* (2013.01); *H04W 76/11* (2018.02)

(56) References Cited

U.S. PATENT DOCUMENTS

| | | |
|---|---|---|
| 2013/0297744 A1 | 11/2013 | Foti |
| 2016/0007320 A1 | 1/2016 | Wang et al. |
| 2017/0034767 A1 | 2/2017 | Griot et al. |
| 2017/0339740 A1 | 11/2017 | Abichandani et al. |
| 2019/0306202 A1 | 10/2019 | Sinha et al. |
| 2020/0305211 A1 | 9/2020 | Foti et al. |

OTHER PUBLICATIONS

3GPP, "3rd Generation Partnership Project; Technical Specification Group Core Network and Terminals; 5G System; Session Management Policy Control Service; Service; Stage 3 (Release 15)", 3GPP TS 29.512 V0.4.0, Mar. 2018, pp. 1-38.

3GPP, "3rd Generation Partnership Project; Technical Specification Group Radio Access Network; NG-RAN; Architecture description (Release 15)", 3GPP TS 38.401 V15.0.0, Dec. 2017, pp. 1-23.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401 V15.3.0, Mar. 2018, pp. 1-405.

3GPP, "3rd Generation Partnership Project; Technical Specification Group Services and System Aspects; Policy and Charging Control Framework for the 5G System; Stage 2 (Release 15)", 3GPP TS 23.503 V15.0.0, Dec. 2017, pp. 1-56.

3GPP, "3rd Generation Partnership Project; Technical Specification Group Core Network and Terminals; Policy and Charging Control over Rx reference point (Release 15)", 3GPP TS 29.214 V15.2 0, Dec. 2017, pp. 1-84.

3GPP, "3rd Generation Partnership Project; Technical Specification Group Services and System Aspects; Procedures for the 5G System; Stage 2 (Release 15)", 3GPP TS 23.502 V15.0 0, Dec. 2017, pp. 1-258.

3GPP, "3rd Generation Partnership Project; Technical Specification Group Services and System Aspects; System Architecture for the 5G System; Stage 2 (Release 15)", 3GPP TS 23.501 V15.1.0, Mar. 2018, pp. 1-201.

Motorola Mobility—Lenovo, "EPS Fallback for an IMS Session Setup", 3GPP TSG CT wG1 Meeting #110 C1-182176, Apr. 16-20, 2018, pp. 1-10.

Motorola Mobility et al., "Support of EPS Fallback for Voice Without Impacting IMS", SA WG2 Meeting #S2-127BIS S2-185409, May 28-Jun. 1, 2018, pp. 1-8.

ESTABLISHING AN IP MULTIMEDIA SUBSYSTEM SESSION

CROSS-REFERENCE TO RELATED APPLICATIONS

This application claims priority to U.S. patent application Ser. No. 16/376,964 filed on Apr. 5, 2019, which claims priority to U.S. Patent Application Ser. No. 62/653,478 entitled "METHOD AND APPARATUS INCLUDING EVOLVED PACKET SYSTEM FALLBACK FOR AN IP MULTIMEDIA SUBSYSTEM SESSION" and filed on Apr. 5, 2018 for Roozbeh Atarius and U.S. Patent Application Ser. No. 62/664,929 entitled "METHODS FOR EPS FALLBACK" and filed on Apr. 30, 2018 for Roozbeh Atarius, all of which are incorporated herein by reference in their entirety.

FIELD

The subject matter disclosed herein relates generally to wireless communications and more particularly relates to establishing an IP multimedia subsystem session.

BACKGROUND

The following abbreviations are herewith defined, at least some of which are referred to within the following description: Third Generation Partnership Project ("3GPP"), $4^{th}$ Generation ("4G"), $5^{th}$ Generation ("5G"), 5G System ("5GS"), Authorization Authentication ("AA"), Authorization Authentication Request ("AAR"), Positive-Acknowledgment ("ACK"), Application Function ("AF"), Aggregation Level ("AL"), Access and Mobility Management Function ("AMF"), Access Network ("AN"), Access Point ("AP"), Authentication Server Function ("AUSF"), Attribute Value Pair ("AVP"), Beam Failure Detection ("BFD"), Binary Phase Shift Keying ("BPSK"), Base Station ("BS"), Buffer Status Report ("BSR"), Bandwidth ("BW"), Bandwidth Part ("BWP"), Cell-Radio Network Temporary Identifier ("C-RNTI"), Carrier Aggregation ("CA"), CA Network ("CAN"), Contention-Based Random Access ("CBRA"), Clear Channel Assessment ("CCA"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Commercial Mobile Alert Service ("CMAS"), Core Network ("CN"), Coordinated Multipoint ("CoMP"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink ("DL"), Demodulation Reference Signal ("DMRS"), Data Radio Bearer ("DRB"), Discontinuous Reception ("DRX"), Downlink Pilot Time Slot ("DwPTS"), Enhanced Clear Channel Assessment ("eCCA"), EPS Connection Management ("ECM"), Enhanced Mobile Broadband ("eMBB"), Evolved Node B ("eNB"), Effective Isotropic Radiated Power ("EIRP"), European Telecommunications Standards Institute ("ETSI"), Earthquake and Tsunami Warning System ("ETWS"), Evolved Packet Core ("EPC"), Evolved Packet System ("EPS"), Evolved Universal Terrestrial Access ("E-UTRA"), Evolved Universal Terrestrial Access Network ("E-UTRAN"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range ("FR"), Guaranteed Bit Rate ("GBR"), 5G Node B or Next Generation Node B ("gNB"), General Packet Radio Services ("GPRS"), Guard Period ("GP"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Identity or Identifier ("ID"), Information Element ("IE"), International Mobile Equipment Identity ("IMEI"), IP Multimedia System ("IMS"), International Mobile Subscriber Identity ("IMSI"), International Mobile Telecommunications ("IMT"), Internet-of-Things ("IoT"), Internet Protocol ("IP"), Layer 2 ("L2"), Licensed Assisted Access ("LAA"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Modulation Coding Scheme ("MCS"), Master Information Block ("MIB"), Multiple Input Multiple Output ("MIMO"), Mobility Management ("MM"), Mobility Management Entity ("MIME"), Multimedia Telephony ("MMTEL"), Mobile Network Operator ("MNO"), massive MTC ("mMTC"), Maximum Power Reduction ("MPR"), Multimedia Priority Service ("MPS"), Machine Type Communication ("MTC"), Multi User Shared Access ("MUSA"), Inter-CN Interface Between a 4G MME and a 5GS AMF ("N26"), Non Access Stratum ("NAS"), Narrowband ("NB"), Negative-Acknowledgment ("NACK") or ("NAK"), Network Entity ("NE"), Network Function ("NF"), Next Generation RAN ("NG-RAN"), Non-Orthogonal Multiple Access ("NOMA"), New Radio ("NR"), Network Repository Function ("NRF"), Network Slice Instance ("NSI"), Network Slice Selection Assistance Information ("NSSAI"), Network Slice Selection Function ("NS SF"), Network Slice Selection Policy ("NSSP"), Operation and Maintenance System ("OAM"), Orthogonal Cover Codes ("OCC"), Orthogonal Frequency Division Multiplexing ("OFDM"), Open-Loop ("OL"), Other System Information ("OSI"), Paging-Radio Network Temporary Identifier ("P-RNTI"), P-Access-Network-Info ("PANI"), Power Angular Spectrum ("PAS"), Physical Broadcast Channel ("PBCH"), Power Control ("PC"), LTE-to-V2X Interface ("PC5"), Primary Cell ("PCell"), Policy Control Function (""PCF"), Physical Cell ID ("PCID"), Policy and Charging Rules Function ("PCRF"), Proxy-Call Session Control Function ("P-CSCF"), Physical Downlink Control Channel ("PDCCH"), Packet Data Convergence Protocol ("PDCP"), Physical Downlink Shared Channel ("PDSCH"), Pattern Division Multiple Access ("PDMA"), Packet Data Unit ("PDU"), Packet Data Network Gateway ("PGW"), Packet Data Network Gateway-Control ("PGW-C"), Packet Data Network Gateway-User ("PGW-U"), Physical Hybrid ARQ Indicator Channel ("PHICH"), Power Headroom ("PH"), Power Headroom Report ("PHR"), Physical Layer ("PHY"), Public Land Mobile Network ("PLMN"), Physical Random Access Channel ("PRACH"), Provisional Response Acknowledgement ("PRACK"), Physical Resource Block ("PRB"), Primary Secondary Cell ("PSCell"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Random Access-Radio Network Temporary Identifier ("RA-RNTI"), Registration Area ("RA"), Radio Access Network ("RAN"), Radio Access Technology ("RAT"), Random Access Procedure ("RACH"), Random Access Response ("RAR"), Resource Element Group ("REG"), Radio Frequency ("RF"), Radio Link Control ("RLC"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Round Trip Time ("RTT"), Receive ("RX"), System Information-Radio Network Temporary Identifier ("SI-RNTI"), Serving-Call Session Control Function ("S-CSCF"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Session Description Protocol ("SDP"), Service Data Unit ("SDU"), Serving Gateway ("SGW"), System Information ("SI"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Session Initiation Protocol ("SIP"), Service Level Agreement ("SLA"), Session Management ("SM"), Session Management Function ("SMF"), Special Cell ("SpCell"), Single Network Slice Selection Assistance Information ("S-NSSAI"), Shortened TTI ("sTTI"), Synchronization Signal ("SS"), Synchronization Signal Block ("SSB"), Supplementary Uplink ("SUL"), Subscriber Permanent Identifier ("SUPI"), Temporary Cell-Radio Network Temporary Identifier ("TC-RNTI"), Tracking Area ("TA"), TA Indicator ("TAI"), TA Update ("TAU"), Transport Block ("TB"), Transport Block Size ("TBS"), Time-Division Duplex ("TDD"), Time Division Multiplex ("TDM"), Time Division Orthogonal Cover Code ("TD-OCC"), Tunnel Endpoint Identifier ("TEID"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane ("UP"), User Plane Function ("UPF"), Uplink Pilot Time Slot ("UpPTS"), Ultra-reliability and Low-latency Communications ("URLLC"), UE Route Selection Policy ("URSP"), LTE Radio Interface ("Uu"), Vehicle-To-Everything ("V2X"), Visiting AMF ("vAMF"), Visiting NSSF ("vNSSF"), Visiting PLMN ("VPLMN"), Interconnecting Interface ("X2") ("Xn"), and Worldwide Interoperability for Microwave Access ("WiMAX").

In certain wireless communications networks, EPS fallback may be used. In such networks, EPS fallback may not be configured for optimal performance.

BRIEF SUMMARY

Methods for establishing an IP multimedia subsystem session are disclosed. Apparatuses and systems also perform the functions of the apparatus. One embodiment of a method includes receiving, at a first network entity from a user device, a first session initiation protocol message comprising a session description protocol, wherein the first session initiation protocol message is used to establish an internet protocol multimedia subsystem session for an application. In certain embodiments, the method includes transmitting, from the first network entity to a second network entity, a first message comprising an internet protocol address and an identifier for the application. In various embodiments, the method includes receiving, at the first network entity from the second network entity, a status of a radio access technology of the user device, wherein the status of the radio access technology of the user device is received by the second network entity from a third network entity.

One apparatus for establishing an IP multimedia subsystem session includes a receiver that receives, at the first network entity from a user device, a first session initiation protocol message comprising a session description protocol, wherein the first session initiation protocol message is used to establish an internet protocol multimedia subsystem session for an application. In some embodiments, the apparatus includes a transmitter that transmits, from the first network entity to a second network entity, a first message comprising an internet protocol address and an identifier for the application. In various embodiments, the receiver receives, at the first network entity from the second network entity, a status of a radio access technology of the user device, wherein the status of the radio access technology of the user device is received by the second network entity from a third network entity.

One method for establishing an IP multimedia subsystem session includes transmitting, from a user device to a first network entity, a first session initiation protocol message comprising a session description protocol, wherein the first session initiation protocol message is used to establish an internet protocol multimedia subsystem session. In various embodiments, the method includes receiving, at the user device from the first network entity, a second session initiation protocol message based at least partly on a status of a radio access technology of the user device, wherein the first network entity receives the status of the radio access technology of the user device from a second network entity, and the second network entity receives the status of the radio access technology of the user device from a third network entity.

One apparatus for establishing an IP multimedia subsystem session includes a transmitter that transmits, from a user device to a first network entity, a first session initiation protocol message comprising a session description protocol, wherein the first session initiation protocol message is used to establish an internet protocol multimedia subsystem session. In some embodiments, the apparatus includes a receiver that receives, at the user device from the first network entity, a second session initiation protocol message based at least partly on a status of a radio access technology of the user device, wherein the first network entity receives the status of the radio access technology of the user device from a second network entity, and the second network entity receives the status of the radio access technology of the user device from a third network entity.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
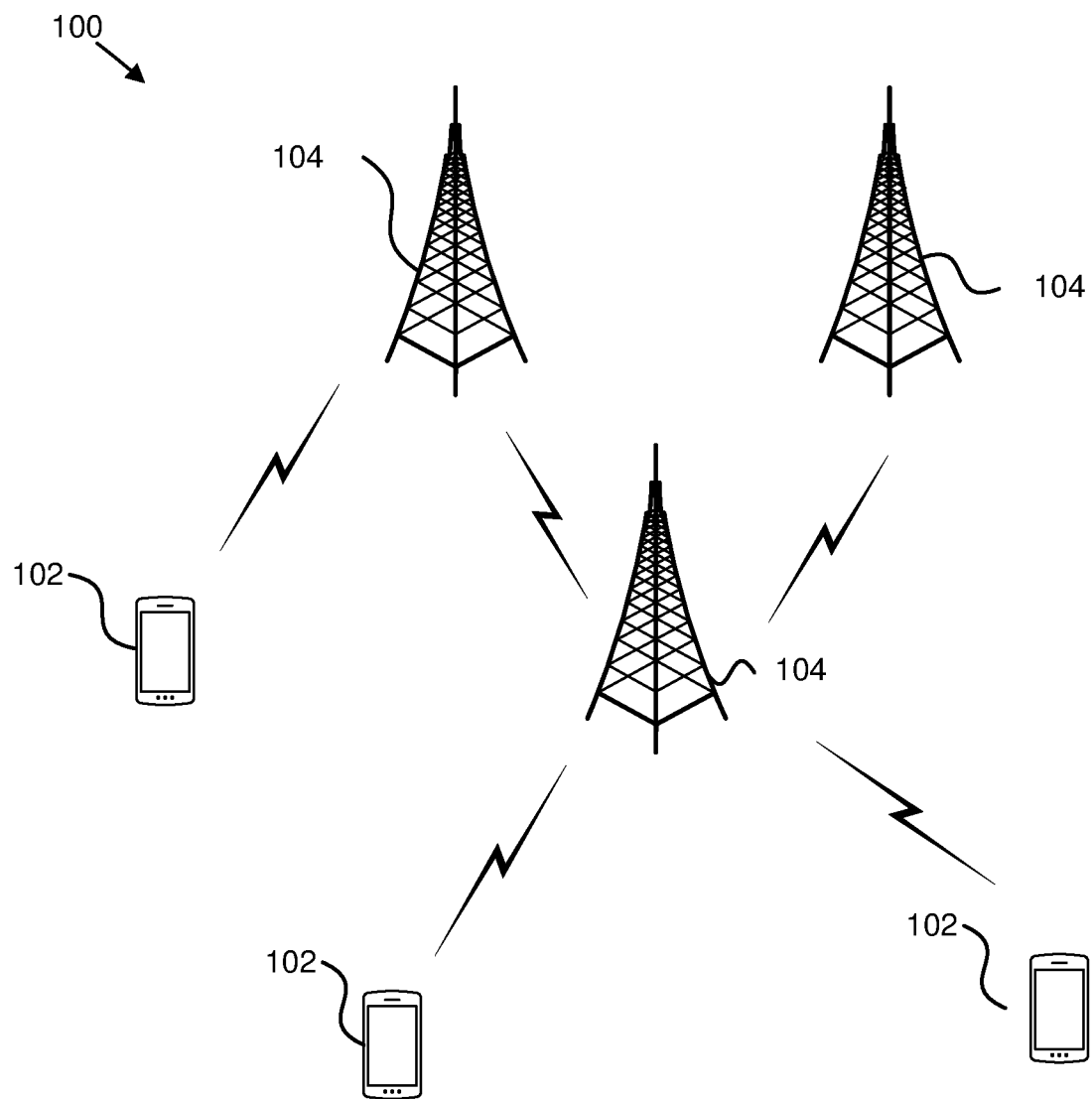
FIG. 1 is a schematic block diagram illustrating one embodiment of a wireless communication system for establishing an IP multimedia subsystem session.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for establishing an IP multimedia subsystem session. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a network unit 104 may receive, at a first network entity from a user device, a first session initiation protocol message comprising a session description protocol, wherein the first session initiation protocol message is used to establish an internet protocol multimedia subsystem session for an application. In certain embodiments, the network unit 104 may transmit, from the first network entity to a second network entity, a first message comprising an internet protocol address and an identifier for the application. In various embodiments, the network unit 104 may receive, at the first network entity from the second network entity, a status of a radio access technology of the user device, wherein the status of the radio access technology of the user device is received by the second network entity from a third network entity. Accordingly, the remote unit 102 may be used for establishing an IP multimedia subsystem session.

In certain embodiments, a remote unit 102 may transmit, from a user device to a first network entity, a first session initiation protocol message comprising a session description protocol, wherein the first session initiation protocol message is used to establish an internet protocol multimedia subsystem session. In various embodiments, the remote unit 102 may receive, at the user device from the first network entity, a second session initiation protocol message based at least partly on a status of a radio access technology of the user device, wherein the first network entity receives the status of the radio access technology of the user device from a second network entity, and the second network entity receives the status of the radio access technology of the user device from a third network entity. Accordingly, the remote unit 102 may be used for establishing an IP multimedia subsystem session.

Figure 2:
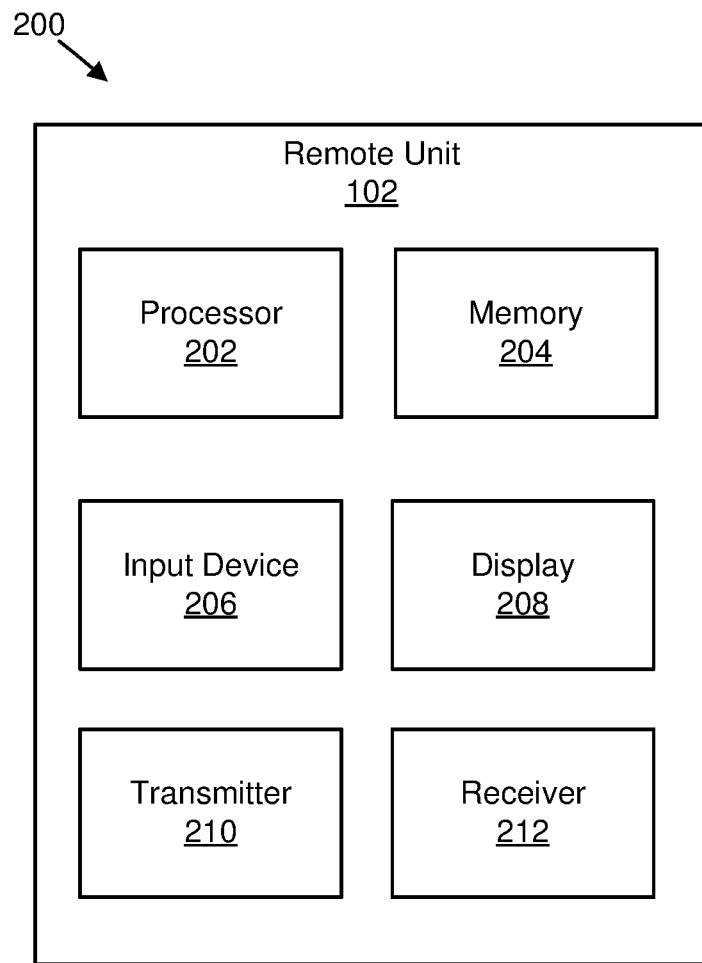
FIG. 2 is a schematic block diagram illustrating one embodiment of an apparatus that may be used for establishing an IP multimedia subsystem session.

FIG. 2 depicts one embodiment of an apparatus 200 that may be used for establishing an IP multimedia subsystem session. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In various embodiments, the transmitter 210 transmits, from a user device to a first network entity, a first session initiation protocol message comprising a session description protocol, wherein the first session initiation protocol message is used to establish an internet protocol multimedia subsystem session. In some embodiments, the receiver 212 receives, at the user device from the first network entity, a second session initiation protocol message based at least partly on a status of a radio access technology of the user device, wherein the first network entity receives the status of the radio access technology of the user device from a second network entity, and the second network entity receives the status of the radio access technology of the user device from a third network entity.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
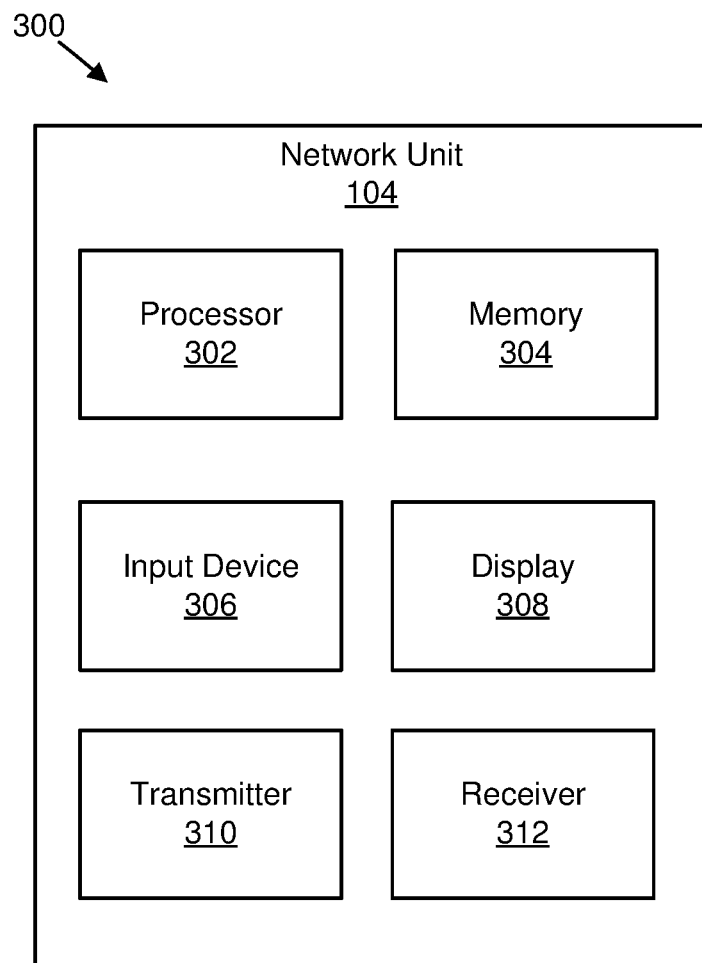
FIG. 3 is a schematic block diagram illustrating one embodiment of an apparatus that may be used for establishing an IP multimedia subsystem session.

FIG. 3 depicts one embodiment of an apparatus 300 that may be used for establishing an IP multimedia subsystem session. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the receiver 312 receives, at the first network entity from a user device, a first session initiation protocol message comprising a session description protocol, wherein the first session initiation protocol message is used to establish an internet protocol multimedia subsystem session for an application. In some embodiments, the transmitter 310 transmits, from the first network entity to a second network entity, a first message comprising an internet protocol address and an identifier for the application. In various embodiments, the receiver 312 receives, at the first network entity from the second network entity, a status of a radio access technology of the user device, wherein the status of the radio access technology of the user device is received by the second network entity from a third network entity.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain embodiments, such as EPS fallback for voice, an operator may determine to redirect a UE to EPS instead of using an inter-RAT handover.

In some embodiments, a RAN (e.g., NG-RAN) may reject a PDU session modification that sets up a QoS flow for media, such as voice. If the RAN does not reject the QoS flow, the RAN may wait for QoS flow establishment to be completed before initiating a release and/or handover. In various embodiments, a modification may be made for an established QoS flow (e.g., due to a forked call) that may need to be handled (or rejected) in 5GS before a UE is moved to EPS. In certain embodiments, a QoS flow establishment request on 5GS may need to be rejected if a mobility procedure is ongoing.

In some embodiments, a RAN may reject an IMS voice session to trigger a core network to redirect an IMS MINI-TEL session to an EPS. As may be appreciated, such a fallback from 5GS to EPS may happen at the time of IMS voice session setup and at the time at which a P-CSCF allocates core network QoS flows that may be mapped to RAN bearers by a gNB. In some configurations, there may be no direct communications between the RAN and the IMS core and, therefore, if a fallback does not occur within an exchange in the IMS session setup, some IMS signaling may be lost. As may be appreciated, the likelihood of losing IMS signaling may increase if a 5GS and an EPS are implemented with an AMF and an MME having no direct connection (e.g., N26 interface).

In some embodiments, a UE may support only one registration to either a 5GS network or an EPS (e.g., E-UTRAN) network (e.g., the UE operates in a single registration mode). In various embodiments, a UE is registered to a 5GS and to an IMS network. In various embodiments, such as due to new radio conditions, operator's choice, load balancing, and/or in the presence of a QoS flow for normal voice, a source RAN node may trigger handover to an EPS.

As described in various call flows described herein, a UE may successfully fallback from a 5GS to an EPS. Fallback as described herein may include a handover to EPS, setup of a default EPS bearer, and setup of dedicated bearers for GBR QoS flows in EPS.

In embodiments described herein, network entities such as AF+P-CSCF, PCRF+PCF, PGW-C+SMF, and AMF may subscribe to an event notification of each other. Moreover, the event notification may be used to indicate UE mobility and/or a change of radio access technology. In some embodiments, a model that is used may be based on a network function consumer and a network function provider. The network function consumer subscribes to event notifications of the network function provider and the network function provider notifies the network function consumer about event notifications if any change occurs for corresponding events.

Figure 4:
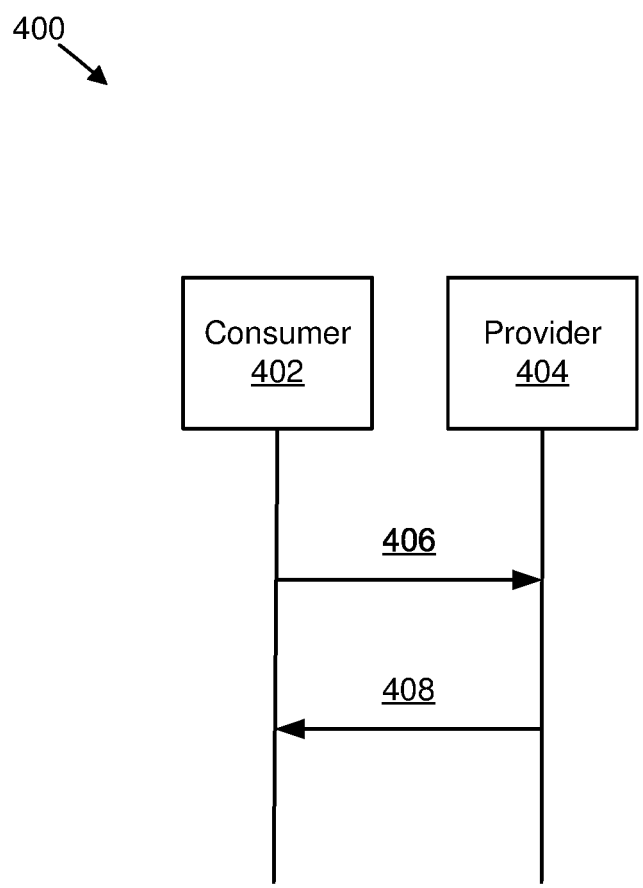
FIG. 4 is a schematic block diagram illustrating one embodiment of a consumer and provider model.

FIG. 4 is a schematic block diagram illustrating one embodiment of a consumer and provider model 400. The consumer and provider model 400 includes a consumer 402 and a provider 404. The consumer 402 transmits 406 a subscribe message to the provider 404, and the provider 404 transmits 408 a notification message to the consumer 402 to notify the consumer 402 about events that the consumer 402 is subscribed to.

For example, the consumer 402 may be an AF+P-CSCF that may subscribe to an event notification of a UE mobility and its change of a radio access technology at an AMF as the provider 404. After a corresponding event occurs, the AMF will notify the AF+P-CSCF about the change of the UE's radio access technology.

Figure 5:
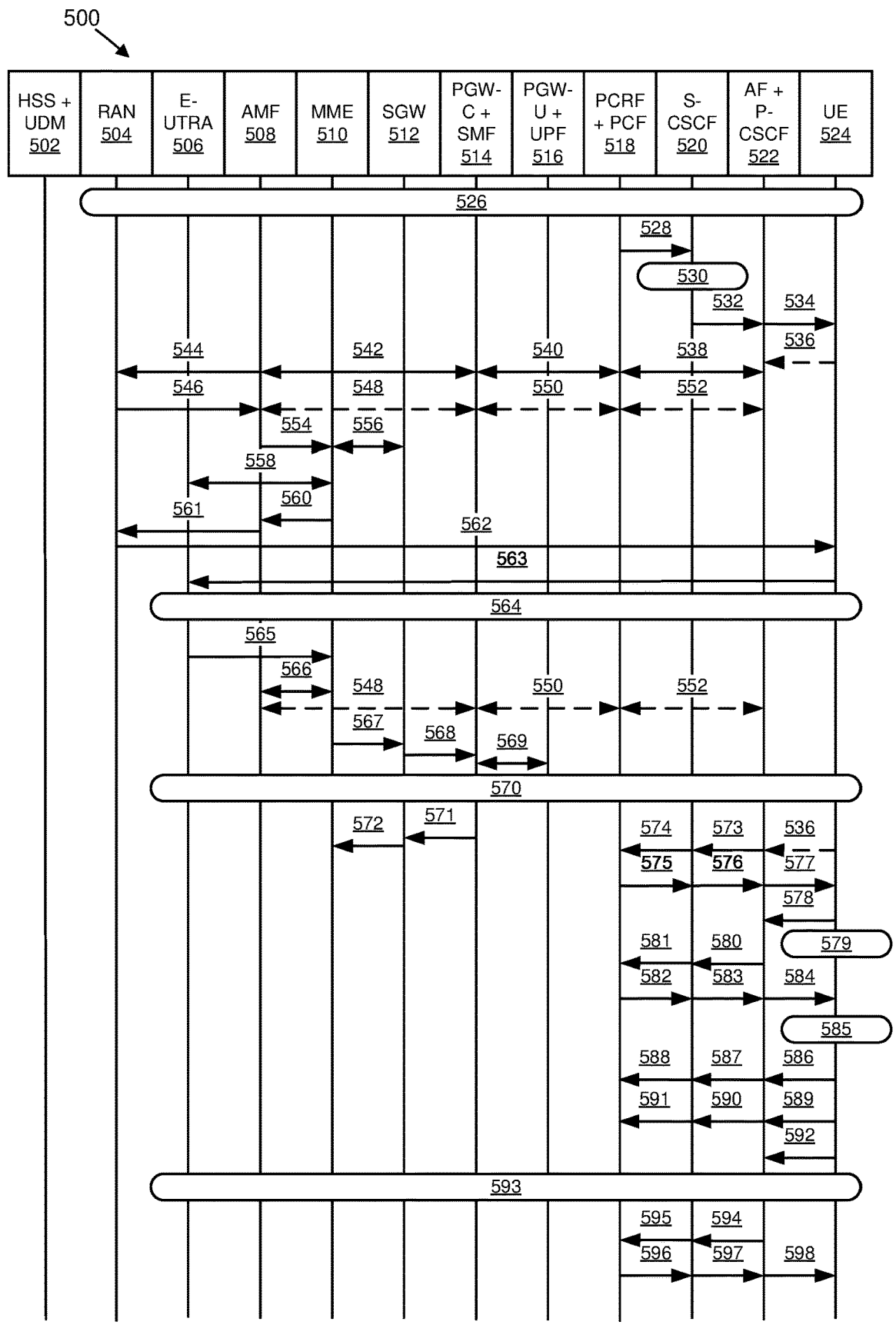
FIG. 5 is a schematic block diagram illustrating one embodiment of communications for EPS fallback with N26 employed and terminating at a UE.

FIG. 5 is a schematic block diagram illustrating one embodiment of communications 500 for EPS fallback with N26 employed and terminating at a UE. The communications 500 illustrated occur between an HSS+UDM 502, a RAN (e.g., NG-RAN) 504, an E-UTRA 506, an AMF 508, an MME 510, an SGW 512, a PGW-C+SMF 514, a PGW-U+UPF 516, a PCRF+PCF 518, a S-CSCF 520, an AF+P-CSCF 522, and a UE 524. As may be appreciated, any of the communications 500 described herein may include one or more messages.

In the embodiment illustrated in relation to FIG. 5, IMS signaling for service setup may be exchanged and in response to the UE 524 preparing to terminate an IMS session setup and a SIP INVITE being forwarded from the S-CSCF 520 towards the UE 524 due to radio conditions, a handover or idle state fallback from the RAN 504 to the E-UTRA 506 may be performed. As may be appreciated, FIG. 5 corresponds to EPS fallback for voice services (e.g., normal voice services) with the UE 524 terminating the IMS voice session setup.

The network may setup 526 a PDU session and QoS flow in 5GS. Moreover, in one embodiment, in a first communication 528 transmitted from the PCRF+PCF 518 to the S-CSCF 520, the PCRF+PCF 518 may send a SIP INVITE request containing an initial SDP offer towards the S-CSCF 520.

The S-CSCF 520 validates 530 the service profile and invokes any termination service logic required for this user. This may include authorization of the requested SDP based on the user's subscription for multi-media services.

In some embodiments, in a second communication 532 transmitted from the S-CSCF 520 to the AF+P-CSCF 522, the S-CSCF 520 remembers (e.g., from the registration procedure) the next hop CSCF for the UE 524 and forwards the invite to the AF+P-CSCF 522 in the visited network.

In certain embodiments, in a third communication 534 transmitted from the AF+P-CSCF 522 to the UE 524, if the AF+P-CSCF 522 determines that the termination is for an MPS session, the AF+P-CSCF 522 derives the session information and invokes dynamic policy sending the derived session information to the PCRF+PCF 518, the AF+P-CSCF 522 remembers (e.g., from the registration procedure) the UE 524 address, and forwards the invite to the UE 524.

In various embodiments, in a fourth communication 536 transmitted from the UE 524 to the AF+P-CSCF 522 at one of two possible times, the UE 524 determines the subset of the media flows proposed by the originating endpoint that it supports, and responds to the AF+P-CSCF 522 with an offer response message back to the originator. The SDP may represent one or more media for a multi-media session.

With steps 538 through 572, the AF+P-CSCF 522 authorizes the resources necessary for this session.

In some embodiments, in a fifth communication 538 transmitted between the AF+P-CSCF 522 and the PCRF+PCF 518, AF+P-CSCF 522 transmits the Npcf_PolicyAuthorization_Create request containing the IP address of the UE 524 and the application identifier towards the PCRF+PCF 518. The AF+P-CSCF 522 will receive the Npcf_PolicyAuthorization_Create reply.

In certain embodiments, in a sixth communication 540 transmitted between the PCRF+PCF 518 and the PGW-C+SMF 514, the PCRF+PCF 518 employs Npcf_SMPolicyControl_UpdateNotify request to provide the PGW-C+SMF 514 (or SMF) the updated session management related policy for the PDU session. The PGW-C+SMF 514 responds by Npcf_SMPolicyControl_UpdateNotify reply upon receipt of the request.

In various embodiments, in a seventh communication 542 transmitted between the PGW-C+SMF 514 and the AMF 508, the PGW-C+SMF 514 employs Nsmf_PDUSession_Update SM Context operation to provide the update to the PDU session identified by a PDU session ID. The update comprises new added QoS flows for the invoked IMS service (e.g., MMTEL).

In some embodiments, in an eighth communication 544 transmitted from the AMF 508 to the RAN 504, the AMF 508 construct PDU_Session_Resource_Modify Request to modify the PDU session, transmits the PDU_Session_Resource_Modify Request to the RAN 504, and adds new QoS flows mapping the invoked IMS service.

In certain embodiments, in a ninth communication 546 transmitted from the RAN 504 to the AMF 508, the RAN 504 decides that the UE 524 should be handed over to the E-UTRAN. The RAN 504 sends a Handover Required (e.g., Target eNB ID, Source to Target Transparent Container) message to the AMF 508 by constructing the PDU_Session_Resoource_Modify Response. The RAN 504 indicates a bearer corresponding to the 5G QoS flows for data forwarding in a Source to Target Transparent Container.

In various embodiments, in a tenth communication 548 transmitted between the AMF 508 and the PGW-C+SMF 514 at one of two possible times, the AMF 508 determines from the Target eNB ID IE that the type of the handover is Handover to E-UTRAN. The AMF 508 selects an MME. The AMF 508 by using Nsmf_PDUSession_Context Request requests the PGW-C+SMF 514 for each PDU session associated with 3GPP access to provide SM Context that also includes the mapped EPS Bearer Contexts. The AMF 508 provides the target MME capabilities to the PGW-C+SMF 514 in the request to allow the PGW-C+SMF 514 to determine whether to include the EPS Bearer context for non-IP PDN Type or not. For PDU Sessions with PDU Sessions Type Ethernet or Unstructured, the PGW-C+SMF 514 provides SM Context for non-IP PDN Type. This step is performed with all PGW-C+SMFs allocated to the UE 524 for each PDU Session of the UE 524. The PGW-C+SMF 514 provides the requested CM Context and sends towards the AMF 508 by using Nsmf_PDUSsesion_Context Response.

In some embodiments, in an eleventh communication 550 transmitted between the PGW-C+SMF 514 and the PCRF+PCF 518 at one of two possible times, the PGW-C+SMF 514 initiates PDU Session Modification towards the PCRF+PCF 518 to obtain the E-UTRAN PCC Rules for the PDU Sessions by invoking Nsmf_EventExposure_Notify request and providing the event that generates the notification and the event information. A type of the event is changed in the type of Access Type. Upon receipt, the PCRF+PCF 518 responds by sending Nsmf_EventExposure_Notify reply.

In certain embodiments, in a twelfth communication 552 transmitted between the PCRF+PCF 518 and the AF+P-CSCF 522 at one of two possible times, the AF+P-CSCF 522 may subscribe to the radio access type change by employing Npcf_PolicyAuthorization_Subscribe service. The subscription may also be based on the communication system change, any system change or any change that may occur so the UE 524 is unreachable. The PCRF+PCF 518 notifies PDU Session Modification by invoking Npcf_PolicyAuthorization_Notify request to the AF+P-CSCF 522. Upon receipt, the AF+P-CSCF 522 responds by sending Npcf_PolicyAuthorization_Notify reply. From the time the AF+P-CSCF 522 initiates authorization of the necessary resources for the PDU session until the time the AF+P-CSCF 522 receives the need for change of access technology, the AF+P-CSCF 522 may maintain a timer (e.g., timer 1). During this timer the AF+P-CSCF 522 may delay forwarding the Offer Response message it had received in step 536 (first instance that includes SIP 183 session in progress). The AF+P-CSCF 522 may also insert an indication in SIP 183 session in progress for the S-CSCF 520 regarding the need for the terminating UE 524 to change of the access technology. The value for timer 1 may be configured and may be different for different implementations. If timer 1 is exhausted and the AF+P-CSCF 522 has not been notified about any radio access and system changes or any unreachability of the terminating UE 524, the AF+P-CSCF 522 may assume there was no change and interruption in the PDU session modification and/or IMS session establishment. In order to avoid generalizing this delay, the AF+P-CSCF 522 invokes this procedure when the P-Access-Network-Info header field indicates 5G access technology in combination with other header fields showing the MINITEL service is requested.

In various embodiments, in a thirteenth communication 554 transmitted from the AMF 508 to the MME 510, the AMF 508 sends towards the MME 510 a Forward Relocation Request (e.g., Target E-UTRAN Node ID, Source to Target Transparent Container, mapped MM context (including EPS security context mapped from 5G security context (default and dedicated GBR bearers), Direct Forwarding Flag, UE Usage Type) message. The SGW address and TEID for both the control plane or EPS bearers in the message are such that target MME selects a new SWG. The AMF 508 includes Direct Forwarding Flag to inform the target MME 510 of the applicability of indirect data forwarding.

In some embodiments, in a fourteenth communication 556 transmitted between the MME 510 and the SGW 512, the MME 510 selects the SGW 512 and sends a Create Session Request message for each PDN connection to the SGW 512. The SGW 512 allocates its local resources and returns them in a Create Session Response message to the MME 510.

In certain embodiments, in a fifteenth communication 558 transmitted between the MME 510 and the E-UTRA 506, the MME 510 requests the E-UTRA 506 (e.g., the target eNB) to establish bearers by sending the Handover request message which also contains a list of EPS bearer IDs that are to be setup and the last used 5GS PLMN ID. If the last used 5GS PLMN ID is not in the equivalent PLMNs list, the MME 510 adds the last used 5GS PLMN ID into it and stores the last 5GS PLMN ID in the UE's 524 MM context. The E-UTRA 506 allocates the resources and returns the applicable parameters to the target MME 510 message Handover Request Acknowledge (e.g., Target to Source Transparent Container, EPS Bearer setup list, EPS Bearer field to setup list). The EPS Bearer Setup list includes a list of addresses and TEIDs allocated at the E-UTRA 506 for downlink traffic on S1-U reference point (one TEID per bearer) and addresses and TEIDs for receiving forwarded data if necessary. The E-UTRA 506 stores the last used 5GS PLMN ID in the UE 524 context and sends to E-UTRA 506 during intra-E-UTRAN handover procedure. The E-UTRA 506 also uses the last used 5GS PLMN ID to re-route the UE 524 back to the last used 5GS PLMN by selecting the suitable dedicated target frequency list (for idle mode mobility) or target cell (for connected mode mobility) according to operator's configuration.

In various embodiments, in a sixteenth communication 560 transmitted from the MME 510 to the AMF 508, in a response to the message Relocation Request from the AMF 508, the MME 510 sends the message Relocation Response (e.g., Cause, List of Set Up RABs, EPS Bearers setup list, MME Tunnel Endpoint Identifier for Control Plane, RAN Cause, MME Address for Control Plane, Target to Source Transparent Container, Address(es) and TEID(s) for Data Forwarding) towards AMF 508.

In some embodiments, in a seventeenth communication 561 transmitted from the AMF 508 to the RAN 504, the AMF 508 sends the HO Command to the RAN 504 (e.g., source NG-RAN).

In certain embodiments, in an eighteenth communication 562 transmitted from the RAN 504 to the UE 524, the RAN 504 commands the UE 524 to handover to the target access network by sending the HO Command (e.g., Transparent container (radio aspect parameters that the target eNB has set-up in the preparation phase), CN tunnel info for data forwarding per PDU Session, QoS flows for Data Forwarding).

In various embodiments, in a nineteenth communication 563 transmitted from the UE 524 to the E-UTRA 506, the UE 524 correlates the ongoing QoS flows with the indicated EPS Bearer IDs to be setup in the HO command. The UE 524 locally deletes the PDU Session if the QoS flow of the default QoS rule in the PDU Session does not have an EPS Bearer ID assigned. For the remaining PDU Sessions, the UE 524 locally deletes the QoS flows that do not have an EPS bearer ID assigned. The UE 524 deletes any UE derived QoS rules. The EPS Bearer ID that was assigned for the QoS flow of the default QoS rule in the PDU Session becomes the EPS Bearer ID of the default bearer in the corresponding PDN connection. For the QoS Flows indicated in the "QoS Flows for Data Forwarding," the RAN 504 initiates data forwarding via to the PGW-U+UPF 516 based on the CN Tunnel Info for Data Forwarding per PDU Session. Then the PGW-U+UPF 516 maps data received from the data forwarding tunnels in the 5GS to the data forwarding tunnels in EPS, and sends the data to the E-UTRA 506 via the SGW 512.

Data may be transmitted 564 between the E-UTRA 506, the AMF 508, the MME 510, the SGW 512, the PGW-C+SMF 514, the PGW-U+UPF 516, the PCRF+PCF 518, the S-CSCF 520, the AF+P-CSCF 522, and the UE 524 in the EPS.

In some embodiments, in a twentieth communication 565 transmitted from the E-UTRA 506 and the MME 510, when the UE 524 has successfully accessed the E-UTRA 506 (e.g., target eNB), the E-UTRA 506 informs the MME 510 (e.g., target MME) by sending the message Handover Notify.

In certain embodiments, in a twenty-first communication 566 transmitted between the MME 510 and the AMF 508, then the MME 510 knows that the UE 524 has arrived to the target side and MME 510 informs the AMF 508 by sending the Relocation Complete Notification message. The AMF 508 acknowledges the MME 510 with a Relocation Complete Ack message. A timer in AMF 508 may be started to supervise when resources in the RAN 504 and PGW-C+SMF 514 shall be released.

In various embodiments, in a twenty-second communication 567 transmitted from the MME 510 to the SGW 512, the MME 510 informs the SGW 512 that the MME 510 is responsible for all the bearers the UE 524 has established by sending the Modify Bearer Request message for each PDN connection. The MME 510 releases the non-accepted EPS Bearer contexts by triggering the Bearer Context deactivation procedure.

In some embodiments, in a twenty-third communication 568 transmitted from the SGW 512 to the PGW-C+SMF 514, the SGW 512 informs the PGW-C+SMF 514 of the relocation by sending the Modify Bearer Request message for each PDN connection.

In certain embodiments, in a twenty-fourth communication 569 transmitted between the PGW-C+SMF 514 and the PGW-U+UPF 516, the PGW-C+SMF 514 locally deletes the PDU Session if the QoS flow of the default QoS rule in the PDU Session does not have an EPS Bearer ID assigned. For the remaining PDU Sessions, the PGW-C+SMF 514 locally deletes the QoS Flows that do not have an EPS bearer ID assigned.

Modified data may be transmitted 570 between the E-UTRA 506, the AMF 508, the MME 510, the SGW 512, the PGW-C+SMF 514, the PGW-U+UPF 516, the PCRF+PCF 518, the S-CSCF 520, the AF+P-CSCF 522, and the UE 524 in the EPS.

In various embodiments, in a twenty-fifth communication 571 transmitted from the PGW-C+SMF 514 to the SGW 512, the PGW-C+SMF 514 acknowledges the Modify Bearer Request. At this stage the User Plane path is established for the default bearer and the dedicated GBR bearers between the UE 524, E-UTRA 506, SGW 512, and the PGW-C+SMF 514. The PGW-C+SMF 514 uses the EPS QoS parameters as assigned for the dedicated EPS GBR bearers during the QoS flow establishment. The PGW-C+SMF 514 maps all the other IP flows to the default EPS bearer.

In some embodiments, in a twenty-sixth communication 572 transmitted from the SGW 512 to the MME 510, the SGW 512 acknowledges the UP switch to the MME 510 via the message Modify Bearer Response.

In certain embodiments, in a twenty-seventh communication 573 transmitted from the AF+P-CSCF 522 to the S-CSCF 520, the AF+P-CSCF 522 forwards the Offer Response message in the SIP 183 session in progress to the S-CSCF 520.

In various embodiments, in a twenty-eighth communication 574 transmitted from the S-CSCF 520 to the PCRF+PCF 518, the S-CSCF 520 forwards the Offer Response message in the SIP 183 session in progress to the PCRF+PCF 518 (e.g., the originator).

In some embodiments, in a twenty-ninth communication 575 transmitted from the PCRF+PCF 518 to the S-CSCF 520, the PCRF+PCF 518 (e.g., the originating endpoint) sends a Response Confirmation as a SIP PRACK message to the S-CSCF 520. The Response Confirmation may also contain SDP. This may be the same SDP as in the Offer Response sent in step 574 or a subset. If new media are defined by this SDP, a new authorization may be done by the AF+P-CSCF 522 and PCRF+PCF 518 following step 578. The originating UE 524 is free to continue to offer new media on this operation or on subsequent exchanges using the Update method. Each offer and/or answer exchange will cause the AF+P-CSCF 522 and PCRF+PCF 518 to repeat authorization again.

In certain embodiments, in a thirtieth communication 576 transmitted from the S-CSCF 520 to the AF+P-CSCF 522, the S-CSCF 520 forwards the Response Confirmation as a SIP PRACK message to AF+P-CSCF 522.

In various embodiments, in a thirty-first communication 577 transmitted from the AF+P-CSCF 522 to the UE 524, if the PCRF+PCF 518 received an indication that inter-RAT mobility is ongoing, the PCRF+PCF 518 may inform the AF+P-CSCF 522 to temporary hold-on the IMS signaling towards the UE 524 until at least the default bearer is established in the target RAT and/or system. Upon receipt the Response Confirmation as a PRACK message, the AF+P-CSCF 522 should evaluate the elapsed time initiated at the time when AF+P-CSCF 522 was notified that change of access technology was required to this step. If the time has elapsed for a predetermined and/or preconfigured time which is timer 2, the AF+P-CSCF 522 forwards the Response Confirmation to the UE 524. Otherwise, the AF+P-CSCF 522 shall wait until timer 2 is exhausted before forwarding the Response Confirmation to the UE 524. The AF+P-CSCF 522 may also retry if it does not receive the acknowledgement for the Response Confirmation by the terminating UE 524 in step 578 or SIP 200 ok response. If the S-CSCF 520 was informed for the access change timer 2 would be implemented against the S-CSCF 520.

In some embodiments, in a thirty-second communication 578 transmitted from the UE 524 to the AF+P-CSCF 522, the UE 524 responds to the Response Confirmation with an acknowledgement as a SIP 200 OK response. If Optional SDP is contained in the Response Confirmation, the acknowledgement (e.g., SIP 200 OK) will also contain an SDP response. If the SDP has changed, the AF+P-CSCF 522 authorizes that the resources are allowed to be used. Since timer 2 has been exhausted, the UE 524 is now on the EPS access technology. The UE 524 shall therefore begin to insert from now onwards the new access technology in the PANI header field in the SIP messages.

Depending on the bearer establishment mode selected for the IP CAN session, resource reservation shall be initiated 579 either by the UE 524 or by the IP CAN itself. The UE 524 initiates the reservation procedures for the resources needed for this session. Otherwise, the IP CAN initiates the reservation of required resources after step 570.

In various embodiments, in a thirty-third communication 580 transmitted from the AF+P-CSCF 522 to the S-CSCF 520 and in a thirty-fourth communication 581 transmitted from the S-CSCF 520 to the PCRF+PCF 518, the acknowledgement (e.g., 200 OK response) is forwarded to the originating end point.

In some embodiments, in a thirty-fifth communication 582 transmitted from the PCRF+PCF 518 to the S-CSCF 520, in a thirty-sixth communication 583 transmitted from the S-CSCF 520 to the AF+P-CSCF 522, and in a thirty-seventh communication 584 transmitted from the AF+P-CSCF 522 to the UE 524, when the originating endpoint (e.g., the PCRF+PCF 518) has completed its resource reservation, it sends the successful Resource Reservation message as a SIP UPDATE message towards S CSCF. The S-CSCF 520 forwards the message toward the terminating endpoint along the signaling path.

The UE alerts 585 the destination user of an incoming session setup attempt.

In various embodiments, in a thirty-eighth communication 586 transmitted from the UE 524 to the AF+P-CSCF 522, in a thirty-ninth communication 587 transmitted from the AF+P-CSCF 522 to the S-CSCF 520, and in a fortieth communication 588 transmitted from the S-CSCF 520 to the PCRF+PCF 518, the UE 524 responds to the successful resource reservation by a SIP 200 OK response and the message is forwarded to the originating end (e.g., the PCRF+PCF 518).

In some embodiments, in a forty-first communication 589 transmitted from the UE 524 to the AF+P-CSCF 522, in a forty-second communication 590 transmitted from the AF+P-CSCF 522 to the S-CSCF 520, and in a forty-third communication 591 transmitted from the S-CSCF 520 to the PCRF+PCF 518, the UE 524 may alert the user and wait for an indication from the user before completing the session. If so, it indicates this to the originating party by a provisional SIP 180 ringing response indicating Ringing. This message is sent to AF+P-CSCF 522 and along the signaling path to the originating end (e.g., the PCRF+PCF 518).

In certain embodiments, in a forty-fourth communication 592 transmitted from the UE 524 to the AF+P-CSCF 522, when the destination party answers, the UE 524 sends a SIP 200 OK final response to the AF+P-CSCF 522.

In various embodiments, in a forty-fifth communication 593 transmitted between the E-UTRA 506, the AMF 508, the MME 510, the SGW 512, the PGW-C+SMF 514, the PGW-U+UPF 516, the PCRF+PCF 518, the S-CSCF 520, the AF+P-CSCF 522, and the UE 524, upon receipt of the SIP 200 OK by the AF+P-CSCF 522, the AF+P-CSCF 522 indicates to PCRF+PCF 518 and the authorized media flows for this session is now enabled via PGW-C+SMF 514 and PGW-U+UPF 516, and the UE 524 starts the media flows for this session.

In certain embodiments, in a forty-sixth communication 594 transmitted from the AF+P-CSCF 522 to the S-CSCF 520 and a forty-seventh communication 595 transmitted from the S-CSCF 520 to the PCRF+PCF 518, the AF+P-CSCF 522 forwards the 200 OK to the S-CSCF 520, following the signaling path.

In various embodiments, in a forty-eighth communication 596 transmitted from the PCRF+PCF 518 to the S-CSCF 520, a forty-ninth communication 597 transmitted from the S-CSCF 520 to the AF+P-CSCF 522, and a fiftieth communication 598 transmitted from the AF+P-CSCF 522 to the UE 524, the session originator (e.g., the PCRF+PCF 518) responds to the 200 OK by sending a SIP ACK message to the S-CSCF 520 and it is forwarded to the terminating end along the signaling path.

Figure 6:
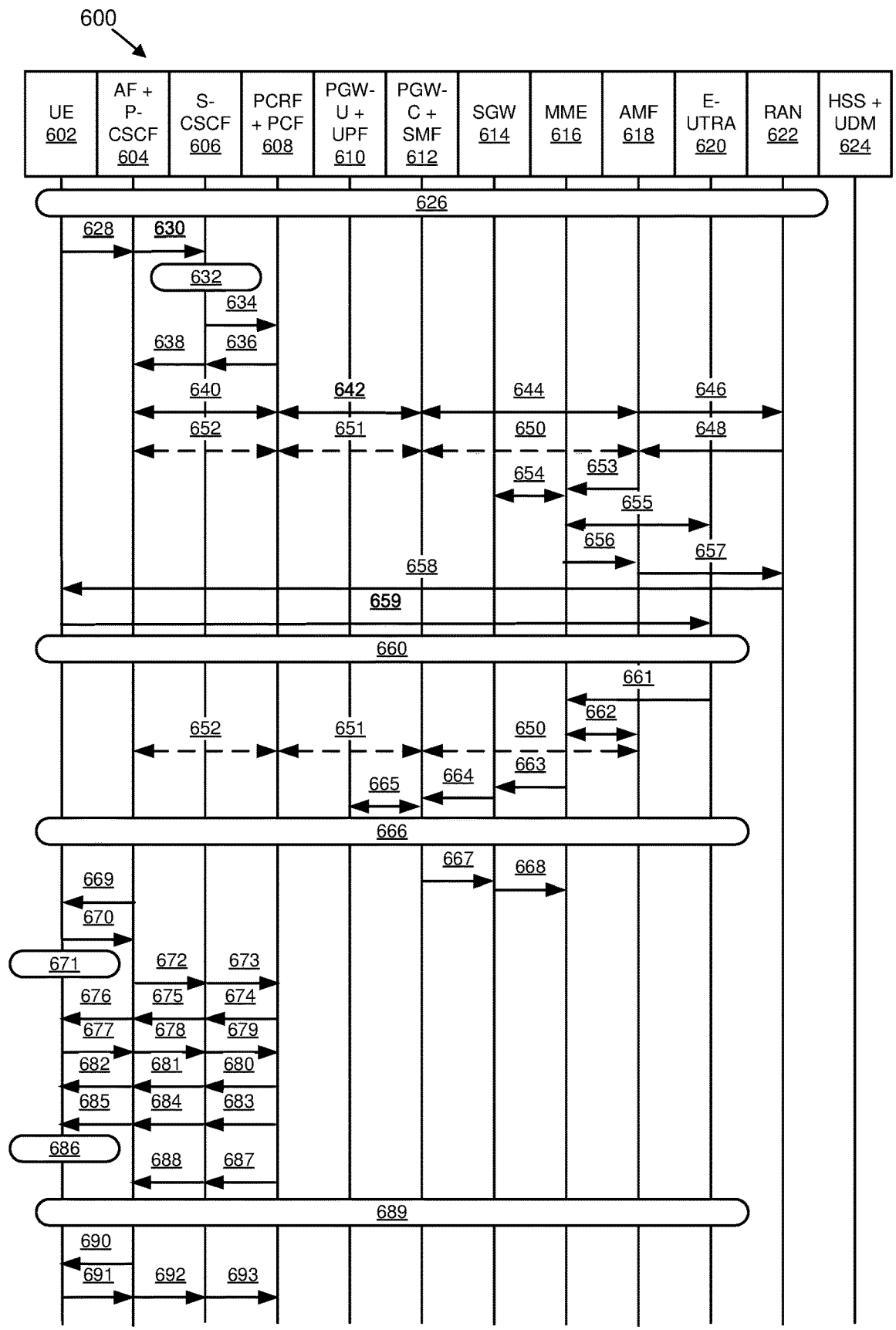
FIG. 6 is a schematic block diagram illustrating one embodiment of communications for EPS fallback with N26 employed and originating at a UE.

FIG. 6 illustrates EPS fallback in certain embodiments in which a UE originates an IMS voice session setup. Specifically, FIG. 6 is a schematic block diagram illustrating one embodiment of communications 600 for EPS fallback with N26 employed and originating at a UE. The communications 600 illustrated occur between a UE 602, an AF+P-CSCF 604, a S-CSCF 606, a PCRF+PCF 608, a PGW-U+UPF 610, a PGW-C+SMF 612, an SGW 614, an MME 616, an AMF 618, an E-UTRA 620, a RAN (e.g., NG-RAN) 622, and an HSS+UDM 624. As may be appreciated, any of the communications 600 described herein may include one or more messages. FIG. 6 is substantially similar to the description of FIG. 5, but for origination at the UE 602.

The network may setup 626 a PDU session and QoS flow in 5GS. Moreover, in one embodiment, in a first communication 628 transmitted from the UE 602 to the AF+P-CSCF 604, the UE 602 may send a SIP INVITE request containing an initial SDP offer towards the AF+P-CSCF 604.

Furthermore, in certain embodiments, in a second communication 630 transmitted from the AF+P-CSCF 604 to the S-CSCF 606, the AF+P-CSCF 604 may forward the SIP INVITE to the S-CSCF 606.

The S-CSCF 606 validates 632 the service profile and invokes any termination service logic required for this user. This may include authorization of the requested SDP based on the user's subscription for multi-media services.

In some embodiments, in a third communication 634 transmitted from the S-CSCF 606 to the PCRF+PCF 608, the S-CSCF 606 forwards the invite to the PCRF+PCF 608.

In certain embodiments, in a fourth communication 636 transmitted from the PCRF+PCF 608 to the S-CSCF 606 and in a fifth communication 638 transmitted from the S-CSCF 606 to the AF+P-CSCF 604, a 183 message is forwarded from the PCRF+PCF 608 to the AF+P-CSCF 604.

With steps 640 through 668, the AF+P-CSCF 604 authorizes the resources necessary for this session.

In some embodiments, in a sixth communication 640 transmitted between the AF+P-CSCF 604 and the PCRF+PCF 608, AF+P-CSCF 604 transmits the Npcf_PolicyAuthorization_Create request containing the IP address of the UE 602 and the application identifier towards the PCRF+PCF 608. The AF+P-CSCF 604 will receive the Npcf_PolicyAuthorization_Create reply.

In certain embodiments, in a seventh communication 642 transmitted between the PCRF+PCF 608 and the PGW-C+SMF 612, the PCRF+PCF 608 employs Npcf_SMPolicyControl_UpdateNotify request to provide the PGW-C+SMF 612 (or SMF) the updated session management related policy for the PDU session. The PGW-C+SMF 612 responds by Npcf_SMPolicyControl_UpdateNotify reply upon receipt of the request.

In various embodiments, in an eighth communication 644 transmitted between the PGW-C+SMF 612 and the AMF 618, the PGW-C+SMF 612 employs Nsmf_PDUSession_Update SM Context operation to provide the update to the PDU session identified by a PDU session ID. The update comprises new added QoS flows for the invoked IMS service (e.g., MMTEL).

In some embodiments, in a ninth communication 646 transmitted from the AMF 618 to the RAN 622, the AMF 618 construct PDU_Session_Resource_Modify Request to modify the PDU session, transmits the PDU_Session_Resource_Modify Request to the RAN 622, and adds new QoS flows mapping the invoked IMS service.

In certain embodiments, in a tenth communication 648 transmitted from the RAN 622 to the AMF 618, the RAN 622 decides that the UE 602 should be handed over to the E-UTRAN. The RAN 622 sends a Handover Required (e.g., Target eNB ID, Source to Target Transparent Container) message to the AMF 618 by constructing the PDU_Session_Resoource_Modify Response. The RAN 622 indicates a bearer corresponding to the 5G QoS flows for data forwarding in a Source to Target Transparent Container.

In various embodiments, in an eleventh communication 650 transmitted between the AMF 618 and the PGW-C+SMF 612 at one of two possible times, the AMF 618 determines from the Target eNB ID IE that the type of the handover is Handover to E-UTRAN. The AMF 618 selects an MME. The AMF 618 by using Nsmf_PDUSession_Context Request requests the PGW-C+SMF 612 for each PDU session associated with 3GPP access to provide SM Context that also includes the mapped EPS Bearer Contexts. The AMF 618 provides the target MME capabilities to the PGW-C+SMF 612 in the request to allow the PGW-C+SMF 612 to determine whether to include the EPS Bearer context for non-IP PDN Type or not. For PDU Sessions with PDU Sessions Type Ethernet or Unstructured, the PGW-C+SMF 612 provides SM Context for non-IP PDN Type. This step is performed with all PGW-C+SMFs allocated to the UE 602 for each PDU Session of the UE 602. The PGW-C+SMF 612 provides the requested CM Context and sends towards the AMF 618 by using Nsmf_PDUSsesion_Context Response.

In some embodiments, in a twelfth communication 651 transmitted between the PGW-C+SMF 612 and the PCRF+PCF 608 at one of two possible times, the PGW-C+SMF 612 initiates PDU Session Modification towards the PCRF+PCF

608 to obtain the E-UTRAN PCC Rules for the PDU Sessions by invoking Nsmf_EventExposure_Notify request and providing the event that generates the notification and the event information. A type of the event is changed in the type of Access Type. Upon receipt, the PCRF+PCF 608 responds by sending Nsmf_EventExposure_Notify reply.

In certain embodiments, in a thirteenth communication 652 transmitted between the PCRF+PCF 608 and the AF+P-CSCF 604 at one of two possible times, the AF+P-CSCF 604 may subscribe to the radio access type change by employing Npcf_PolicyAuthorization_Subscribe service. The subscription may also be based on the communication system change, any system change or any change that may occur so the UE 602 is unreachable. The PCRF+PCF 608 notifies PDU Session Modification by invoking Npcf_PolicyAuthorization_Notify request to the AF+P-CSCF 604. Upon receipt, the AF+P-CSCF 604 responds by sending Npcf_PolicyAuthorization_Notify reply. From the time the AF+P-CSCF 604 initiates authorization of the necessary resources for the PDU session until the time the AF+P-CSCF 604 receives the need for change of access technology, the AF+P-CSCF 604 may maintain a timer (e.g., timer 1). During this timer the AF+P-CSCF 604 may delay forwarding the Offer Response message it had received in step 636 (first instance that includes SIP 183 session in progress). The AF+P-CSCF 604 may also insert an indication in SIP 183 session in progress for the S-CSCF 606 regarding the need for the terminating UE 602 to change of the access technology. The value for timer 1 may be configured and may be different for different implementations. If timer 1 is exhausted and the AF+P-CSCF 604 has not been notified about any radio access and system changes or any unreachability of the terminating UE 602, the AF+P-CSCF 604 may assume there was no change and interruption in the PDU session modification and/or IMS session establishment. In order to avoid generalizing this delay, the AF+P-CSCF 604 invokes this procedure when the P-Access-Network-Info header field indicates 5G access technology in combination with other header fields showing the MINITEL service is requested.

In various embodiments, in a fourteenth communication 653 transmitted from the AMF 618 to the MME 616, the AMF 618 sends towards the MME 616 a Forward Relocation Request (e.g., Target E-UTRAN Node ID, Source to Target Transparent Container, mapped MM context (including EPS security context mapped from 5G security context (default and dedicated GBR bearers), Direct Forwarding Flag, UE Usage Type) message. The SGW address and TEID for both the control plane or EPS bearers in the message are such that target MME selects a new SWG. The AMF 618 includes Direct Forwarding Flag to inform the target MME 616 of the applicability of indirect data forwarding.

In some embodiments, in a fifteenth communication 654 transmitted between the MME 616 and the SGW 614, the MME 616 selects the SGW 614 and sends a Create Session Request message for each PDN connection to the SGW 614. The SGW 614 allocates its local resources and returns them in a Create Session Response message to the MME 616.

In certain embodiments, in a sixteenth communication 655 transmitted between the MME 616 and the E-UTRA 620, the MME 616 requests the E-UTRA 620 (e.g., the target eNB) to establish bearers by sending the Handover request message which also contains a list of EPS bearer IDs that are to be setup and the last used 5GS PLMN ID. If the last used 5GS PLMN ID is not in the equivalent PLMNs list, the MME 616 adds the last used 5GS PLMN ID into it and stores the last 5GS PLMN ID in the UE's 602 MM context. The E-UTRA 620 allocates the resources and returns the applicable parameters to the target MME 616 message Handover Request Acknowledge (e.g., Target to Source Transparent Container, EPS Bearer setup list, EPS Bearer field to setup list). The EPS Bearer Setup list includes a list of addresses and TEIDs allocated at the E-UTRA 620 for downlink traffic on S1-U reference point (one TEID per bearer) and addresses and TEIDs for receiving forwarded data if necessary. The E-UTRA 620 stores the last used 5GS PLMN ID in the UE 602 context and sends to E-UTRA 620 during intra-E-UTRAN handover procedure. The E-UTRA 620 also uses the last used 5GS PLMN ID to re-route the UE 602 back to the last used 5GS PLMN by selecting the suitable dedicated target frequency list (for idle mode mobility) or target cell (for connected mode mobility) according to operator's configuration.

In various embodiments, in a seventeenth communication 656 transmitted from the MME 616 to the AMF 618, in a response to the message Relocation Request from the AMF 618, the MME 616 sends the message Relocation Response (e.g., Cause, List of Set Up RABs, EPS Bearers setup list, MME Tunnel Endpoint Identifier for Control Plane, RAN Cause, MME Address for Control Plane, Target to Source Transparent Container, Address(es) and TEID(s) for Data Forwarding) towards AMF 618.

In some embodiments, in an eighteenth communication 657 transmitted from the AMF 618 to the RAN 622, the AMF 618 sends the HO Command to the RAN 622 (e.g., source NG-RAN).

In certain embodiments, in a nineteenth communication 658 transmitted from the RAN 622 to the UE 602, the RAN 622 commands the UE 602 to handover to the target access network by sending the HO Command (e.g., Transparent container (radio aspect parameters that the target eNB has set-up in the preparation phase), CN tunnel info for data forwarding per PDU Session, QoS flows for Data Forwarding).

In various embodiments, in a twentieth communication 659 transmitted from the UE 602 to the E-UTRA 620, the UE 602 correlates the ongoing QoS flows with the indicated EPS Bearer IDs to be setup in the HO command. The UE 602 locally deletes the PDU Session if the QoS flow of the default QoS rule in the PDU Session does not have an EPS Bearer ID assigned. For the remaining PDU Sessions, the UE 602 locally deletes the QoS flows that do not have an EPS bearer ID assigned. The UE 602 deletes any UE derived QoS rules. The EPS Bearer ID that was assigned for the QoS flow of the default QoS rule in the PDU Session becomes the EPS Bearer ID of the default bearer in the corresponding PDN connection. For the QoS Flows indicated in the "QoS Flows for Data Forwarding," the RAN 622 initiates data forwarding via to the PGW-U+UPF 610 based on the CN Tunnel Info for Data Forwarding per PDU Session. Then the PGW-U+UPF 610 maps data received from the data forwarding tunnels in the 5GS to the data forwarding tunnels in EPS, and sends the data to the E-UTRA 620 via the SGW 614.

Data may be transmitted 660 between the E-UTRA 620, the AMF 618, the MME 616, the SGW 614, the PGW-C+SMF 612, the PGW-U+UPF 610, the PCRF+PCF 608, the S-CSCF 606, the AF+P-CSCF 604, and the UE 602 in the EPS.

In some embodiments, in a twenty-first communication 661 transmitted from the E-UTRA 620 and the MME 616, when the UE 602 has successfully accessed the E-UTRA 620 (e.g., target eNB), the E-UTRA 620 informs the MME 616 (e.g., target MME) by sending the message Handover Notify.

In certain embodiments, in a twenty-second communication 662 transmitted between the MME 616 and the AMF 618, then the MME 616 knows that the UE 602 has arrived to the target side and MME 616 informs the AMF 618 by sending the Relocation Complete Notification message. The AMF 618 acknowledges the MME 616 with a Relocation Complete Ack message. A timer in AMF 618 may be started to supervise when resources in the RAN 622 and PGW-C+SMF 612 shall be released.

In various embodiments, in a twenty-third communication 663 transmitted from the MME 616 to the SGW 614, the MME 616 informs the SGW 614 that the MME 616 is responsible for all the bearers the UE 602 has established by sending the Modify Bearer Request message for each PDN connection. The MME 616 releases the non-accepted EPS Bearer contexts by triggering the Bearer Context deactivation procedure.

In some embodiments, in a twenty-fourth communication 664 transmitted from the SGW 614 to the PGW-C+SMF 612, the SGW 614 informs the PGW-C+SMF 612 of the relocation by sending the Modify Bearer Request message for each PDN connection.

In certain embodiments, in a twenty-fifth communication 665 transmitted between the PGW-C+SMF 612 and the PGW-U+UPF 610, the PGW-C+SMF 612 locally deletes the PDU Session if the QoS flow of the default QoS rule in the PDU Session does not have an EPS Bearer ID assigned. For the remaining PDU Sessions, the PGW-C+SMF 612 locally deletes the QoS Flows that do not have an EPS bearer ID assigned.

Modified data may be transmitted 666 between the E-UTRA 620, the AMF 618, the MME 616, the SGW 614, the PGW-C+SMF 612, the PGW-U+UPF 610, the PCRF+PCF 608, the S-CSCF 606, the AF+P-CSCF 604, and the UE 602 in the EPS.

In various embodiments, in a twenty-sixth communication 667 transmitted from the PGW-C+SMF 612 to the SGW 614, the PGW-C+SMF 612 acknowledges the Modify Bearer Request. At this stage the User Plane path is established for the default bearer and the dedicated GBR bearers between the UE 602, E-UTRA 620, SGW 614, and the PGW-C+SMF 612. The PGW-C+SMF 612 uses the EPS QoS parameters as assigned for the dedicated EPS GBR bearers during the QoS flow establishment. The PGW-C+SMF 612 maps all the other IP flows to the default EPS bearer.

In some embodiments, in a twenty-seventh communication 668 transmitted from the SGW 614 to the MME 616, the SGW 614 acknowledges the UP switch to the MME 616 via the message Modify Bearer Response.

In various embodiments, in a twenty-ninth communication 669 transmitted from the AF+P-CSCF 604 to the UE 602, the AF+P-CSCF 604 may transmit a SIP 183 message to the UE 602.

In some embodiments, in a thirtieth communication 670 transmitted from the UE 602 to the AF+P-CSCF 604, the UE 602 may transmit a PRACK message to the AF+P-CSCF 604.

Depending on the bearer establishment mode selected for the IP CAN session, resource reservation shall be initiated 671 either by the UE 602 or by the IP CAN itself. The UE 602 initiates the reservation procedures for the resources needed for this session. Otherwise, the IP CAN initiates the reservation of required resources after step 670.

In various embodiments, in a thirty-first communication 672 transmitted from the AF+P-CSCF 604 to the S-CSCF 606 and in a thirty-second communication 673 transmitted from the S-CSCF 606 to the PCRF+PCF 608, a PRACK message may be forwarded to the PCRF+PCF 608.

In some embodiments, in a thirty-third communication 674 transmitted from the PCRF+PCF 608 to the S-CSCF 606, in a thirty-fourth communication 675 transmitted from the S-CSCF 606 to the AF+P-CSCF 604, and in a thirty-fifth communication 676 transmitted from the AF+P-CSCF 604 to the UE 602, a SIP 200 OK message may be forwarded from the PCRF+PCF 608 to the UE 602.

In various embodiments, in a thirty-sixth communication 677 transmitted from the UE 602 to the AF+P-CSCF 604, in a thirty-seventh communication 678 transmitted from the AF+P-CSCF 604 to the S-CSCF 606, and in a thirty-eighth communication 679 transmitted from the S-CSCF 606 to the PCRF+PCF 608, the UE 602 may provide a SIP UPDATE message that is forward to the PCRF+PCF 608.

In certain embodiments, in a thirty-ninth communication 680 transmitted from the PCRF+PCF 608 to the S-CSCF 606, in a fortieth communication 681 transmitted from the S-CSCF 606 to the AF+P-CSCF 604, and in a forty-first communication 682 transmitted from the AF+P-CSCF 604 to the UE 602, a SIP 200 OK message may be forwarded from the PCRF+PCF 608 to the UE 602.

In some embodiments, in a forty-second communication 683 transmitted from the PCRF+PCF 608 to the S-CSCF 606, in a forty-third communication 684 transmitted from the S-CSCF 606 to the AF+P-CSCF 604, and in a forty-fourth communication 685 transmitted from the AF+P-CSCF 604 to the UE 602, a SIP 180 message may be forwarded from the PCRF+PCF 608 to the UE 602.

The UE alerts 686 the destination user of an incoming session setup attempt.

In various embodiments, in a forty-fifth communication 687 transmitted from the PCRF+PCF 608 to the S-CSCF 606 and in a forty-sixth communication 688 transmitted from the S-CSCF 606 to the AF+P-CSCF 604, the PCRF+PCF 608 transmits a SIP 200 OK message toward the AF+P-CSCF 604.

In various embodiments, in a forty-seventh communication 689 transmitted between the E-UTRA 620, the AMF 618, the MME 616, the SGW 614, the PGW-C+SMF 612, the PGW-U+UPF 610, the PCRF+PCF 608, the S-CSCF 606, the AF+P-CSCF 604, and the UE 602, upon receipt of the SIP 200 OK by the AF+P-CSCF 604, the AF+P-CSCF 604 indicates to PCRF+PCF 608 and the authorized media flows for this session is now enabled via PGW-C+SMF 612 and PGW-U+UPF 610, and the UE 602 starts the media flows for this session.

In certain embodiments, in a forty-eighth communication 690 transmitted from the AF+P-CSCF 604 to the UE 602, the AF+P-CSCF 604 forwards a 200 OK to the UE 602.

In various embodiments, in a forty-ninth communication 691 transmitted from the UE 602 to the AF+P-CSCF 604, a fiftieth communication 692 transmitted from the AF+P-CSCF 604 to the S-CSCF 606, and a fifty-first communication 693 transmitted from the S-CSCF 606 to the PCRF+PCF 608, the UE 602 responds to the 200 OK by sending a SIP ACK message to the PCRF+PCF 608.

Figure 7:
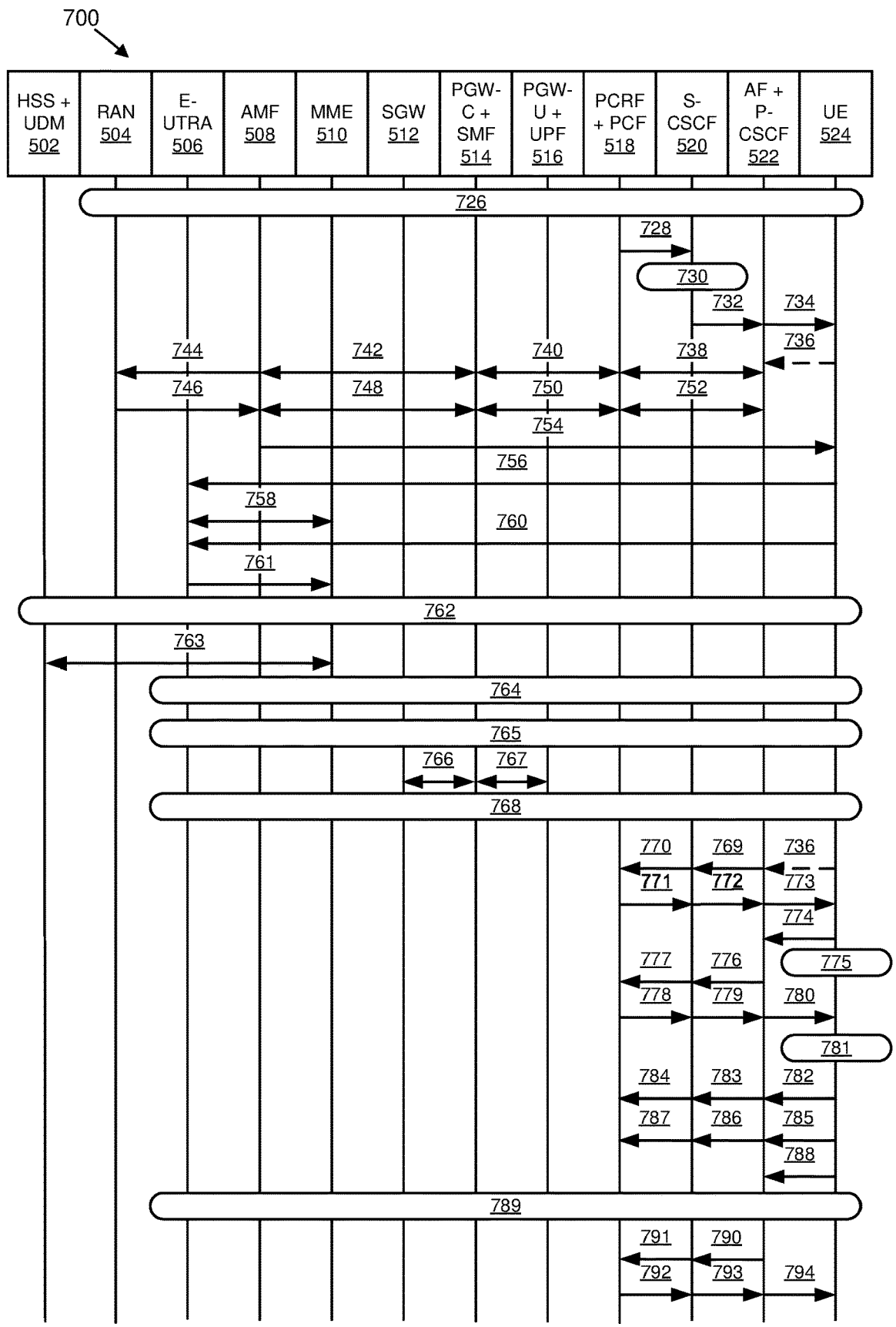
FIG. 7 is a schematic block diagram illustrating one embodiment of communications for EPS fallback without N26 employed and terminating at a UE.

In some embodiments, such as illustrated in FIG. 7, the IMS signaling for service setup may be exchanged, the UE may be about to terminate the IMS session setup, and the SIP INVITE is being forwarded from the S-CSCF towards the UE due to radio conditions. Thus, a Handover or Idle state fallback from NG-RAN to E-UTRAN may be performed.

The assumption in this embodiment is that an N26 interface is not used. As may be appreciated, this embodiment covers the EPS Fallback for voice services (e.g., normal voice services).

FIG. 7 is a schematic block diagram illustrating one embodiment of communications 700 for EPS fallback without N26 employed and terminating at a UE. The communications 700 illustrated occur between an HSS+UDM 502, a RAN (e.g., NG-RAN) 504, an E-UTRA 506, an AMF 508, an MME 510, an SGW 512, a PGW-C+SMF 514, a PGW-U+UPF 516, a PCRF+PCF 518, a S-CSCF 520, an AF+P-CSCF 522, and a UE 524. As may be appreciated, any of the communications 700 described herein may include one or more messages.

The network may setup 726 a PDU session and QoS flow in 5GS. Moreover, in one embodiment, in a first communication 728 transmitted from the PCRF+PCF 518 to the S-CSCF 520, the PCRF+PCF 518 may send a SIP INVITE request containing an initial SDP offer towards the S-CSCF 520.

The S-CSCF 520 validates 730 the service profile and invokes any termination service logic required for this user. This may include authorization of the requested SDP based on the user's subscription for multi-media services.

In some embodiments, in a second communication 732 transmitted from the S-CSCF 520 to the AF+P-CSCF 522, the S-CSCF 520 remembers (e.g., from the registration procedure) the next hop CSCF for the UE 524 and forwards the invite to the AF+P-CSCF 522 in the visited network.

In certain embodiments, in a third communication 734 transmitted from the AF+P-CSCF 522 to the UE 524, if the AF+P-CSCF 522 determines that the termination is for an MPS session, the AF+P-CSCF 522 derives the session information and invokes dynamic policy sending the derived session information to the PCRF+PCF 518, the AF+P-CSCF 522 remembers (e.g., from the registration procedure) the UE 524 address, and forwards the invite to the UE 524.

In various embodiments, in a fourth communication 736 transmitted from the UE 524 to the AF+P-CSCF 522 at one of two possible times, the UE 524 determines the subset of the media flows proposed by the originating endpoint that it supports, and responds to the AF+P-CSCF 522 with an offer response message back to the originator. The SDP may represent one or more media for a multi-media session.

With steps 738 through 768, the AF+P-CSCF 522 authorizes the resources necessary for this session.

In some embodiments, in a fifth communication 738 transmitted between the AF+P-CSCF 522 and the PCRF+PCF 518, AF+P-CSCF 522 transmits the Npcf_PolicyAuthorization_Create request containing the IP address of the UE 524 and the application identifier towards the PCRF+PCF 518. The AF+P-CSCF 522 will receive the Npcf_PolicyAuthorization_Create reply.

In certain embodiments, in a sixth communication 740 transmitted between the PCRF+PCF 518 and the PGW-C+SMF 514, the PCRF+PCF 518 employs Npcf_SMPolicyControl_UpdateNotify request to provide the PGW-C+SMF 514 (or SMF) the updated session management related policy for the PDU session. The PGW-C+SMF 514 responds by Npcf_SMPolicyControl_UpdateNotify reply upon receipt of the request.

In various embodiments, in a seventh communication 742 transmitted between the PGW-C+SMF 514 and the AMF 508, the PGW-C+SMF 514 invokes service operation to the AMF 508 to transmit N2 SM information to the RAN 504 (e.g., Namf_Communication_N1N2MessageTransfer (SM Context ID, N2 SM information (PDU Session ID, N3 tunnel information, QFI(s), QoS Profile(s), Session-AMBR)). It is assumed that the UE 524 is in CM-CONNECTED state and the AMF has established N2 transport association with the RAN 504 (and therefore no Paging procedure is needed).

In some embodiments, in an eighth communication 744 transmitted from the AMF 508 to the RAN 504, the AMF 508 sends N2 PDU Session request to the RAN 504 to transmit the N2 SM information received from the PGW-C+SMF 514 by using PDU_Session_Resource_Modify Request.

In certain embodiments, in a ninth communication 746 transmitted from the RAN 504 to the AMF 508, if the RAN 504 decides to reject the PDU session modification or new QoS flow establishment request from the PGW-C+SMF 514 (e.g., the N2 SM request from SMF for QoS flow) for voice service (e.g., based on configuration in the RAN 504 to use E-UTRAN for voice services, and thus to use inter-RAT mobility). The RAN 504 sends a QoS flow rejection indication to the PGW-C+SMF 514 included in an N2 Session response message to the AMF 508. The RAN 504 can also provide a reason for the rejected QoS flow establishment (e.g., non-supported 5QI and inter-system change needed). The RAN 504 may send an indication to the AMF 508 in the N2 Session response message that Inter-System Redirection is required and/or request for establishment of QoS Flow for IMS voice failed. This indicates to the AMF 508 to release the existing N1 connection with the UE 524 in order to initiate re-direction to an E-UTRAN and/or EPC.

In various embodiments, in a tenth communication 748 transmitted between the AMF 508 and the PGW-C+SMF 514, if received in step 746, the AMF 508 forwards the N2 SM information container to the PGW-C+SMF 514. The AMF 508 may also provide the reason for the rejection of the PGW-C+SMF 514 (e.g., Idle state inter-RAT mobility). Such an indication can be a trigger for the PGW-C+SMF 514 that a specific indication is needed towards the PCRF+PCF 518 to indicate that the UE 524 is temporary not reachable. In addition to the exchange from the AMF 508 to the PGW-C+SMF 514 for the IMS session, this tenth communication 748 is also performed with all the PGW-C+SMFs allocated to the UE 524 for each PDU Session of the UE 524. For example, the AMF 508 uses Nsmf_PDUSsesion_Update_SMContext service operation. The PGW-C+SMF 514 sends a response towards the AMF 508 by using Nsmf_PDUSsesion_Update_SMContext reply. The AMF 508 may decide whether to perform a handover procedure or RRC release with redirection based on the availability of the N26 interface. For example, if the N26 interface is not deployed, the AMF 508 decides to perform idle state mobility, (e.g., RRC release with redirection). The AMF 508 sends N2 UE Context Release Request/Command message to the RAN 504.

In some embodiments, in an eleventh communication 750 transmitted between the PGW-C+SMF 514 and the PCRF+PCF 518, after receiving a rejection from the RAN 504 for QoS flow establishment for voice service and an indication indicating that inter-RAT mobility (e.g., EPS fallback in Idle state) is ongoing, the PGW-C+SMF 514 initiates PDU Session Modification towards the PCRF+PCF 518 to obtain the E-UTRAN PCC Rules for the PDU Sessions by invoking Nsmf_EventExposure_Notify request and providing the event that generates the notification and the event information. A type of the event is changed in the type of Access Type. Upon receipt, the PCRF+PCF 518 responds by sending Nsmf_EventExposure_Notify reply. As may be appreciated, the PGW-C+SMF 514 may additionally inform the PCRF+PCF 518 that inter-RAT mobility is ongoing in Idles state and the UE 524 is temporary not reachable.

In certain embodiments, in a twelfth communication 752 transmitted between the PCRF+PCF 518 and the AF+P-CSCF 522, the AF+P-CSCF 522 may subscribe to the radio access type change by employing Npcf_PolicyAuthorization_Subscribe service. The subscription may also be based on the communication system change, any system change or any change that may occur so the UE 524 is unreachable. The PCRF+PCF 518 notifies PDU Session Modification by invoking Npcf_PolicyAuthorization_Notify request to the AF+P-CSCF 522. Upon receipt, the AF+P-CSCF 522 responds by sending Npcf_PolicyAuthorization_Notify reply. From the time the AF+P-CSCF 522 initiates authorization of the necessary resources for the PDU session until the time the AF+P-CSCF 522 receives the need for change of access technology, the AF+P-CSCF 522 may maintain a timer (e.g., timer 1). During this timer the AF+P-CSCF 522 may delay forwarding the Offer Response message it had received in step 536 (first instance that includes SIP 183 session in progress). The AF+P-CSCF 522 may also insert an indication in SIP 183 session in progress for the S-CSCF 520 regarding the need for the terminating UE 524 to change of the access technology. The value for timer 1 may be configured and may be different for different implementations. If timer 1 is exhausted and the AF+P-CSCF 522 has not been notified about any radio access and system changes or any unreachability of the terminating UE 524, the AF+P-CSCF 522 may assume there was no change and interruption in the PDU session modification and/or IMS session establishment. In order to avoid generalizing this delay, the AF+P-CSCF 522 invokes this procedure when the P-Access-Network-Info header field indicates 5G access technology in combination with other header fields showing the MINITEL service is requested.

In various embodiments, in a thirteenth communication 754 transmitted from the AMF 508 to the UE 524, the AMF 508 triggers 'AN release' procedure by sending N2 UE Context Release Request/Command message to the RAN 504. The AMF 508 may include an indication for RAT redirection. The RAN 504 releases the RRC connection and sends a re-direction indication with target cell information. The UE 524 performs cell reselection procedure for a E-UTRAN cell and initiates an RRC Connection establishment and either NAS Tracking Area Update procedure or NAS Attach procedure.

In some embodiments, in a fourteenth communication 756 transmitted from the UE 524 to the E-UTRA 506, the UE 524 shall provide a 4G-GUTI that is mapped from the 5G-GUTI following mapping rules, such as those specified in 3GPP TS 23.501. The UE 524 indicates that it is moving from 5GC.

In certain embodiments, in a fifteenth communication 758 transmitted between the MME 510 and the E-UTRA 506, if the MIME 510 determines that the old node is an AMF based on UE's GUTI mapped from 5G-GUTI and the MME 510 is configured to support 5GS-EPS interworking without N26 procedure, the MME 510 sends a TAU Reject to the UE 524. If the TAU was rejected in at the time the UE 524 requests TAU, the IP address preservation is not provided. In embodiments in which the UE 524 provides IMSI in an Attach Request, and does not provide a Request Type "Handover" in the PDN CONNECTIVITY Request if included in the Attach Request. The UE 524 provides an EPS bearer ID for all mapped EPS bearers in the EPS bearer status. For the initial Attach Request the EPS bearer status is empty. The UE 524 is aware the network is configured to support 5GS-EPS interworking without N26 procedure. The UE 524 does not include the EPS bearer IDs corresponding to the 5G QoS flows to the EPS bearer status.

In various embodiments, in a sixteenth communication 760 transmitted from the UE 524 to the E-UTRA 506, the UE 524 sends an Attach Request with a modification that the UE 524 constructs the Attach Request message for the UE 524 to operate in single-registration mode. The UE 524 indicates that it is moving from 5GC and provides 4G-GUTI mapped from 5G-GUTI. If the UE 524 wants to transfer a PDU Session to EPC as part of the Attach procedure, it includes a PDN CONNECTIVITY Request message in the Attach Request and provides a Request type "Handover," DNN/APN and PDU Session ID of the PDU Session. The UE 524 provides the PDU Session ID in PCO.

In some embodiments, in a seventeenth communication 761 transmitted from the E-UTRA 506 to the MME 510 and in an eighteenth communication 762 transmitted between the HSS+UDM 502, the RAN 504, the E-UTRA 506, the AMF 508, the MME 510, the SGW 512, the PGW-C+SMF 514, the PGW-U+UPF 516, the PCRF+PCF 518, the S-CSCF 520, the AF+P-CSCF 522, and the UE 524, the Attach Request from the E-UTRA 506 is transmitted to the MME 510 and the procedures for initial attach to E-UTRAN are performed. As may be appreciated, if the UE 524 provided a 4G-GUTI mapped from 5G-GUTI and the MME 510 is configured to support 5GS-EPS interworking without N26 procedure, the MME 510 does not perform an identity request to an old MME/SGSN/AMF In certain embodiments, in a nineteenth communication 763 transmitted between the HSS+UDM 502 and the MME 520, an Update Location is performed such that if the MME 520 determines that the old node is an AMF 508 based on the indication from the UE 524 and the MME 520 is configured to support 5GS-EPS interworking without N26 procedure, the MME 520 does not include the "initial attach" indication in its communications with the HSS+UDM 502. The HSS+UDM 502 does not send cancel location to the old AMF. The subscription profile the MME 510 receives from the HSS+UDM 502 includes the DNN/APN and PGW-C+SMF 514 ID for each PDU Session established in 5GC.

In various embodiments, in a twentieth communication 764 transmitted between the E-UTRA 506, the AMF 508, the MME 510, the SGW 512, the PGW-C+SMF 514, the PGW-U+UPF 516, the PCRF+PCF 518, the S-CSCF 520, the AF+P-CSCF 522, and the UE 524, the UE 524 correlates the ongoing QoS flows with the indicated EPS Bearer IDs to be setup in the HO command. The UE 524 locally deletes the PDU Session if the QoS flow of the default QoS rule in the PDU Session does not have an EPS Bearer ID assigned. For the remaining PDU Sessions, the UE 524 locally deletes the QoS flows that do not have an EPS bearer ID assigned. The UE 524 deletes any UE derived QoS rules. The EPS Bearer ID that was assigned for the QoS flow of the default QoS rule in the PDU Session becomes the EPS Bearer ID of the default bearer in the corresponding PDN connection. For the QoS Flows indicated in the "QoS Flows for Data Forwarding," the RAN 504 initiates data forwarding via to the PGW-U+UPF 516 based on the CN Tunnel Info for Data Forwarding per PDU Session. Then the PGW-U+UPF 516 maps data received from the data forwarding tunnels in the 5GS to the data forwarding tunnels in EPS, and sends the data to the E-UTRA 506 via the SGW 512.

Data may be transmitted 765 between the E-UTRA 506, the AMF 508, the MME 510, the SGW 512, the PGW-C+

SMF 514, the PGW-U+UPF 516, the PCRF+PCF 518, the S-CSCF 520, the AF+P-CSCF 522, and the UE 524 in the EPS.

In some embodiments, in a twenty-first communication 766 transmitted between the SGW 512 and the PGW-C+SMF 514, the SGW 512 informs the PGW-C+SMF 514 of the relocation by sending the Modify Bearer Request message for each PDN connection.

In certain embodiments, in a twenty-second communication 767 transmitted between the PGW-C+SMF 514 and the PGW-U+UPF 516, the PGW-C+SMF 514 locally deletes the PDU Session if the QoS flow of the default QoS rule in the PDU Session does not have an EPS Bearer ID assigned. For the remaining PDU Sessions, the PGW-C+SMF 514 locally deletes the QoS Flows that do not have an EPS bearer ID assigned.

Modified data may be transmitted 768 between the E-UTRA 506, the AMF 508, the MME 510, the SGW 512, the PGW-C+SMF 514, the PGW-U+UPF 516, the PCRF+PCF 518, the S-CSCF 520, the AF+P-CSCF 522, and the UE 524 in the EPS.

In certain embodiments, in a twenty-third communication 769 transmitted from the AF+P-CSCF 522 to the S-CSCF 520, the AF+P-CSCF 522 forwards the Offer Response message in the SIP 183 session in progress to the S-CSCF 520.

In various embodiments, in a twenty-fourth communication 770 transmitted from the S-CSCF 520 to the PCRF+PCF 518, the S-CSCF 520 forwards the Offer Response message in the SIP 183 session in progress to the PCRF+PCF 518 (e.g., the originator).

In some embodiments, in a twenty-fifth communication 771 transmitted from the PCRF+PCF 518 to the S-CSCF 520, the PCRF+PCF 518 (e.g., the originating endpoint) sends a Response Confirmation as a SIP PRACK message to the S-CSCF 520. The Response Confirmation may also contain SDP. This may be the same SDP as in the Offer Response sent in step 770 or a subset. If new media are defined by this SDP, a new authorization may be done by the AF+P-CSCF 522 and PCRF+PCF 518 following step 774. The originating UE 524 is free to continue to offer new media on this operation or on subsequent exchanges using the Update method. Each offer and/or answer exchange will cause the AF+P-CSCF 522 and PCRF+PCF 518 to repeat authorization again.

In certain embodiments, in a twenty-sixth communication 772 transmitted from the S-CSCF 520 to the AF+P-CSCF 522, the S-CSCF 520 forwards the Response Confirmation as a SIP PRACK message to AF+P-CSCF 522.

In various embodiments, in a twenty-seventh communication 773 transmitted from the AF+P-CSCF 522 to the UE 524, if the PCRF+PCF 518 received an indication that inter-RAT mobility is ongoing, the PCRF+PCF 518 may inform the AF+P-CSCF 522 to temporary hold-on the IMS signaling towards the UE 524 until at least the default bearer is established in the target RAT and/or system. Upon receipt the Response Confirmation as a PRACK message, the AF+P-CSCF 522 should evaluate the elapsed time initiated at the time when AF+P-CSCF 522 was notified that change of access technology was required to this step. If the time has elapsed for a predetermined and/or preconfigured time which is timer 2, the AF+P-CSCF 522 forwards the Response Confirmation to the UE 524. Otherwise, the AF+P-CSCF 522 shall wait until timer 2 is exhausted before forwarding the Response Confirmation to the UE 524. The AF+P-CSCF 522 may also retry if it does not receive the acknowledgement for the Response Confirmation by the terminating UE 524 in step 578 or SIP 200 ok response. If the S-CSCF 520 was informed for the access change timer 2 would be implemented against the S-CSCF 520.

In some embodiments, in a twenty-eighth communication 774 transmitted from the UE 524 to the AF+P-CSCF 522, the UE 524 responds to the Response Confirmation with an acknowledgement as a SIP 200 OK response. If Optional SDP is contained in the Response Confirmation, the acknowledgement (e.g., SIP 200 OK) will also contain an SDP response. If the SDP has changed, the AF+P-CSCF 522 authorizes that the resources are allowed to be used. Since timer 2 has been exhausted, the UE 524 is now on the EPS access technology. The UE 524 shall therefore begin to insert from now onwards the new access technology in the PANI header field in the SIP messages.

Depending on the bearer establishment mode selected for the IP CAN session, resource reservation shall be initiated 775 either by the UE 524 or by the IP CAN itself. The UE 524 initiates the reservation procedures for the resources needed for this session. Otherwise, the IP CAN initiates the reservation of required resources after step 768.

In various embodiments, in a twenty-ninth communication 776 transmitted from the AF+P-CSCF 522 to the S-CSCF 520 and in a thirtieth communication 777 transmitted from the S-CSCF 520 to the PCRF+PCF 518, the acknowledgement (e.g., 200 OK response) is forwarded to the originating end point.

In some embodiments, in a thirty-first communication 778 transmitted from the PCRF+PCF 518 to the S-CSCF 520, in a thirty-second communication 779 transmitted from the S-CSCF 520 to the AF+P-CSCF 522, and in a thirty-third communication 780 transmitted from the AF+P-CSCF 522 to the UE 524, when the originating endpoint (e.g., the PCRF+PCF 518) has completed its resource reservation, it sends the successful Resource Reservation message as a SIP UPDATE message towards S CSCF. The S-CSCF 520 forwards the message toward the terminating endpoint along the signaling path.

The UE alerts 781 the destination user of an incoming session setup attempt.

In various embodiments, in a thirty-fourth communication 782 transmitted from the UE 524 to the AF+P-CSCF 522, in a thirty-fifth communication 783 transmitted from the AF+P-CSCF 522 to the S-CSCF 520, and in a thirty-sixth communication 784 transmitted from the S-CSCF 520 to the PCRF+PCF 518, the UE 524 responds to the successful resource reservation by a SIP 200 OK response and the message is forwarded to the originating end (e.g., the PCRF+PCF 518).

In some embodiments, in a thirty-seventh communication 785 transmitted from the UE 524 to the AF+P-CSCF 522, in a thirty-eighth communication 786 transmitted from the AF+P-CSCF 522 to the S-CSCF 520, and in a thirty-ninth communication 787 transmitted from the S-CSCF 520 to the PCRF+PCF 518, the UE 524 may alert the user and wait for an indication from the user before completing the session. If so, it indicates this to the originating party by a provisional SIP 180 ringing response indicating Ringing. This message is sent to AF+P-CSCF 522 and along the signaling path to the originating end (e.g., the PCRF+PCF 518).

In certain embodiments, in a fortieth communication 788 transmitted from the UE 524 to the AF+P-CSCF 522, when the destination party answers, the UE 524 sends a SIP 200 OK final response to the AF+P-CSCF 522.

In various embodiments, in a forty-first communication 789 transmitted between the E-UTRA 506, the AMF 508, the MME 510, the SGW 512, the PGW-C+SMF 514, the PGW-U+UPF 516, the PCRF+PCF 518, the S-CSCF 520, the AF+P-CSCF 522, and the UE 524, upon receipt of the SIP 200 OK by the AF+P-CSCF 522, the AF+P-CSCF 522 indicates to PCRF+PCF 518 and the authorized media flows for this session is now enabled via PGW-C+SMF 514 and PGW-U+UPF 516, and the UE 524 starts the media flows for this session.

In certain embodiments, in a forty-second communication 790 transmitted from the AF+P-CSCF 522 to the S-CSCF 520 and a forty-third communication 791 transmitted from the S-CSCF 520 to the PCRF+PCF 518, the AF+P-CSCF 522 forwards the 200 OK to the S-CSCF 520, following the signaling path.

In various embodiments, in a forty-fourth communication 792 transmitted from the PCRF+PCF 518 to the S-CSCF 520, a forty-fifth communication 793 transmitted from the S-CSCF 520 to the AF+P-CSCF 522, and a forty-sixth communication 794 transmitted from the AF+P-CSCF 522 to the UE 524, the session originator (e.g., the PCRF+PCF 518) responds to the 200 OK by sending a SIP ACK message to the S-CSCF 520 and it is forwarded to the terminating end along the signaling path.

Figure 8:
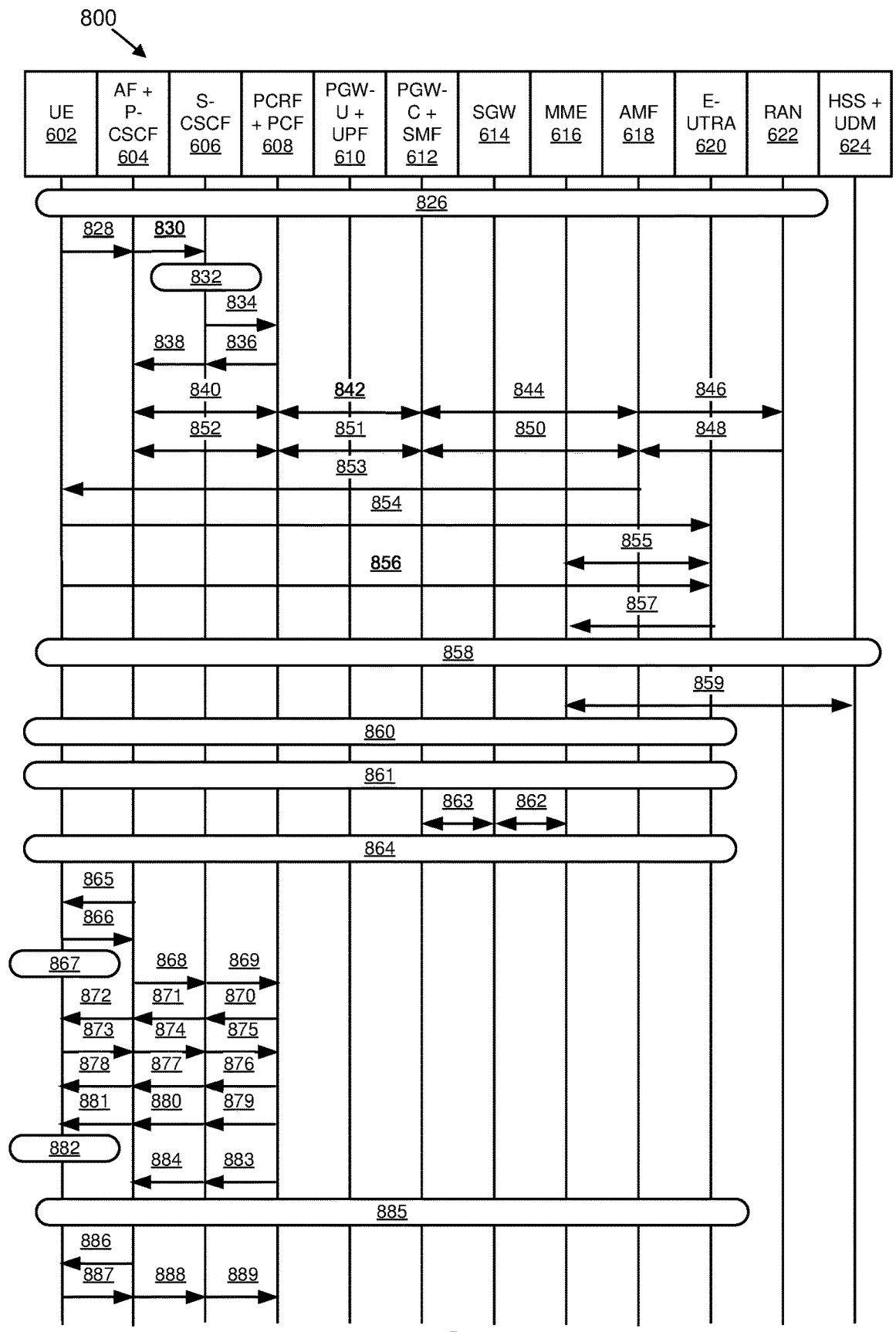
FIG. 8 is a schematic block diagram illustrating one embodiment of communications for EPS fallback without N26 employed and originating at a UE.

FIG. 8 illustrates EPS fallback if the UE originates the IMS voice session setup. Specifically, FIG. 8 is a schematic block diagram illustrating one embodiment of communications 800 for EPS fallback without N26 employed and originating at a UE. The communications 800 illustrated occur between a UE 602, an AF+P-CSCF 604, a S-CSCF 606, a PCRF+PCF 608, a PGW-U+UPF 610, a PGW-C+SMF 612, an SGW 614, an MME 616, an AMF 618, an E-UTRA 620, a RAN (e.g., NG-RAN) 622, and an HSS+UDM 624. As may be appreciated, any of the communications 800 described herein may include one or more messages. FIG. 6 is substantially similar to the description of FIG. 7, but for origination at the UE 602.

The network may setup 826 a PDU session and QoS flow in 5GS. Moreover, in one embodiment, in a first communication 828 transmitted from the UE 602 to the AF+P-CSCF 604, the UE 602 may send a SIP INVITE request containing an initial SDP offer towards the AF+P-CSCF 604.

Furthermore, in certain embodiments, in a second communication 830 transmitted from the AF+P-CSCF 604 to the S-CSCF 606, the AF+P-CSCF 604 may forward the SIP INVITE to the S-CSCF 606.

The S-CSCF 606 validates 832 the service profile and invokes any termination service logic required for this user. This may include authorization of the requested SDP based on the user's subscription for multi-media services.

In some embodiments, in a third communication 834 transmitted from the S-CSCF 606 to the PCRF+PCF 608, the S-CSCF 606 forwards the invite to the PCRF+PCF 608.

In certain embodiments, in a fourth communication 836 transmitted from the PCRF+PCF 608 to the S-CSCF 606 and in a fifth communication 838 transmitted from the S-CSCF 606 to the AF+P-CSCF 604, a 183 message is forwarded from the PCRF+PCF 608 to the AF+P-CSCF 604.

With steps 840 through 864, the AF+P-CSCF 604 authorizes the resources necessary for this session.

In some embodiments, in a sixth communication 840 transmitted between the AF+P-CSCF 604 and the PCRF+PCF 608, AF+P-CSCF 604 transmits the Npcf_PolicyAuthorization_Create request containing the IP address of the UE 602 and the application identifier towards the PCRF+PCF 608. The AF+P-CSCF 604 will receive the Npcf_PolicyAuthorization_Create reply.

In certain embodiments, in a seventh communication 842 transmitted between the PCRF+PCF 608 and the PGW-C+SMF 612, the PCRF+PCF 608 employs Npcf_SMPolicyControl_UpdateNotify request to provide the PGW-C+SMF 612 (or SMF) the updated session management related policy for the PDU session. The PGW-C+SMF 612 responds by Npcf_SMPolicyControl_UpdateNotify reply upon receipt of the request.

In various embodiments, in an eighth communication 844 transmitted between the PGW-C+SMF 612 and the AMF 618, the PGW-C+SMF 612 invokes service operation to the AMF 618 to transmit N2 SM information to the RAN 622 (e.g., Namf_Communication_N1N2MessageTransfer (SM Context ID, N2 SM information (PDU Session ID, N3 tunnel information, QFI(s), QoS Profile(s), Session-AMBR)). It is assumed that the UE 602 is in CM-CONNECTED state and the AMF has established N2 transport association with the RAN 622 (and therefore no Paging procedure is needed).

In some embodiments, in a ninth communication 846 transmitted from the AMF 618 to the RAN 622, the AMF 618 sends N2 PDU Session request to the RAN 622 to transmit the N2 SM information received from the PGW-C+SMF 612 by using PDU_Session_Resource_Modify Request.

In certain embodiments, in a tenth communication 848 transmitted from the RAN 622 to the AMF 618, if the RAN 622 decides to reject the PDU session modification or new QoS flow establishment request from the PGW-C+SMF 612 (e.g., the N2 SM request from SMF for QoS flow) for voice service (e.g., based on configuration in the RAN 622 to use E-UTRAN for voice services, and thus to use inter-RAT mobility). The RAN 622 sends a QoS flow rejection indication to the PGW-C+SMF 514 included in an N2 Session response message to the AMF 618. The RAN 622 can also provide a reason for the rejected QoS flow establishment (e.g., non-supported 5QI and inter-system change needed). The RAN 622 may send an indication to the AMF 618 in the N2 Session response message that Inter-System Redirection is required and/or request for establishment of QoS Flow for IMS voice failed. This indicates to the AMF 618 to release the existing N1 connection with the UE 602 in order to initiate re-direction to an E-UTRAN and/or EPC.

In various embodiments, in an eleventh communication 850 transmitted between the AMF 618 and the PGW-C+SMF 612, if received in step 848, the AMF 618 forwards the N2 SM information container to the PGW-C+SMF 612. The AMF 618 may also provide the reason for the rejection of the PGW-C+SMF 612 (e.g., Idle state inter-RAT mobility). Such an indication can be a trigger for the PGW-C+SMF 612 that a specific indication is needed towards the PCRF+PCF 608 to indicate that the UE 602 is temporary not reachable. In addition to the exchange from the AMF 618 to the PGW-C+SMF 612 for the IMS session, this eleventh communication 850 is also performed with all the PGW-C+SMFs allocated to the UE 602 for each PDU Session of the UE 602. For example, the AMF 618 uses Nsmf_PDUSsession_Update_SMContext service operation. The PGW-C+SMF 612 sends a response towards the AMF 618 by using Nsmf_PDUSsesion_Update_SMContext reply. The AMF 618 may decide whether to perform a handover procedure or RRC release with redirection based on the availability of the N26 interface. For example, if the N26 interface is not deployed, the AMF 618 decides to perform idle state mobility, (e.g., RRC release with redirection). The AMF 618 sends N2 UE Context Release Request/Command message to the RAN 622.

In some embodiments, in a twelfth communication 851 transmitted between the PGW-C+SMF 612 and the PCRF+

PCF 608, after receiving a rejection from the RAN 622 for QoS flow establishment for voice service and an indication indicating that inter-RAT mobility (e.g., EPS fallback in Idle state) is ongoing, the PGW-C+SMF 612 initiates PDU Session Modification towards the PCRF+PCF 608 to obtain the E-UTRAN PCC Rules for the PDU Sessions by invoking Nsmf_EventExposure_Notify request and providing the event that generates the notification and the event information. A type of the event is changed in the type of Access Type. Upon receipt, the PCRF+PCF 608 responds by sending Nsmf_EventExposure_Notify reply. As may be appreciated, the PGW-C+SMF 612 may additionally inform the PCRF+PCF 608 that inter-RAT mobility is ongoing in Idles state and the UE 602 is temporary not reachable.

In certain embodiments, in a thirteenth communication 852 transmitted between the PCRF+PCF 608 and the AF+P-CSCF 604, the AF+P-CSCF 604 may subscribe to the radio access type change by employing Npcf_PolicyAuthorization_Subscribe service. The subscription may also be based on the communication system change, any system change or any change that may occur so the UE 602 is unreachable. The PCRF+PCF 608 notifies PDU Session Modification by invoking Npcf_PolicyAuthorization_Notify request to the AF+P-CSCF 604. Upon receipt, the AF+P-CSCF 604 responds by sending Npcf_PolicyAuthorization_Notify reply. From the time the AF+P-CSCF 604 initiates authorization of the necessary resources for the PDU session until the time the AF+P-CSCF 604 receives the need for change of access technology, the AF+P-CSCF 604 may maintain a timer (e.g., timer 1). During this timer the AF+P-CSCF 604 may delay forwarding the Offer Response message it had received in step 636 (first instance that includes SIP 183 session in progress). The AF+P-CSCF 604 may also insert an indication in SIP 183 session in progress for the S-CSCF 606 regarding the need for the terminating UE 602 to change of the access technology. The value for timer 1 may be configured and may be different for different implementations. If timer 1 is exhausted and the AF+P-CSCF 604 has not been notified about any radio access and system changes or any unreachability of the terminating UE 602, the AF+P-CSCF 604 may assume there was no change and interruption in the PDU session modification and/or IMS session establishment. In order to avoid generalizing this delay, the AF+P-CSCF 604 invokes this procedure when the P-Access-Network-Info header field indicates 5G access technology in combination with other header fields showing the MINITEL service is requested.

In various embodiments, in a fourteenth communication 853 transmitted from the AMF 618 to the UE 602, the AMF 618 triggers 'AN release' procedure by sending N2 UE Context Release Request/Command message to the RAN 622. The AMF 618 may include an indication for RAT redirection. The RAN 622 releases the RRC connection and sends a re-direction indication with target cell information. The UE 602 performs cell reselection procedure for a E-UTRAN cell and initiates an RRC Connection establishment and either NAS Tracking Area Update procedure or NAS Attach procedure.

In some embodiments, in a fifteenth communication 854 transmitted from the UE 602 to the E-UTRA 620, the UE 602 shall provide a 4G-GUTI that is mapped from the 5G-GUTI following mapping rules, such as those specified in 3GPP TS 23.501. The UE 602 indicates that it is moving from 5GC.

In certain embodiments, in a sixteenth communication 655 transmitted between the MME 616 and the E-UTRA 620, if the MME 616 determines that the old node is an AMF based on UE's GUTI mapped from 5G-GUTI and the MME 616 is configured to support 5GS-EPS interworking without N26 procedure, the MME 616 sends a TAU Reject to the UE 602. If the TAU was rejected in at the time the UE 602 requests TAU, the IP address preservation is not provided. In embodiments in which the UE 602 provides IMSI in an Attach Request, and does not provide a Request Type "Handover" in the PDN CONNECTIVITY Request if included in the Attach Request. The UE 602 provides an EPS bearer ID for all mapped EPS bearers in the EPS bearer status. For the initial Attach Request the EPS bearer status is empty. The UE 602 is aware the network is configured to support 5GS-EPS interworking without N26 procedure. The UE 602 does not include the EPS bearer IDs corresponding to the 5G QoS flows to the EPS bearer status.

In various embodiments, in a seventeenth communication 856 transmitted from the UE 602 to the E-UTRA 620, the UE 602 sends an Attach Request with a modification that the UE 602 constructs the Attach Request message for the UE 602 to operate in single-registration mode. The UE 602 indicates that it is moving from 5GC and provides 4G-GUTI mapped from 5G-GUTI. If the UE 602 wants to transfer a PDU Session to EPC as part of the Attach procedure, it includes a PDN CONNECTIVITY Request message in the Attach Request and provides a Request type "Handover," DNN/APN and PDU Session ID of the PDU Session. The UE 602 provides the PDU Session ID in PCO.

In some embodiments, in an eighteenth communication 857 transmitted from the E-UTRA 620 to the MME 616 and in a nineteenth communication 858 transmitted between the HSS+UDM 624, the RAN 622, the E-UTRA 620, the AMF 618, the MME 616, the SGW 614, the PGW-C+SMF 612, the PGW-U+UPF 610, the PCRF+PCF 608, the S-CSCF 606, the AF+P-CSCF 604, and the UE 602, the Attach Request from the E-UTRA 620 is transmitted to the MME 616 and the procedures for initial attach to E-UTRAN are performed. As may be appreciated, if the UE 602 provided a 4G-GUTI mapped from 5G-GUTI and the MME 616 is configured to support 5GS-EPS interworking without N26 procedure, the MME 616 does not perform an identity request to an old MME/SGSN/AMF In certain embodiments, in a twentieth communication 859 transmitted between the HSS+UDM 624 and the MME 616, an Update Location is performed such that if the MME 616 determines that the old node is an AMF 618 based on the indication from the UE 602 and the MME 616 is configured to support 5GS-EPS interworking without N26 procedure, the MME 616 does not include the "initial attach" indication in its communications with the HSS+UDM 624. The HSS+UDM 624 does not send cancel location to the old AMF. The subscription profile the MME 616 receives from the HSS+UDM 624 includes the DNN/APN and PGW-C+SMF 612 ID for each PDU Session established in 5GC.

In various embodiments, in a twenty-first communication 860 transmitted between the E-UTRA 620, the AMF 618, the MME 616, the SGW 614, the PGW-C+SMF 612, the PGW-U+UPF 610, the PCRF+PCF 608, the S-CSCF 606, the AF+P-CSCF 604, and the UE 602, the UE 602 correlates the ongoing QoS flows with the indicated EPS Bearer IDs to be setup in the HO command. The UE 602 locally deletes the PDU Session if the QoS flow of the default QoS rule in the PDU Session does not have an EPS Bearer ID assigned. For the remaining PDU Sessions, the UE 602 locally deletes the QoS flows that do not have an EPS bearer ID assigned. The UE 602 deletes any UE derived QoS rules. The EPS Bearer ID that was assigned for the QoS flow of the default QoS rule in the PDU Session becomes the EPS Bearer ID of the default bearer in the corresponding PDN connection. For the QoS Flows indicated in the "QoS Flows for Data Forwarding," the RAN 622 initiates data forwarding via to the PGW-U+UPF 610 based on the CN Tunnel Info for Data Forwarding per PDU Session. Then the PGW-U+UPF 610 maps data received from the data forwarding tunnels in the 5GS to the data forwarding tunnels in EPS, and sends the data to the E-UTRA 620 via the SGW 614.

Data may be transmitted 861 between the E-UTRA 620, the AMF 618, the MME 616, the SGW 614, the PGW-C+SMF 612, the PGW-U+UPF 610, the PCRF+PCF 608, the S-CSCF 606, the AF+P-CSCF 604, and the UE 602 in the EPS.

In some embodiments, in a twenty-second communication 862 transmitted between the SGW 614 and the MME 616, the SGW 614 informs the MME 616 of the relocation by sending the Modify Bearer Request message for each PDN connection.

In certain embodiments, in a twenty-third communication 863 transmitted between the PGW-C+SMF 612 and the SGW 614, the PGW-C+SMF 612 locally deletes the PDU Session if the QoS flow of the default QoS rule in the PDU Session does not have an EPS Bearer ID assigned. For the remaining PDU Sessions, the PGW-C+SMF 612 locally deletes the QoS Flows that do not have an EPS bearer ID assigned.

Modified data may be transmitted 864 between the E-UTRA 620, the AMF 618, the MME 616, the SGW 614, the PGW-C+SMF 612, the PGW-U+UPF 610, the PCRF+PCF 608, the S-CSCF 606, the AF+P-CSCF 604, and the UE 602 in the EPS.

In various embodiments, in a twenty-fourth communication 865 transmitted from the AF+P-CSCF 604 to the UE 602, the AF+P-CSCF 604 may transmit a SIP 183 message to the UE 602.

In some embodiments, in a twenty-fifth communication 866 transmitted from the UE 602 to the AF+P-CSCF 604, the UE 602 may transmit a PRACK message to the AF+P-CSCF 604.

Depending on the bearer establishment mode selected for the IP CAN session, resource reservation shall be initiated 867 either by the UE 602 or by the IP CAN itself. The UE 602 initiates the reservation procedures for the resources needed for this session. Otherwise, the IP CAN initiates the reservation of required resources after step 866.

In various embodiments, in a twenty-sixth communication 868 transmitted from the AF+P-CSCF 604 to the S-CSCF 606 and in a twenty-seventh communication 869 transmitted from the S-CSCF 606 to the PCRF+PCF 608, a PRACK message may be forwarded to the PCRF+PCF 608.

In some embodiments, in a twenty-eighth communication 870 transmitted from the PCRF+PCF 608 to the S-CSCF 606, in a twenty-ninth communication 871 transmitted from the S-CSCF 606 to the AF+P-CSCF 604, and in a thirtieth communication 872 transmitted from the AF+P-CSCF 604 to the UE 602, a SIP 200 OK message may be forwarded from the PCRF+PCF 608 to the UE 602.

In various embodiments, in a thirty-first communication 873 transmitted from the UE 602 to the AF+P-CSCF 604, in a thirty-second communication 874 transmitted from the AF+P-CSCF 604 to the S-CSCF 606, and in a thirty-third communication 875 transmitted from the S-CSCF 606 to the PCRF+PCF 608, the UE 602 may provide a SIP UPDATE message that is forward to the PCRF+PCF 608.

In certain embodiments, in a thirty-fourth communication 876 transmitted from the PCRF+PCF 608 to the S-CSCF 606, in a thirty-fifth communication 877 transmitted from the S-CSCF 606 to the AF+P-CSCF 604, and in a thirty-sixth communication 878 transmitted from the AF+P-CSCF 604 to the UE 602, a SIP 200 OK message may be forwarded from the PCRF+PCF 608 to the UE 602.

In some embodiments, in a thirty-seventh communication 879 transmitted from the PCRF+PCF 608 to the S-CSCF 606, in a thirty-eighth communication 880 transmitted from the S-CSCF 606 to the AF+P-CSCF 604, and in a thirty-ninth communication 881 transmitted from the AF+P-CSCF 604 to the UE 602, a SIP 180 message may be forwarded from the PCRF+PCF 608 to the UE 602.

The UE alerts 882 the destination user of an incoming session setup attempt.

In various embodiments, in a fortieth communication 883 transmitted from the PCRF+PCF 608 to the S-CSCF 606 and in a forty-first communication 884 transmitted from the S-CSCF 606 to the AF+P-CSCF 604, the PCRF+PCF 608 transmits a SIP 200 OK message toward the AF+P-CSCF 604.

In various embodiments, in a forty-second communication 885 transmitted between the E-UTRA 620, the AMF 618, the MME 616, the SGW 614, the PGW-C+SMF 612, the PGW-U+UPF 610, the PCRF+PCF 608, the S-CSCF 606, the AF+P-CSCF 604, and the UE 602, upon receipt of the SIP 200 OK by the AF+P-CSCF 604, the AF+P-CSCF 604 indicates to PCRF+PCF 608 and the authorized media flows for this session is now enabled via PGW-C+SMF 612 and PGW-U+UPF 610, and the UE 602 starts the media flows for this session.

In certain embodiments, in a forty-third communication 886 transmitted from the AF+P-CSCF 604 to the UE 602, the AF+P-CSCF 604 forwards a 200 OK to the UE 602.

In various embodiments, in a forty-fourth communication 887 transmitted from the UE 602 to the AF+P-CSCF 604, a forty-fifth communication 888 transmitted from the AF+P-CSCF 604 to the S-CSCF 606, and a forty-sixth communication 889 transmitted from the S-CSCF 606 to the PCRF+PCF 608, the UE 602 responds to the 200 OK by sending a SIP ACK message to the PCRF+PCF 608.

In another embodiment which may be applicable to all previous described embodiments, the AF+P-CSCF may communicate directly with the AMF over an SBI Namf. The AF+P-CSCF may have subscribed to the UE mobility event such as access network type. If the AMF detects a change in the UE access and mobility event, it invokes Namf_EventExposure_Notify service operation to the AF+P-CSCF. The P-CSCF address is allocated by the UPF at PDU Session establishment and provisioned to the SMF at this time. The SMF provides the P-CSCF address to the AMF. In case the UE is not an IMS subscriber, no P-CSCF will be allocated to the UE. The AMF then takes the corresponding steps for EPS fallback/handover as described in the embodiments before. The Namf_EventExposure_Notify may contain information that handover/fallback is in progress and that the IMS client is aware of the RAT and/or system change and is temporary unreachable. This may be illustrated as in FIG. 9 step 947 at which the AMF may notify the AF+P-CSCF about any RAT and/or system or UE unreachability.

Figure 9:
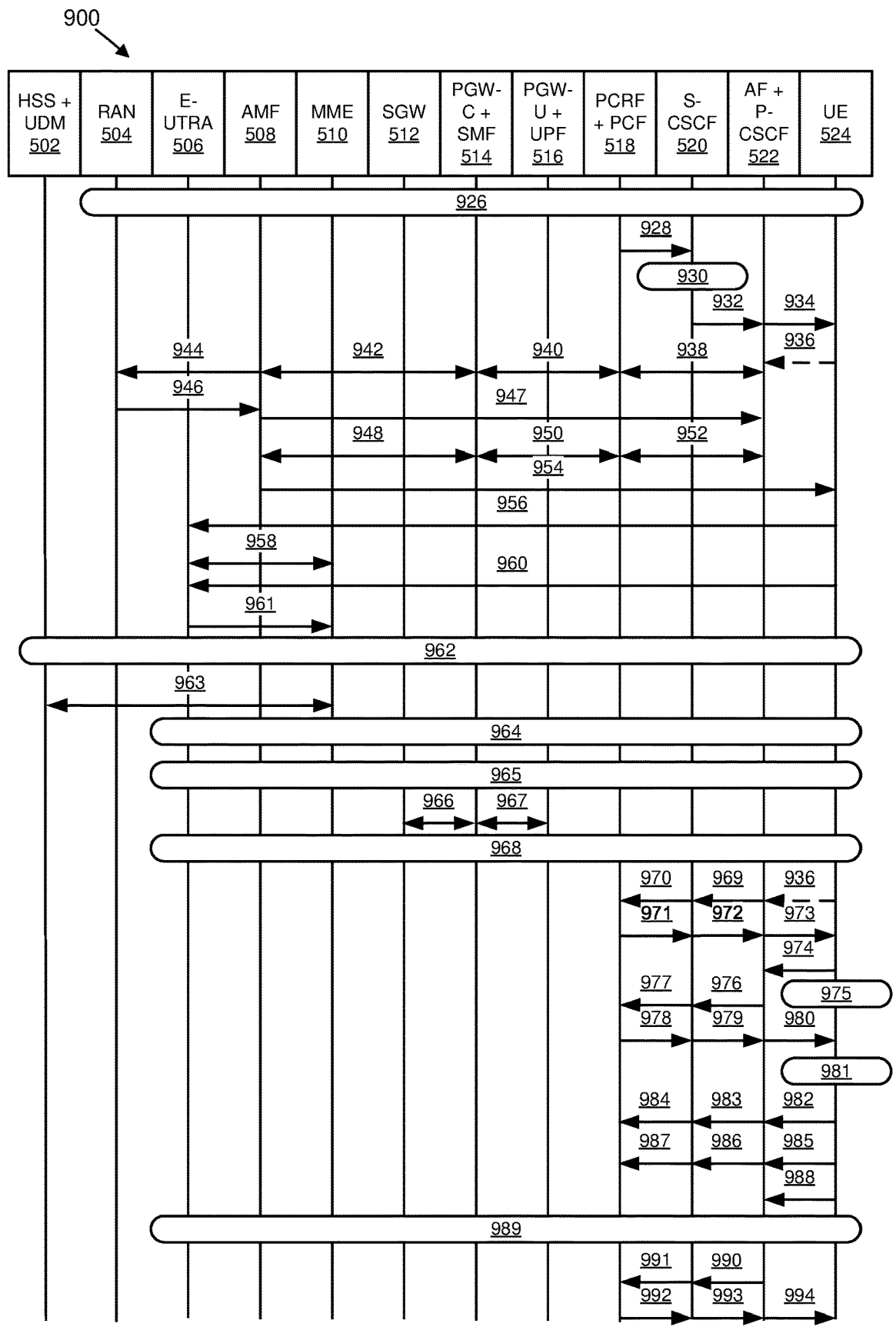
FIG. 9 is a schematic block diagram illustrating another embodiment of communications for EPS fallback without N26 employed and terminating at a UE.

FIG. 9 is a schematic block diagram illustrating another embodiment of communications 900 for EPS fallback without N26 employed and terminating at a UE. The communications 900 illustrated occur between an HSS+UDM 502, a RAN (e.g., NG-RAN) 504, an E-UTRA 506, an AMF 508, an MME 510, an SGW 512, a PGW-C+SMF 514, a PGW-U+UPF 516, a PCRF+PCF 518, a S-CSCF 520, an AF+P-

CSCF 522, and a UE 524. As may be appreciated, any of the communications 900 described herein may include one or more messages.

The network may setup 926 a PDU session and QoS flow in 5GS. Moreover, in one embodiment, in a first communication 928 transmitted from the PCRF+PCF 518 to the S-CSCF 520, the PCRF+PCF 518 may send a SIP INVITE request containing an initial SDP offer towards the S-CSCF 520.

The S-CSCF 520 validates 930 the service profile and invokes any termination service logic required for this user. This may include authorization of the requested SDP based on the user's subscription for multi-media services.

In some embodiments, in a second communication 932 transmitted from the S-CSCF 520 to the AF+P-CSCF 522, the S-CSCF 520 remembers (e.g., from the registration procedure) the next hop CSCF for the UE 524 and forwards the invite to the AF+P-CSCF 522 in the visited network.

In certain embodiments, in a third communication 934 transmitted from the AF+P-CSCF 522 to the UE 524, if the AF+P-CSCF 522 determines that the termination is for an MPS session, the AF+P-CSCF 522 derives the session information and invokes dynamic policy sending the derived session information to the PCRF+PCF 518, the AF+P-CSCF 522 remembers (e.g., from the registration procedure) the UE 524 address, and forwards the invite to the UE 524.

In various embodiments, in a fourth communication 936 transmitted from the UE 524 to the AF+P-CSCF 522 at one of two possible times, the UE 524 determines the subset of the media flows proposed by the originating endpoint that it supports, and responds to the AF+P-CSCF 522 with an offer response message back to the originator. The SDP may represent one or more media for a multi-media session.

With steps 938 through 968, the AF+P-CSCF 522 authorizes the resources necessary for this session.

In some embodiments, in a fifth communication 938 transmitted between the AF+P-CSCF 522 and the PCRF+PCF 518, AF+P-CSCF 522 transmits the Npcf_PolicyAuthorization_Create request containing the IP address of the UE 524 and the application identifier towards the PCRF+PCF 518. The AF+P-CSCF 522 will receive the Npcf_PolicyAuthorization_Create reply.

In certain embodiments, in a sixth communication 940 transmitted between the PCRF+PCF 518 and the PGW-C+SMF 514, the PCRF+PCF 518 employs Npcf_SMPolicyControl_UpdateNotify request to provide the PGW-C+SMF 514 (or SMF) the updated session management related policy for the PDU session. The PGW-C+SMF 514 responds by Npcf_SMPolicyControl_UpdateNotify reply upon receipt of the request.

In various embodiments, in a seventh communication 942 transmitted between the PGW-C+SMF 514 and the AMF 508, the PGW-C+SMF 514 invokes service operation to the AMF 508 to transmit N2 SM information to the RAN 504 (e.g., Namf_Communication_N1N2MessageTransfer (SM Context ID, N2 SM information (PDU Session ID, N3 tunnel information, QFI(s), QoS Profile(s), Session-AMBR)). It is assumed that the UE 524 is in CM-CONNECTED state and the AMF has established N2 transport association with the RAN 504 (and therefore no Paging procedure is needed).

In some embodiments, in an eighth communication 944 transmitted from the AMF 508 to the RAN 504, the AMF 508 sends N2 PDU Session request to the RAN 504 to transmit the N2 SM information received from the PGW-C+SMF 514 by using PDU_Session_Resource_Modify Request.

In certain embodiments, in a ninth communication 946 transmitted from the RAN 504 to the AMF 508, if the RAN 504 decides to reject the PDU session modification or new QoS flow establishment request from the PGW-C+SMF 514 (e.g., the N2 SM request from SMF for QoS flow) for voice service (e.g., based on configuration in the RAN 504 to use E-UTRAN for voice services, and thus to use inter-RAT mobility). The RAN 504 sends a QoS flow rejection indication to the PGW-C+SMF 514 included in an N2 Session response message to the AMF 508. The RAN 504 can also provide a reason for the rejected QoS flow establishment (e.g., non-supported 5QI and inter-system change needed). The RAN 504 may send an indication to the AMF 508 in the N2 Session response message that Inter-System Redirection is required and/or request for establishment of QoS Flow for IMS voice failed. This indicates to the AMF 508 to release the existing N1 connection with the UE 524 in order to initiate re-direction to an E-UTRAN and/or EPC.

In one embodiment, in an alternate tenth communication 947 transmitted from the AMF 508 to the AF+P-CSCF 522, the AMF 508 may notify the AF+P-CSCF 522 about any RAT and/or system or UE unreachability.

In various embodiments, in a tenth communication 948 transmitted between the AMF 508 and the PGW-C+SMF 514, if received in step 946, the AMF 508 forwards the N2 SM information container to the PGW-C+SMF 514. The AMF 508 may also provide the reason for the rejection of the PGW-C+SMF 514 (e.g., Idle state inter-RAT mobility). Such an indication can be a trigger for the PGW-C+SMF 514 that a specific indication is needed towards the PCRF+PCF 518 to indicate that the UE 524 is temporary not reachable. In addition to the exchange from the AMF 508 to the PGW-C+SMF 514 for the IMS session, this tenth communication 948 is also performed with all the PGW-C+SMFs allocated to the UE 524 for each PDU Session of the UE 524. For example, the AMF 508 uses Nsmf_PDUSsesion_Update_SMContext service operation. The PGW-C+SMF 514 sends a response towards the AMF 508 by using Nsmf_PDUSsesion_Update_SMContext reply. The AMF 508 may decide whether to perform a handover procedure or RRC release with redirection based on the availability of the N26 interface. For example, if the N26 interface is not deployed, the AMF 508 decides to perform idle state mobility, (e.g., RRC release with redirection). The AMF 508 sends N2 UE Context Release Request/Command message to the RAN 504.

In some embodiments, in an eleventh communication 950 transmitted between the PGW-C+SMF 514 and the PCRF+PCF 518, after receiving a rejection from the RAN 504 for QoS flow establishment for voice service and an indication indicating that inter-RAT mobility (e.g., EPS fallback in Idle state) is ongoing, the PGW-C+SMF 514 initiates PDU Session Modification towards the PCRF+PCF 518 to obtain the E-UTRAN PCC Rules for the PDU Sessions by invoking Nsmf_EventExposure_Notify request and providing the event that generates the notification and the event information. A type of the event is changed in the type of Access Type. Upon receipt, the PCRF+PCF 518 responds by sending Nsmf_EventExposure_Notify reply. As may be appreciated, the PGW-C+SMF 514 may additionally inform the PCRF+PCF 518 that inter-RAT mobility is ongoing in Idles state and the UE 524 is temporary not reachable.

In certain embodiments, in a twelfth communication 952 transmitted between the PCRF+PCF 518 and the AF+P-CSCF 522, the AF+P-CSCF 522 may subscribe to the radio access type change by employing Npcf_PolicyAuthorization_Subscribe service. The subscription may also be based on the communication system change, any system change or any change that may occur so the UE 524 is unreachable. The PCRF+PCF 518 notifies PDU Session Modification by invoking Npcf_PolicyAuthorization_Notify request to the AF+P-CSCF 522. Upon receipt, the AF+P-CSCF 522 responds by sending Npcf_PolicyAuthorization_Notify reply. From the time the AF+P-CSCF 522 initiates authorization of the necessary resources for the PDU session until the time the AF+P-CSCF 522 receives the need for change of access technology, the AF+P-CSCF 522 may maintain a timer (e.g., timer 1). During this timer the AF+P-CSCF 522 may delay forwarding the Offer Response message it had received in step 536 (first instance that includes SIP 183 session in progress). The AF+P-CSCF 522 may also insert an indication in SIP 183 session in progress for the S-CSCF 520 regarding the need for the terminating UE 524 to change of the access technology. The value for timer 1 may be configured and may be different for different implementations. If timer 1 is exhausted and the AF+P-CSCF 522 has not been notified about any radio access and system changes or any unreachability of the terminating UE 524, the AF+P-CSCF 522 may assume there was no change and interruption in the PDU session modification and/or IMS session establishment. In order to avoid generalizing this delay, the AF+P-CSCF 522 invokes this procedure when the P-Access-Network-Info header field indicates 5G access technology in combination with other header fields showing the MINITEL service is requested.

In various embodiments, in a thirteenth communication 954 transmitted from the AMF 508 to the UE 524, the AMF 508 triggers 'AN release' procedure by sending N2 UE Context Release Request/Command message to the RAN 504. The AMF 508 may include an indication for RAT redirection. The RAN 504 releases the RRC connection and sends a re-direction indication with target cell information. The UE 524 performs cell reselection procedure for a E-UTRAN cell and initiates an RRC Connection establishment and either NAS Tracking Area Update procedure or NAS Attach procedure.

In some embodiments, in a fourteenth communication 956 transmitted from the UE 524 to the E-UTRA 506, the UE 524 shall provide a 4G-GUTI that is mapped from the 5G-GUTI following mapping rules, such as those specified in 3GPP TS 23.501. The UE 524 indicates that it is moving from 5GC.

In certain embodiments, in a fifteenth communication 958 transmitted between the MME 510 and the E-UTRA 506, if the MIME 510 determines that the old node is an AMF based on UE's GUTI mapped from 5G-GUTI and the MME 510 is configured to support 5GS-EPS interworking without N26 procedure, the MME 510 sends a TAU Reject to the UE 524. If the TAU was rejected in at the time the UE 524 requests TAU, the IP address preservation is not provided. In embodiments in which the UE 524 provides IMSI in an Attach Request, and does not provide a Request Type "Handover" in the PDN CONNECTIVITY Request if included in the Attach Request. The UE 524 provides an EPS bearer ID for all mapped EPS bearers in the EPS bearer status. For the initial Attach Request the EPS bearer status is empty. The UE 524 is aware the network is configured to support 5GS-EPS interworking without N26 procedure. The UE 524 does not include the EPS bearer IDs corresponding to the 5G QoS flows to the EPS bearer status.

In various embodiments, in a sixteenth communication 960 transmitted from the UE 524 to the E-UTRA 506, the UE 524 sends an Attach Request with a modification that the UE 524 constructs the Attach Request message for the UE 524 to operate in single-registration mode. The UE 524 indicates that it is moving from 5GC and provides 4G-GUTI mapped from 5G-GUTI. If the UE 524 wants to transfer a PDU Session to EPC as part of the Attach procedure, it includes a PDN CONNECTIVITY Request message in the Attach Request and provides a Request type "Handover," DNN/APN and PDU Session ID of the PDU Session. The UE 524 provides the PDU Session ID in PCO.

In some embodiments, in a seventeenth communication 961 transmitted from the E-UTRA 506 to the MME 510 and in an eighteenth communication 962 transmitted between the HSS+UDM 502, the RAN 504, the E-UTRA 506, the AMF 508, the MME 510, the SGW 512, the PGW-C+SMF 514, the PGW-U+UPF 516, the PCRF+PCF 518, the S-CSCF 520, the AF+P-CSCF 522, and the UE 524, the Attach Request from the E-UTRA 506 is transmitted to the MME 510 and the procedures for initial attach to E-UTRAN are performed. As may be appreciated, if the UE 524 provided a 4G-GUTI mapped from 5G-GUTI and the MME 510 is configured to support 5GS-EPS interworking without N26 procedure, the MME 510 does not perform an identity request to an old MME/SGSN/AMF In certain embodiments, in a nineteenth communication 963 transmitted between the HSS+UDM 502 and the MME 520, an Update Location is performed such that if the MME 520 determines that the old node is an AMF 508 based on the indication from the UE 524 and the MME 520 is configured to support 5GS-EPS interworking without N26 procedure, the MME 520 does not include the "initial attach" indication in its communications with the HSS+UDM 502. The HSS+UDM 502 does not send cancel location to the old AMF. The subscription profile the MME 510 receives from the HSS+UDM 502 includes the DNN/APN and PGW-C+SMF 514 ID for each PDU Session established in 5GC.

In various embodiments, in a twentieth communication 964 transmitted between the E-UTRA 506, the AMF 508, the MME 510, the SGW 512, the PGW-C+SMF 514, the PGW-U+UPF 516, the PCRF+PCF 518, the S-CSCF 520, the AF+P-CSCF 522, and the UE 524, the UE 524 correlates the ongoing QoS flows with the indicated EPS Bearer IDs to be setup in the HO command. The UE 524 locally deletes the PDU Session if the QoS flow of the default QoS rule in the PDU Session does not have an EPS Bearer ID assigned. For the remaining PDU Sessions, the UE 524 locally deletes the QoS flows that do not have an EPS bearer ID assigned. The UE 524 deletes any UE derived QoS rules. The EPS Bearer ID that was assigned for the QoS flow of the default QoS rule in the PDU Session becomes the EPS Bearer ID of the default bearer in the corresponding PDN connection. For the QoS Flows indicated in the "QoS Flows for Data Forwarding," the RAN 504 initiates data forwarding via to the PGW-U+UPF 516 based on the CN Tunnel Info for Data Forwarding per PDU Session. Then the PGW-U+UPF 516 maps data received from the data forwarding tunnels in the 5GS to the data forwarding tunnels in EPS, and sends the data to the E-UTRA 506 via the SGW 512.

Data may be transmitted 965 between the E-UTRA 506, the AMF 508, the MME 510, the SGW 512, the PGW-C+SMF 514, the PGW-U+UPF 516, the PCRF+PCF 518, the S-CSCF 520, the AF+P-CSCF 522, and the UE 524 in the EPS.

In some embodiments, in a twenty-first communication 966 transmitted between the SGW 512 and the PGW-C+SMF 514, the SGW 512 informs the PGW-C+SMF 514 of the relocation by sending the Modify Bearer Request message for each PDN connection.

In certain embodiments, in a twenty-second communication 967 transmitted between the PGW-C+SMF 514 and the PGW-U+UPF 516, the PGW-C+SMF 514 locally deletes the PDU Session if the QoS flow of the default QoS rule in the PDU Session does not have an EPS Bearer ID assigned. For the remaining PDU Sessions, the PGW-C+SMF 514 locally deletes the QoS Flows that do not have an EPS bearer ID assigned.

Modified data may be transmitted 968 between the E-UTRA 506, the AMF 508, the MME 510, the SGW 512, the PGW-C+SMF 514, the PGW-U+UPF 516, the PCRF+PCF 518, the S-CSCF 520, the AF+P-CSCF 522, and the UE 524 in the EPS.

In certain embodiments, in a twenty-third communication 969 transmitted from the AF+P-CSCF 522 to the S-CSCF 520, the AF+P-CSCF 522 forwards the Offer Response message in the SIP 183 session in progress to the S-CSCF 520.

In various embodiments, in a twenty-fourth communication 970 transmitted from the S-CSCF 520 to the PCRF+PCF 518, the S-CSCF 520 forwards the Offer Response message in the SIP 183 session in progress to the PCRF+PCF 518 (e.g., the originator).

In some embodiments, in a twenty-fifth communication 971 transmitted from the PCRF+PCF 518 to the S-CSCF 520, the PCRF+PCF 518 (e.g., the originating endpoint) sends a Response Confirmation as a SIP PRACK message to the S-CSCF 520. The Response Confirmation may also contain SDP. This may be the same SDP as in the Offer Response sent in step 970 or a subset. If new media are defined by this SDP, a new authorization may be done by the AF+P-CSCF 522 and PCRF+PCF 518 following step 974. The originating UE 524 is free to continue to offer new media on this operation or on subsequent exchanges using the Update method. Each offer and/or answer exchange will cause the AF+P-CSCF 522 and PCRF+PCF 518 to repeat authorization again.

In certain embodiments, in a twenty-sixth communication 972 transmitted from the S-CSCF 520 to the AF+P-CSCF 522, the S-CSCF 520 forwards the Response Confirmation as a SIP PRACK message to AF+P-CSCF 522.

In various embodiments, in a twenty-seventh communication 973 transmitted from the AF+P-CSCF 522 to the UE 524, if the PCRF+PCF 518 received an indication that inter-RAT mobility is ongoing, the PCRF+PCF 518 may inform the AF+P-CSCF 522 to temporary hold-on the IMS signaling towards the UE 524 until at least the default bearer is established in the target RAT and/or system. Upon receipt the Response Confirmation as a PRACK message, the AF+P-CSCF 522 should evaluate the elapsed time initiated at the time when AF+P-CSCF 522 was notified that change of access technology was required to this step. If the time has elapsed for a predetermined and/or preconfigured time which is timer 2, the AF+P-CSCF 522 forwards the Response Confirmation to the UE 524. Otherwise, the AF+P-CSCF 522 shall wait until timer 2 is exhausted before forwarding the Response Confirmation to the UE 524. The AF+P-CSCF 522 may also retry if it does not receive the acknowledgement for the Response Confirmation by the terminating UE 524 in step 578 or SIP 200 ok response. If the S-CSCF 520 was informed for the access change timer 2 would be implemented against the S-CSCF 520.

In some embodiments, in a twenty-eighth communication 974 transmitted from the UE 524 to the AF+P-CSCF 522, the UE 524 responds to the Response Confirmation with an acknowledgement as a SIP 200 OK response. If Optional SDP is contained in the Response Confirmation, the acknowledgement (e.g., SIP 200 OK) will also contain an SDP response. If the SDP has changed, the AF+P-CSCF 522 authorizes that the resources are allowed to be used. Since timer 2 has been exhausted, the UE 524 is now on the EPS access technology. The UE 524 shall therefore begin to insert from now onwards the new access technology in the PANI header field in the SIP messages.

Depending on the bearer establishment mode selected for the IP CAN session, resource reservation shall be initiated 975 either by the UE 524 or by the IP CAN itself. The UE 524 initiates the reservation procedures for the resources needed for this session. Otherwise, the IP CAN initiates the reservation of required resources after step 968.

In various embodiments, in a twenty-ninth communication 976 transmitted from the AF+P-CSCF 522 to the S-CSCF 520 and in a thirtieth communication 977 transmitted from the S-CSCF 520 to the PCRF+PCF 518, the acknowledgement (e.g., 200 OK response) is forwarded to the originating end point.

In some embodiments, in a thirty-first communication 978 transmitted from the PCRF+PCF 518 to the S-CSCF 520, in a thirty-second communication 979 transmitted from the S-CSCF 520 to the AF+P-CSCF 522, and in a thirty-third communication 980 transmitted from the AF+P-CSCF 522 to the UE 524, when the originating endpoint (e.g., the PCRF+PCF 518) has completed its resource reservation, it sends the successful Resource Reservation message as a SIP UPDATE message towards S CSCF. The S-CSCF 520 forwards the message toward the terminating endpoint along the signaling path.

The UE alerts 981 the destination user of an incoming session setup attempt.

In various embodiments, in a thirty-fourth communication 982 transmitted from the UE 524 to the AF+P-CSCF 522, in a thirty-fifth communication 983 transmitted from the AF+P-CSCF 522 to the S-CSCF 520, and in a thirty-sixth communication 984 transmitted from the S-CSCF 520 to the PCRF+PCF 518, the UE 524 responds to the successful resource reservation by a SIP 200 OK response and the message is forwarded to the originating end (e.g., the PCRF+PCF 518).

In some embodiments, in a thirty-seventh communication 985 transmitted from the UE 524 to the AF+P-CSCF 522, in a thirty-eighth communication 986 transmitted from the AF+P-CSCF 522 to the S-CSCF 520, and in a thirty-ninth communication 987 transmitted from the S-CSCF 520 to the PCRF+PCF 518, the UE 524 may alert the user and wait for an indication from the user before completing the session. If so, it indicates this to the originating party by a provisional SIP 180 ringing response indicating Ringing. This message is sent to AF+P-CSCF 522 and along the signaling path to the originating end (e.g., the PCRF+PCF 518).

In certain embodiments, in a fortieth communication 988 transmitted from the UE 524 to the AF+P-CSCF 522, when the destination party answers, the UE 524 sends a SIP 200 OK final response to the AF+P-CSCF 522.

In various embodiments, in a forty-first communication 989 transmitted between the E-UTRA 506, the AMF 508, the MME 510, the SGW 512, the PGW-C+SMF 514, the PGW-U+UPF 516, the PCRF+PCF 518, the S-CSCF 520, the AF+P-CSCF 522, and the UE 524, upon receipt of the SIP 200 OK by the AF+P-CSCF 522, the AF+P-CSCF 522 indicates to PCRF+PCF 518 and the authorized media flows for this session is now enabled via PGW-C+SMF 514 and PGW-U+UPF 516, and the UE 524 starts the media flows for this session.

In certain embodiments, in a forty-second communication 990 transmitted from the AF+P-CSCF 522 to the S-CSCF 520 and a forty-third communication 991 transmitted from the S-CSCF 520 to the PCRF+PCF 518, the AF+P-CSCF 522 forwards the 200 OK to the S-CSCF 520, following the signaling path.

In various embodiments, in a forty-fourth communication 992 transmitted from the PCRF+PCF 518 to the S-CSCF 520, a forty-fifth communication 993 transmitted from the S-CSCF 520 to the AF+P-CSCF 522, and a forty-sixth communication 994 transmitted from the AF+P-CSCF 522 to the UE 524, the session originator (e.g., the PCRF+PCF 518) responds to the 200 OK by sending a SIP ACK message to the S-CSCF 520 and it is forwarded to the terminating end along the signaling path.

In another embodiment which may be applicable to all previous described embodiments, the PCRF+PCF may communicate directly with the AMF over an SBI Namf. The PCRF+PCF may have subscribed to the UE mobility event such as access network type. When the AMF detects a change in the UE access and mobility event, it invokes Namf_EventExposure_Notify service operation to the PCRF+PCF. The AMF then takes the corresponding steps for EPS fallback/handover as described in the embodiments before. The Namf_EventExposure_Notify may contain information that handover/fallback is in progress and that the IMS client is aware of the RAT and/or system change and is temporary unreachable. This may be illustrated as in the following figure where step 1047 shows that AMF may notify the PCRF+PCF about any RAT and/or system or UE unreachability.

Figure 10:
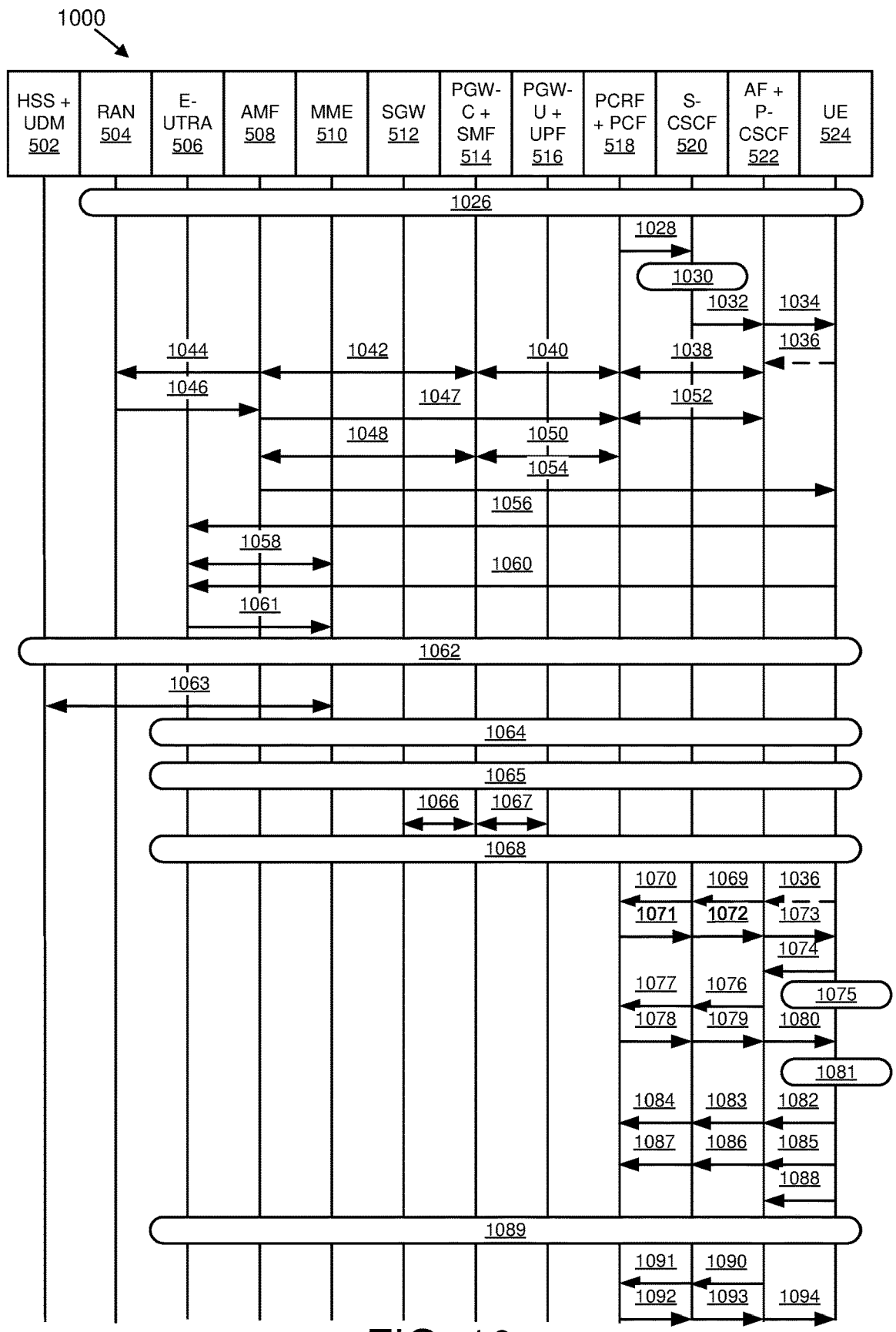
FIG. 10 is a schematic block diagram illustrating a further embodiment of communications for EPS fallback without N26 employed and terminating at a UE.

FIG. 10 is a schematic block diagram illustrating a further embodiment of communications 1000 for EPS fallback without N26 employed and terminating at a UE. The communications 1000 illustrated occur between an HSS+UDM 502, a RAN (e.g., NG-RAN) 504, an E-UTRA 506, an AMF 508, an MME 510, an SGW 512, a PGW-C+SMF 514, a PGW-U+UPF 516, a PCRF+PCF 518, a S-CSCF 520, an AF+P-CSCF 522, and a UE 524. As may be appreciated, any of the communications 1000 described herein may include one or more messages.

The network may setup 1026 a PDU session and QoS flow in 5GS. Moreover, in one embodiment, in a first communication 1028 transmitted from the PCRF+PCF 518 to the S-CSCF 520, the PCRF+PCF 518 may send a SIP INVITE request containing an initial SDP offer towards the S-CSCF 520.

The S-CSCF 520 validates 1030 the service profile and invokes any termination service logic required for this user. This may include authorization of the requested SDP based on the user's subscription for multi-media services.

In some embodiments, in a second communication 1032 transmitted from the S-CSCF 520 to the AF+P-CSCF 522, the S-CSCF 520 remembers (e.g., from the registration procedure) the next hop CSCF for the UE 524 and forwards the invite to the AF+P-CSCF 522 in the visited network.

In certain embodiments, in a third communication 1034 transmitted from the AF+P-CSCF 522 to the UE 524, if the AF+P-CSCF 522 determines that the termination is for an MPS session, the AF+P-CSCF 522 derives the session information and invokes dynamic policy sending the derived session information to the PCRF+PCF 518, the AF+P-CSCF 522 remembers (e.g., from the registration procedure) the UE 524 address, and forwards the invite to the UE 524.

In various embodiments, in a fourth communication 1036 transmitted from the UE 524 to the AF+P-CSCF 522 at one of two possible times, the UE 524 determines the subset of the media flows proposed by the originating endpoint that it supports, and responds to the AF+P-CSCF 522 with an offer response message back to the originator. The SDP may represent one or more media for a multi-media session.

With steps 1038 through 1068, the AF+P-CSCF 522 authorizes the resources necessary for this session.

In some embodiments, in a fifth communication 1038 transmitted between the AF+P-CSCF 522 and the PCRF+PCF 518, AF+P-CSCF 522 transmits the Npcf_PolicyAuthorization_Create request containing the IP address of the UE 524 and the application identifier towards the PCRF+PCF 518. The AF+P-CSCF 522 will receive the Npcf_PolicyAuthorization_Create reply.

In certain embodiments, in a sixth communication 1040 transmitted between the PCRF+PCF 518 and the PGW-C+SMF 514, the PCRF+PCF 518 employs Npcf_SMPolicyControl_UpdateNotify request to provide the PGW-C+SMF 514 (or SMF) the updated session management related policy for the PDU session. The PGW-C+SMF 514 responds by Npcf_SMPolicyControl_UpdateNotify reply upon receipt of the request.

In various embodiments, in a seventh communication 1042 transmitted between the PGW-C+SMF 514 and the AMF 508, the PGW-C+SMF 514 invokes service operation to the AMF 508 to transmit N2 SM information to the RAN 504 (e.g., Namf_Communication_N1N2MessageTransfer (SM Context ID, N2 SM information (PDU Session ID, N3 tunnel information, QFI(s), QoS Profile(s), Session-AMBR)). It is assumed that the UE 524 is in CM-CONNECTED state and the AMF has established N2 transport association with the RAN 504 (and therefore no Paging procedure is needed).

In some embodiments, in an eighth communication 1044 transmitted from the AMF 508 to the RAN 504, the AMF 508 sends N2 PDU Session request to the RAN 504 to transmit the N2 SM information received from the PGW-C+SMF 514 by using PDU_Session_Resource_Modify Request.

In certain embodiments, in a ninth communication 1046 transmitted from the RAN 504 to the AMF 508, if the RAN 504 decides to reject the PDU session modification or new QoS flow establishment request from the PGW-C+SMF 514 (e.g., the N2 SM request from SMF for QoS flow) for voice service (e.g., based on configuration in the RAN 504 to use E-UTRAN for voice services, and thus to use inter-RAT mobility). The RAN 504 sends a QoS flow rejection indication to the PGW-C+SMF 514 included in an N2 Session response message to the AMF 508. The RAN 504 can also provide a reason for the rejected QoS flow establishment (e.g., non-supported 5QI and inter-system change needed). The RAN 504 may send an indication to the AMF 508 in the N2 Session response message that Inter-System Redirection is required and/or request for establishment of QoS Flow for IMS voice failed. This indicates to the AMF 508 to release the existing N1 connection with the UE 524 in order to initiate re-direction to an E-UTRAN and/or EPC.

In one embodiment, in an alternate tenth communication 1047 transmitted from the AMF 508 to the PCRF+PCF 518, the AMF 508 may notify the PCRF+PCF 518 about any RAT and/or system or UE unreachability.

In various embodiments, in a tenth communication 1048 transmitted between the AMF 508 and the PGW-C+SMF 514, if received in step 1046, the AMF 508 forwards the N2 SM information container to the PGW-C+SMF 514. The AMF 508 may also provide the reason for the rejection of the PGW-C+SMF 514 (e.g., Idle state inter-RAT mobility). Such an indication can be a trigger for the PGW-C+SMF 514 that a specific indication is needed towards the PCRF+PCF 518 to indicate that the UE 524 is temporary not reachable. In addition to the exchange from the AMF 508 to the PGW-C+SMF 514 for the IMS session, this tenth communication 1048 is also performed with all the PGW-C+SMFs allocated to the UE 524 for each PDU Session of the UE 524. For example, the AMF 508 uses Nsmf_PDUSsesion_Update_SMContext service operation. The PGW-C+SMF 514 sends a response towards the AMF 508 by using Nsmf_PDUSsesion_Update_SMContext reply. The AMF 508 may decide whether to perform a handover procedure or RRC release with redirection based on the availability of the N26 interface. For example, if the N26 interface is not deployed, the AMF 508 decides to perform idle state mobility, (e.g., RRC release with redirection). The AMF 508 sends N2 UE Context Release Request/Command message to the RAN 504.

In some embodiments, in an eleventh communication 1050 transmitted between the PGW-C+SMF 514 and the PCRF+PCF 518, after receiving a rejection from the RAN 504 for QoS flow establishment for voice service and an indication indicating that inter-RAT mobility (e.g., EPS fallback in Idle state) is ongoing, the PGW-C+SMF 514 initiates PDU Session Modification towards the PCRF+PCF 518 to obtain the E-UTRAN PCC Rules for the PDU Sessions by invoking Nsmf_EventExposure_Notify request and providing the event that generates the notification and the event information. A type of the event is changed in the type of Access Type. Upon receipt, the PCRF+PCF 518 responds by sending Nsmf_EventExposure_Notify reply. As may be appreciated, the PGW-C+SMF 514 may additionally inform the PCRF+PCF 518 that inter-RAT mobility is ongoing in Idles state and the UE 524 is temporary not reachable.

In certain embodiments, in a twelfth communication 1052 transmitted between the PCRF+PCF 518 and the AF+P-CSCF 522, the AF+P-CSCF 522 may subscribe to the radio access type change by employing Npcf_PolicyAuthorization_Subscribe service. The subscription may also be based on the communication system change, any system change or any change that may occur so the UE 524 is unreachable. The PCRF+PCF 518 notifies PDU Session Modification by invoking Npcf_PolicyAuthorization_Notify request to the AF+P-CSCF 522. Upon receipt, the AF+P-CSCF 522 responds by sending Npcf_PolicyAuthorization_Notify reply. From the time the AF+P-CSCF 522 initiates authorization of the necessary resources for the PDU session until the time the AF+P-CSCF 522 receives the need for change of access technology, the AF+P-CSCF 522 may maintain a timer (e.g., timer 1). During this timer the AF+P-CSCF 522 may delay forwarding the Offer Response message it had received in step 536 (first instance that includes SIP 183 session in progress). The AF+P-CSCF 522 may also insert an indication in SIP 183 session in progress for the S-CSCF 520 regarding the need for the terminating UE 524 to change of the access technology. The value for timer 1 may be configured and may be different for different implementations. If timer 1 is exhausted and the AF+P-CSCF 522 has not been notified about any radio access and system changes or any unreachability of the terminating UE 524, the AF+P-CSCF 522 may assume there was no change and interruption in the PDU session modification and/or IMS session establishment. In order to avoid generalizing this delay, the AF+P-CSCF 522 invokes this procedure when the P-Access-Network-Info header field indicates 5G access technology in combination with other header fields showing the MINITEL service is requested.

In various embodiments, in a thirteenth communication 1054 transmitted from the AMF 508 to the UE 524, the AMF 508 triggers 'AN release' procedure by sending N2 UE Context Release Request/Command message to the RAN 504. The AMF 508 may include an indication for RAT redirection. The RAN 504 releases the RRC connection and sends a re-direction indication with target cell information. The UE 524 performs cell reselection procedure for a E-UTRAN cell and initiates an RRC Connection establishment and either NAS Tracking Area Update procedure or NAS Attach procedure.

In some embodiments, in a fourteenth communication 1056 transmitted from the UE 524 to the E-UTRA 506, the UE 524 shall provide a 4G-GUTI that is mapped from the 5G-GUTI following mapping rules, such as those specified in 3GPP TS 23.501. The UE 524 indicates that it is moving from 5GC.

In certain embodiments, in a fifteenth communication 1058 transmitted between the MME 510 and the E-UTRA 506, if the MIME 510 determines that the old node is an AMF based on UE's GUTI mapped from 5G-GUTI and the MME 510 is configured to support 5GS-EPS interworking without N26 procedure, the MME 510 sends a TAU Reject to the UE 524. If the TAU was rejected in at the time the UE 524 requests TAU, the IP address preservation is not provided. In embodiments in which the UE 524 provides IMSI in an Attach Request, and does not provide a Request Type "Handover" in the PDN CONNECTIVITY Request if included in the Attach Request. The UE 524 provides an EPS bearer ID for all mapped EPS bearers in the EPS bearer status. For the initial Attach Request the EPS bearer status is empty. The UE 524 is aware the network is configured to support 5GS-EPS interworking without N26 procedure. The UE 524 does not include the EPS bearer IDs corresponding to the 5G QoS flows to the EPS bearer status.

In various embodiments, in a sixteenth communication 1060 transmitted from the UE 524 to the E-UTRA 506, the UE 524 sends an Attach Request with a modification that the UE 524 constructs the Attach Request message for the UE 524 to operate in single-registration mode. The UE 524 indicates that it is moving from 5GC and provides 4G-GUTI mapped from 5G-GUTI. If the UE 524 wants to transfer a PDU Session to EPC as part of the Attach procedure, it includes a PDN CONNECTIVITY Request message in the Attach Request and provides a Request type "Handover," DNN/APN and PDU Session ID of the PDU Session. The UE 524 provides the PDU Session ID in PCO.

In some embodiments, in a seventeenth communication 1061 transmitted from the E-UTRA 506 to the MME 510 and in an eighteenth communication 1062 transmitted between the HSS+UDM 502, the RAN 504, the E-UTRA 506, the AMF 508, the MME 510, the SGW 512, the PGW-C+SMF 514, the PGW-U+UPF 516, the PCRF+PCF 518, the S-CSCF 520, the AF+P-CSCF 522, and the UE 524, the Attach Request from the E-UTRA 506 is transmitted to the MME 510 and the procedures for initial attach to E-UTRAN are performed. As may be appreciated, if the UE 524 provided a 4G-GUTI mapped from 5G-GUTI and the MME 510 is configured to support 5GS-EPS interworking without N26 procedure, the MME 510 does not perform an identity request to an old MME/SGSN/AMF.

In certain embodiments, in a nineteenth communication 1063 transmitted between the HSS+UDM 502 and the MME 520, an Update Location is performed such that if the MME 520 determines that the old node is an AMF 508 based on the indication from the UE 524 and the MME 520 is configured to support 5GS-EPS interworking without N26 procedure, the MME 520 does not include the "initial attach" indication in its communications with the HSS+UDM 502. The HSS+UDM 502 does not send cancel location to the old AMF. The subscription profile the MME 510 receives from the HSS+UDM 502 includes the DNN/APN and PGW-C+SMF 514 ID for each PDU Session established in 5GC.

In various embodiments, in a twentieth communication 1064 transmitted between the E-UTRA 506, the AMF 508, the MME 510, the SGW 512, the PGW-C+SMF 514, the PGW-U+UPF 516, the PCRF+PCF 518, the S-CSCF 520, the AF+P-CSCF 522, and the UE 524, the UE 524 correlates the ongoing QoS flows with the indicated EPS Bearer IDs to be setup in the HO command. The UE 524 locally deletes the PDU Session if the QoS flow of the default QoS rule in the PDU Session does not have an EPS Bearer ID assigned. For the remaining PDU Sessions, the UE 524 locally deletes the QoS flows that do not have an EPS bearer ID assigned. The UE 524 deletes any UE derived QoS rules. The EPS Bearer ID that was assigned for the QoS flow of the default QoS rule in the PDU Session becomes the EPS Bearer ID of the default bearer in the corresponding PDN connection. For the QoS Flows indicated in the "QoS Flows for Data Forwarding," the RAN 504 initiates data forwarding via to the PGW-U+UPF 516 based on the CN Tunnel Info for Data Forwarding per PDU Session. Then the PGW-U+UPF 516 maps data received from the data forwarding tunnels in the 5GS to the data forwarding tunnels in EPS, and sends the data to the E-UTRA 506 via the SGW 512.

Data may be transmitted 1065 between the E-UTRA 506, the AMF 508, the MME 510, the SGW 512, the PGW-C+SMF 514, the PGW-U+UPF 516, the PCRF+PCF 518, the S-CSCF 520, the AF+P-CSCF 522, and the UE 524 in the EPS.

In some embodiments, in a twenty-first communication 1066 transmitted between the SGW 512 and the PGW-C+SMF 514, the SGW 512 informs the PGW-C+SMF 514 of the relocation by sending the Modify Bearer Request message for each PDN connection.

In certain embodiments, in a twenty-second communication 1067 transmitted between the PGW-C+SMF 514 and the PGW-U+UPF 516, the PGW-C+SMF 514 locally deletes the PDU Session if the QoS flow of the default QoS rule in the PDU Session does not have an EPS Bearer ID assigned. For the remaining PDU Sessions, the PGW-C+SMF 514 locally deletes the QoS Flows that do not have an EPS bearer ID assigned.

Modified data may be transmitted 1068 between the E-UTRA 506, the AMF 508, the MME 510, the SGW 512, the PGW-C+SMF 514, the PGW-U+UPF 516, the PCRF+PCF 518, the S-CSCF 520, the AF+P-CSCF 522, and the UE 524 in the EPS.

In certain embodiments, in a twenty-third communication 1069 transmitted from the AF+P-CSCF 522 to the S-CSCF 520, the AF+P-CSCF 522 forwards the Offer Response message in the SIP 183 session in progress to the S-CSCF 520.

In various embodiments, in a twenty-fourth communication 1070 transmitted from the S-CSCF 520 to the PCRF+PCF 518, the S-CSCF 520 forwards the Offer Response message in the SIP 183 session in progress to the PCRF+PCF 518 (e.g., the originator).

In some embodiments, in a twenty-fifth communication 1071 transmitted from the PCRF+PCF 518 to the S-CSCF 520, the PCRF+PCF 518 (e.g., the originating endpoint) sends a Response Confirmation as a SIP PRACK message to the S-CSCF 520. The Response Confirmation may also contain SDP. This may be the same SDP as in the Offer Response sent in step 1070 or a subset. If new media are defined by this SDP, a new authorization may be done by the AF+P-CSCF 522 and PCRF+PCF 518 following step 1074. The originating UE 524 is free to continue to offer new media on this operation or on subsequent exchanges using the Update method. Each offer and/or answer exchange will cause the AF+P-CSCF 522 and PCRF+PCF 518 to repeat authorization again.

In certain embodiments, in a twenty-sixth communication 1072 transmitted from the S-CSCF 520 to the AF+P-CSCF 522, the S-CSCF 520 forwards the Response Confirmation as a SIP PRACK message to AF+P-CSCF 522.

In various embodiments, in a twenty-seventh communication 1073 transmitted from the AF+P-CSCF 522 to the UE 524, if the PCRF+PCF 518 received an indication that inter-RAT mobility is ongoing, the PCRF+PCF 518 may inform the AF+P-CSCF 522 to temporary hold-on the IMS signaling towards the UE 524 until at least the default bearer is established in the target RAT and/or system. Upon receipt the Response Confirmation as a PRACK message, the AF+P-CSCF 522 should evaluate the elapsed time initiated at the time when AF+P-CSCF 522 was notified that change of access technology was required to this step. If the time has elapsed for a predetermined and/or preconfigured time which is timer 2, the AF+P-CSCF 522 forwards the Response Confirmation to the UE 524. Otherwise, the AF+P-CSCF 522 shall wait until timer 2 is exhausted before forwarding the Response Confirmation to the UE 524. The AF+P-CSCF 522 may also retry if it does not receive the acknowledgement for the Response Confirmation by the terminating UE 524 in step 578 or SIP 200 ok response. If the S-CSCF 520 was informed for the access change timer 2 would be implemented against the S-CSCF 520.

In some embodiments, in a twenty-eighth communication 1074 transmitted from the UE 524 to the AF+P-CSCF 522, the UE 524 responds to the Response Confirmation with an acknowledgement as a SIP 200 OK response. If Optional SDP is contained in the Response Confirmation, the acknowledgement (e.g., SIP 200 OK) will also contain an SDP response. If the SDP has changed, the AF+P-CSCF 522 authorizes that the resources are allowed to be used. Since timer 2 has been exhausted, the UE 524 is now on the EPS access technology. The UE 524 shall therefore begin to insert from now onwards the new access technology in the PANI header field in the SIP messages.

Depending on the bearer establishment mode selected for the IP CAN session, resource reservation shall be initiated 1075 either by the UE 524 or by the IP CAN itself. The UE 524 initiates the reservation procedures for the resources needed for this session. Otherwise, the IP CAN initiates the reservation of required resources after step 1068.

In various embodiments, in a twenty-ninth communication 1076 transmitted from the AF+P-CSCF 522 to the S-CSCF 520 and in a thirtieth communication 1077 transmitted from the S-CSCF 520 to the PCRF+PCF 518, the acknowledgement (e.g., 200 OK response) is forwarded to the originating end point.

In some embodiments, in a thirty-first communication 1078 transmitted from the PCRF+PCF 518 to the S-CSCF 520, in a thirty-second communication 1079 transmitted from the S-CSCF 520 to the AF+P-CSCF 522, and in a thirty-third communication 1080 transmitted from the AF+P-CSCF 522 to the UE 524, when the originating endpoint (e.g., the PCRF+PCF 518) has completed its resource reservation, it sends the successful Resource Reservation message as a SIP UPDATE message towards S CSCF. The S-CSCF 520 forwards the message toward the terminating endpoint along the signaling path.

The UE alerts 1081 the destination user of an incoming session setup attempt.

In various embodiments, in a thirty-fourth communication 1082 transmitted from the UE 524 to the AF+P-CSCF 522, in a thirty-fifth communication 1083 transmitted from the AF+P-CSCF 522 to the S-CSCF 520, and in a thirty-sixth communication 1084 transmitted from the S-CSCF 520 to the PCRF+PCF 518, the UE 524 responds to the successful resource reservation by a SIP 200 OK response and the message is forwarded to the originating end (e.g., the PCRF+PCF 518).

In some embodiments, in a thirty-seventh communication 1085 transmitted from the UE 524 to the AF+P-CSCF 522, in a thirty-eighth communication 1086 transmitted from the AF+P-CSCF 522 to the S-CSCF 520, and in a thirty-ninth communication 1087 transmitted from the S-CSCF 520 to the PCRF+PCF 518, the UE 524 may alert the user and wait for an indication from the user before completing the session. If so, it indicates this to the originating party by a provisional SIP 180 ringing response indicating Ringing. This message is sent to AF+P-CSCF 522 and along the signaling path to the originating end (e.g., the PCRF+PCF 518).

In certain embodiments, in a fortieth communication 1088 transmitted from the UE 524 to the AF+P-CSCF 522, when the destination party answers, the UE 524 sends a SIP 200 OK final response to the AF+P-CSCF 522.

In various embodiments, in a forty-first communication 1089 transmitted between the E-UTRA 506, the AMF 508, the MME 510, the SGW 512, the PGW-C+SMF 514, the PGW-U+UPF 516, the PCRF+PCF 518, the S-CSCF 520, the AF+P-CSCF 522, and the UE 524, upon receipt of the SIP 200 OK by the AF+P-CSCF 522, the AF+P-CSCF 522 indicates to PCRF+PCF 518 and the authorized media flows for this session is now enabled via PGW-C+SMF 514 and PGW-U+UPF 516, and the UE 524 starts the media flows for this session.

In certain embodiments, in a forty-second communication 1090 transmitted from the AF+P-CSCF 522 to the S-CSCF 520 and a forty-third communication 1091 transmitted from the S-CSCF 520 to the PCRF+PCF 518, the AF+P-CSCF 522 forwards the 200 OK to the S-CSCF 520, following the signaling path.

In various embodiments, in a forty-fourth communication 1092 transmitted from the PCRF+PCF 518 to the S-CSCF 520, a forty-fifth communication 1093 transmitted from the S-CSCF 520 to the AF+P-CSCF 522, and a forty-sixth communication 1094 transmitted from the AF+P-CSCF 522 to the UE 524, the session originator (e.g., the PCRF+PCF 518) responds to the 200 OK by sending a SIP ACK message to the S-CSCF 520 and it is forwarded to the terminating end along the signaling path.

In another embodiment which may be applicable to all previous described embodiments, the AF+P-CSCF may communicate directly with the PGW-C+SMF over an SBI Nsmf. The AF+P-CSCF may have subscribed to the UE mobility event such as access network type. When the PGW-C+SMF detects a change in the UE access and mobility event, it invokes Nsmf_EventExposure_Notify service operation to the AF+P-CSCF. The AF+P-CSCF address is allocated by the UPF at PDU Session establishment and provisioned to the SMF at this time. In case the UE is not an IMS subscriber, no P-CSCF will be allocated to the UE. The SMF then takes the corresponding steps for EPS fallback/handover as described in the embodiments before. The Nsmf_EventExposure_Notify may contain information that handover/fallback is in progress and that the IMS client is aware of the RAT and/or system change and is temporary unreachable. This may be illustrated as in the following figure where step 1149 shows that PGW-C+SMF may notify the AF+P-CSCF about any RAT and/or system or UE unreachability.

Figure 11:
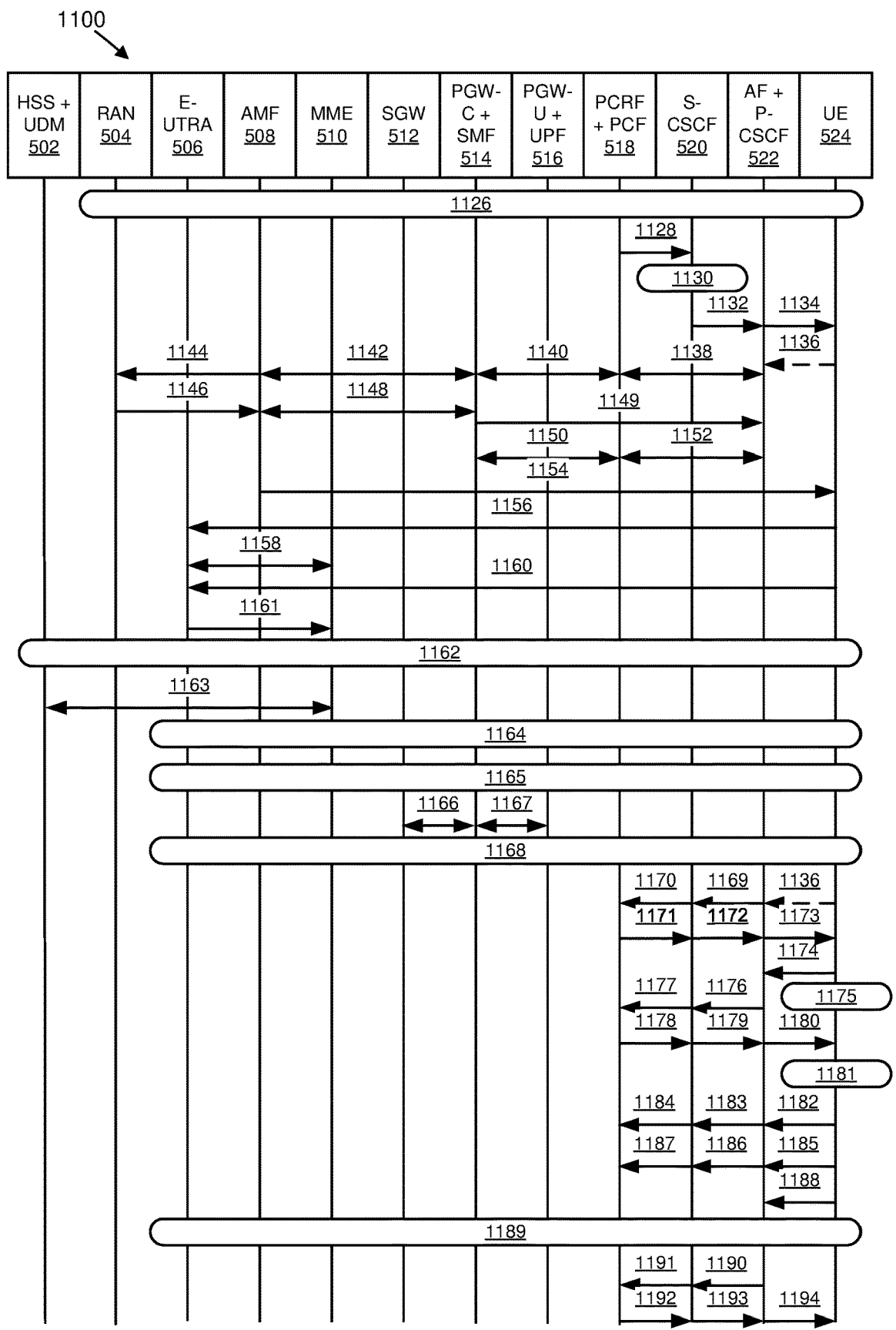
FIG. 11 is a schematic block diagram illustrating yet another embodiment of communications for EPS fallback without N26 employed and terminating at a UE.

FIG. 11 is a schematic block diagram illustrating yet another embodiment of communications 1100 for EPS fallback without N26 employed and terminating at a UE. The communications 1100 illustrated occur between an HSS+UDM 502, a RAN (e.g., NG-RAN) 504, an E-UTRA 506, an AMF 508, an MME 510, an SGW 512, a PGW-C+SMF 514, a PGW-U+UPF 516, a PCRF+PCF 518, a S-CSCF 520, an AF+P-CSCF 522, and a UE 524. As may be appreciated, any of the communications 1100 described herein may include one or more messages.

The network may setup 1126 a PDU session and QoS flow in 5GS. Moreover, in one embodiment, in a first communication 1128 transmitted from the PCRF+PCF 518 to the S-CSCF 520, the PCRF+PCF 518 may send a SIP INVITE request containing an initial SDP offer towards the S-CSCF 520.

The S-CSCF 520 validates 1130 the service profile and invokes any termination service logic required for this user. This may include authorization of the requested SDP based on the user's subscription for multi-media services.

In some embodiments, in a second communication 1132 transmitted from the S-CSCF 520 to the AF+P-CSCF 522, the S-CSCF 520 remembers (e.g., from the registration procedure) the next hop CSCF for the UE 524 and forwards the invite to the AF+P-CSCF 522 in the visited network.

In certain embodiments, in a third communication 1134 transmitted from the AF+P-CSCF 522 to the UE 524, if the AF+P-CSCF 522 determines that the termination is for an MPS session, the AF+P-CSCF 522 derives the session information and invokes dynamic policy sending the derived session information to the PCRF+PCF 518, the AF+P-CSCF 522 remembers (e.g., from the registration procedure) the UE 524 address, and forwards the invite to the UE 524.

In various embodiments, in a fourth communication 1136 transmitted from the UE 524 to the AF+P-CSCF 522 at one of two possible times, the UE 524 determines the subset of the media flows proposed by the originating endpoint that it supports, and responds to the AF+P-CSCF 522 with an offer response message back to the originator. The SDP may represent one or more media for a multi-media session.

With steps 1138 through 1168, the AF+P-CSCF 522 authorizes the resources necessary for this session.

In some embodiments, in a fifth communication 1138 transmitted between the AF+P-CSCF 522 and the PCRF+PCF 518, AF+P-CSCF 522 transmits the Npcf_PolicyAuthorization_Create request containing the IP address of the UE 524 and the application identifier towards the PCRF+PCF 518. The AF+P-CSCF 522 will receive the Npcf_PolicyAuthorization_Create reply.

In certain embodiments, in a sixth communication 1140 transmitted between the PCRF+PCF 518 and the PGW-C+SMF 514, the PCRF+PCF 518 employs Npcf_SMPolicyControl_UpdateNotify request to provide the PGW-C+SMF 514 (or SMF) the updated session management related policy for the PDU session. The PGW-C+SMF 514 responds by Npcf_SMPolicyControl_UpdateNotify reply upon receipt of the request.

In various embodiments, in a seventh communication 1142 transmitted between the PGW-C+SMF 514 and the AMF 508, the PGW-C+SMF 514 invokes service operation to the AMF 508 to transmit N2 SM information to the RAN 504 (e.g., Namf_Communication_N1N2MessageTransfer (SM Context ID, N2 SM information (PDU Session ID, N3 tunnel information, QFI(s), QoS Profile(s), Session-AMBR)). It is assumed that the UE 524 is in CM-CONNECTED state and the AMF has established N2 transport association with the RAN 504 (and therefore no Paging procedure is needed).

In some embodiments, in an eighth communication 1144 transmitted from the AMF 508 to the RAN 504, the AMF 508 sends N2 PDU Session request to the RAN 504 to transmit the N2 SM information received from the PGW-C+SMF 514 by using PDU_Session_Resource_Modify Request.

In certain embodiments, in a ninth communication 1146 transmitted from the RAN 504 to the AMF 508, if the RAN 504 decides to reject the PDU session modification or new QoS flow establishment request from the PGW-C+SMF 514 (e.g., the N2 SM request from SMF for QoS flow) for voice service (e.g., based on configuration in the RAN 504 to use E-UTRAN for voice services, and thus to use inter-RAT mobility). The RAN 504 sends a QoS flow rejection indication to the PGW-C+SMF 514 included in an N2 Session response message to the AMF 508. The RAN 504 can also provide a reason for the rejected QoS flow establishment (e.g., non-supported 5QI and inter-system change needed). The RAN 504 may send an indication to the AMF 508 in the N2 Session response message that Inter-System Redirection is required and/or request for establishment of QoS Flow for IMS voice failed. This indicates to the AMF 508 to release the existing N1 connection with the UE 524 in order to initiate re-direction to an E-UTRAN and/or EPC.

In various embodiments, in a tenth communication 1148 transmitted between the AMF 508 and the PGW-C+SMF 514, if received in step 1146, the AMF 508 forwards the N2 SM information container to the PGW-C+SMF 514. The AMF 508 may also provide the reason for the rejection of the PGW-C+SMF 514 (e.g., Idle state inter-RAT mobility). Such an indication can be a trigger for the PGW-C+SMF 514 that a specific indication is needed towards the PCRF+PCF 518 to indicate that the UE 524 is temporary not reachable. In addition to the exchange from the AMF 508 to the PGW-C+SMF 514 for the IMS session, this tenth communication 1148 is also performed with all the PGW-C+SMFs allocated to the UE 524 for each PDU Session of the UE 524. For example, the AMF 508 uses Nsmf_PDUSsesion_Update_SMContext service operation. The PGW-C+SMF 514 sends a response towards the AMF 508 by using Nsmf_PDUSsesion_Update_SMContext reply. The AMF 508 may decide whether to perform a handover procedure or RRC release with redirection based on the availability of the N26 interface. For example, if the N26 interface is not deployed, the AMF 508 decides to perform idle state mobility, (e.g., RRC release with redirection). The AMF 508 sends N2 UE Context Release Request/Command message to the RAN 504.

In one embodiment, in an alternate eleventh communication 1149 transmitted from the PGW-C+SMF 514 to the AF+P-CSCF 522, the PGW-C+SMF 514 may notify the AF+P-CSCF 522 about any RAT and/or system or UE unreachability.

In some embodiments, in an eleventh communication 1150 transmitted between the PGW-C+SMF 514 and the PCRF+PCF 518, after receiving a rejection from the RAN 504 for QoS flow establishment for voice service and an indication indicating that inter-RAT mobility (e.g., EPS fallback in Idle state) is ongoing, the PGW-C+SMF 514 initiates PDU Session Modification towards the PCRF+PCF 518 to obtain the E-UTRAN PCC Rules for the PDU Sessions by invoking Nsmf_EventExposure_Notify request and providing the event that generates the notification and the event information. A type of the event is changed in the type of Access Type. Upon receipt, the PCRF+PCF 518 responds by sending Nsmf_EventExposure_Notify reply. As may be appreciated, the PGW-C+SMF 514 may additionally inform the PCRF+PCF 518 that inter-RAT mobility is ongoing in Idles state and the UE 524 is temporary not reachable.

In certain embodiments, in a twelfth communication 1152 transmitted between the PCRF+PCF 518 and the AF+P-CSCF 522, the AF+P-CSCF 522 may subscribe to the radio access type change by employing Npcf_PolicyAuthorization_Subscribe service. The subscription may also be based on the communication system change, any system change or any change that may occur so the UE 524 is unreachable. The PCRF+PCF 518 notifies PDU Session Modification by invoking Npcf_PolicyAuthorization_Notify request to the AF+P-CSCF 522. Upon receipt, the AF+P-CSCF 522 responds by sending Npcf_PolicyAuthorization_Notify reply. From the time the AF+P-CSCF 522 initiates authorization of the necessary resources for the PDU session until the time the AF+P-CSCF 522 receives the need for change of access technology, the AF+P-CSCF 522 may maintain a timer (e.g., timer 1). During this timer the AF+P-CSCF 522 may delay forwarding the Offer Response message it had received in step 536 (first instance that includes SIP 183 session in progress). The AF+P-CSCF 522 may also insert an indication in SIP 183 session in progress for the S-CSCF 520 regarding the need for the terminating UE 524 to change of the access technology. The value for timer 1 may be configured and may be different for different implementations. If timer 1 is exhausted and the AF+P-CSCF 522 has not been notified about any radio access and system changes or any unreachability of the terminating UE 524, the AF+P-CSCF 522 may assume there was no change and interruption in the PDU session modification and/or IMS session establishment. In order to avoid generalizing this delay, the AF+P-CSCF 522 invokes this procedure when the P-Access-Network-Info header field indicates 5G access technology in combination with other header fields showing the MINITEL service is requested.

In various embodiments, in a thirteenth communication 1154 transmitted from the AMF 508 to the UE 524, the AMF 508 triggers 'AN release' procedure by sending N2 UE Context Release Request/Command message to the RAN 504. The AMF 508 may include an indication for RAT redirection. The RAN 504 releases the RRC connection and sends a re-direction indication with target cell information. The UE 524 performs cell reselection procedure for a E-UTRAN cell and initiates an RRC Connection establishment and either NAS Tracking Area Update procedure or NAS Attach procedure.

In some embodiments, in a fourteenth communication 1156 transmitted from the UE 524 to the E-UTRA 506, the UE 524 shall provide a 4G-GUTI that is mapped from the 5G-GUTI following mapping rules, such as those specified in 3GPP TS 23.501. The UE 524 indicates that it is moving from 5GC.

In certain embodiments, in a fifteenth communication 1158 transmitted between the MME 510 and the E-UTRA 506, if the MME 510 determines that the old node is an AMF based on UE's GUTI mapped from 5G-GUTI and the MME 510 is configured to support 5GS-EPS interworking without N26 procedure, the MME 510 sends a TAU Reject to the UE 524. If the TAU was rejected in at the time the UE 524 requests TAU, the IP address preservation is not provided. In embodiments in which the UE 524 provides IMSI in an Attach Request, and does not provide a Request Type "Handover" in the PDN CONNECTIVITY Request if included in the Attach Request. The UE 524 provides an EPS bearer ID for all mapped EPS bearers in the EPS bearer status. For the initial Attach Request the EPS bearer status is empty. The UE 524 is aware the network is configured to support 5GS-EPS interworking without N26 procedure. The UE 524 does not include the EPS bearer IDs corresponding to the 5G QoS flows to the EPS bearer status.

In various embodiments, in a sixteenth communication 1160 transmitted from the UE 524 to the E-UTRA 506, the UE 524 sends an Attach Request with a modification that the UE 524 constructs the Attach Request message for the UE 524 to operate in single-registration mode. The UE 524 indicates that it is moving from 5GC and provides 4G-GUTI mapped from 5G-GUTI. If the UE 524 wants to transfer a PDU Session to EPC as part of the Attach procedure, it includes a PDN CONNECTIVITY Request message in the Attach Request and provides a Request type "Handover," DNN/APN and PDU Session ID of the PDU Session. The UE 524 provides the PDU Session ID in PCO.

In some embodiments, in a seventeenth communication 1161 transmitted from the E-UTRA 506 to the MME 510 and in an eighteenth communication 1162 transmitted between the HSS+UDM 502, the RAN 504, the E-UTRA 506, the AMF 508, the MME 510, the SGW 512, the PGW-C+SMF 514, the PGW-U+UPF 516, the PCRF+PCF 518, the S-CSCF 520, the AF+P-CSCF 522, and the UE 524, the Attach Request from the E-UTRA 506 is transmitted to the MME 510 and the procedures for initial attach to E-UTRAN are performed. As may be appreciated, if the UE 524 provided a 4G-GUTI mapped from 5G-GUTI and the MME 510 is configured to support 5GS-EPS interworking without N26 procedure, the MME 510 does not perform an identity request to an old MME/SGSN/AMF In certain embodiments, in a nineteenth communication 1163 transmitted between the HSS+UDM 502 and the MME 520, an Update Location is performed such that if the MME 520 determines that the old node is an AMF 508 based on the indication from the UE 524 and the MME 520 is configured to support 5GS-EPS interworking without N26 procedure, the MME 520 does not include the "initial attach" indication in its communications with the HSS+UDM 502. The HSS+UDM 502 does not send cancel location to the old AMF. The subscription profile the MME 510 receives from the HSS+UDM 502 includes the DNN/APN and PGW-C+SMF 514 ID for each PDU Session established in 5GC.

In various embodiments, in a twentieth communication 1164 transmitted between the E-UTRA 506, the AMF 508, the MME 510, the SGW 512, the PGW-C+SMF 514, the PGW-U+UPF 516, the PCRF+PCF 518, the S-CSCF 520, the AF+P-CSCF 522, and the UE 524, the UE 524 correlates the ongoing QoS flows with the indicated EPS Bearer IDs to be setup in the HO command. The UE 524 locally deletes the PDU Session if the QoS flow of the default QoS rule in the PDU Session does not have an EPS Bearer ID assigned. For the remaining PDU Sessions, the UE 524 locally deletes the QoS flows that do not have an EPS bearer ID assigned. The UE 524 deletes any UE derived QoS rules. The EPS Bearer ID that was assigned for the QoS flow of the default QoS rule in the PDU Session becomes the EPS Bearer ID of the default bearer in the corresponding PDN connection. For the QoS Flows indicated in the "QoS Flows for Data Forwarding," the RAN 504 initiates data forwarding via to the PGW-U+UPF 516 based on the CN Tunnel Info for Data Forwarding per PDU Session. Then the PGW-U+UPF 516 maps data received from the data forwarding tunnels in the 5GS to the data forwarding tunnels in EPS, and sends the data to the E-UTRA 506 via the SGW 512.

Data may be transmitted 1165 between the E-UTRA 506, the AMF 508, the MME 510, the SGW 512, the PGW-C+SMF 514, the PGW-U+UPF 516, the PCRF+PCF 518, the S-CSCF 520, the AF+P-CSCF 522, and the UE 524 in the EPS.

In some embodiments, in a twenty-first communication 1166 transmitted between the SGW 512 and the PGW-C+SMF 514, the SGW 512 informs the PGW-C+SMF 514 of the relocation by sending the Modify Bearer Request message for each PDN connection.

In certain embodiments, in a twenty-second communication 1167 transmitted between the PGW-C+SMF 514 and the PGW-U+UPF 516, the PGW-C+SMF 514 locally deletes the PDU Session if the QoS flow of the default QoS rule in the PDU Session does not have an EPS Bearer ID assigned. For the remaining PDU Sessions, the PGW-C+SMF 514 locally deletes the QoS Flows that do not have an EPS bearer ID assigned.

Modified data may be transmitted 1168 between the E-UTRA 506, the AMF 508, the MME 510, the SGW 512, the PGW-C+SMF 514, the PGW-U+UPF 516, the PCRF+PCF 518, the S-CSCF 520, the AF+P-CSCF 522, and the UE 524 in the EPS.

In certain embodiments, in a twenty-third communication 1169 transmitted from the AF+P-CSCF 522 to the S-CSCF 520, the AF+P-CSCF 522 forwards the Offer Response message in the SIP 183 session in progress to the S-CSCF 520.

In various embodiments, in a twenty-fourth communication 1170 transmitted from the S-CSCF 520 to the PCRF+PCF 518, the S-CSCF 520 forwards the Offer Response message in the SIP 183 session in progress to the PCRF+PCF 518 (e.g., the originator).

In some embodiments, in a twenty-fifth communication 1171 transmitted from the PCRF+PCF 518 to the S-CSCF 520, the PCRF+PCF 518 (e.g., the originating endpoint) sends a Response Confirmation as a SIP PRACK message to the S-CSCF 520. The Response Confirmation may also contain SDP. This may be the same SDP as in the Offer Response sent in step 1170 or a subset. If new media are defined by this SDP, a new authorization may be done by the AF+P-CSCF 522 and PCRF+PCF 518 following step 1174. The originating UE 524 is free to continue to offer new media on this operation or on subsequent exchanges using the Update method. Each offer and/or answer exchange will cause the AF+P-CSCF 522 and PCRF+PCF 518 to repeat authorization again.

In certain embodiments, in a twenty-sixth communication 1172 transmitted from the S-CSCF 520 to the AF+P-CSCF 522, the S-CSCF 520 forwards the Response Confirmation as a SIP PRACK message to AF+P-CSCF 522.

In various embodiments, in a twenty-seventh communication 1173 transmitted from the AF+P-CSCF 522 to the UE 524, if the PCRF+PCF 518 received an indication that inter-RAT mobility is ongoing, the PCRF+PCF 518 may inform the AF+P-CSCF 522 to temporary hold-on the IMS signaling towards the UE 524 until at least the default bearer is established in the target RAT and/or system. Upon receipt the Response Confirmation as a PRACK message, the AF+P-CSCF 522 should evaluate the elapsed time initiated at the time when AF+P-CSCF 522 was notified that change of access technology was required to this step. If the time has elapsed for a predetermined and/or preconfigured time which is timer 2, the AF+P-CSCF 522 forwards the Response Confirmation to the UE 524. Otherwise, the AF+P-CSCF 522 shall wait until timer 2 is exhausted before forwarding the Response Confirmation to the UE 524. The AF+P-CSCF 522 may also retry if it does not receive the acknowledgement for the Response Confirmation by the terminating UE 524 in step 578 or SIP 200 ok response. If the S-CSCF 520 was informed for the access change timer 2 would be implemented against the S-CSCF 520.

In some embodiments, in a twenty-eighth communication 1174 transmitted from the UE 524 to the AF+P-CSCF 522, the UE 524 responds to the Response Confirmation with an acknowledgement as a SIP 200 OK response. If Optional SDP is contained in the Response Confirmation, the acknowledgement (e.g., SIP 200 OK) will also contain an SDP response. If the SDP has changed, the AF+P-CSCF 522 authorizes that the resources are allowed to be used. Since timer 2 has been exhausted, the UE 524 is now on the EPS access technology. The UE 524 shall therefore begin to insert from now onwards the new access technology in the PANI header field in the SIP messages.

Depending on the bearer establishment mode selected for the IP CAN session, resource reservation shall be initiated 1175 either by the UE 524 or by the IP CAN itself. The UE 524 initiates the reservation procedures for the resources needed for this session. Otherwise, the IP CAN initiates the reservation of required resources after step 1168.

In various embodiments, in a twenty-ninth communication 1176 transmitted from the AF+P-CSCF 522 to the S-CSCF 520 and in a thirtieth communication 1177 transmitted from the S-CSCF 520 to the PCRF+PCF 518, the acknowledgement (e.g., 200 OK response) is forwarded to the originating end point.

In some embodiments, in a thirty-first communication 1178 transmitted from the PCRF+PCF 518 to the S-CSCF 520, in a thirty-second communication 1179 transmitted from the S-CSCF 520 to the AF+P-CSCF 522, and in a thirty-third communication 1180 transmitted from the AF+P-CSCF 522 to the UE 524, when the originating endpoint (e.g., the PCRF+PCF 518) has completed its resource reservation, it sends the successful Resource Reservation message as a SIP UPDATE message towards S CSCF. The S-CSCF 520 forwards the message toward the terminating endpoint along the signaling path.

The UE alerts 1181 the destination user of an incoming session setup attempt.

In various embodiments, in a thirty-fourth communication 1182 transmitted from the UE 524 to the AF+P-CSCF 522, in a thirty-fifth communication 1183 transmitted from the AF+P-CSCF 522 to the S-CSCF 520, and in a thirty-sixth communication 1184 transmitted from the S-CSCF 520 to the PCRF+PCF 518, the UE 524 responds to the successful resource reservation by a SIP 200 OK response and the message is forwarded to the originating end (e.g., the PCRF+PCF 518).

In some embodiments, in a thirty-seventh communication 1185 transmitted from the UE 524 to the AF+P-CSCF 522, in a thirty-eighth communication 1186 transmitted from the AF+P-CSCF 522 to the S-CSCF 520, and in a thirty-ninth communication 1187 transmitted from the S-CSCF 520 to the PCRF+PCF 518, the UE 524 may alert the user and wait for an indication from the user before completing the session. If so, it indicates this to the originating party by a provisional SIP 180 ringing response indicating Ringing. This message is sent to AF+P-CSCF 522 and along the signaling path to the originating end (e.g., the PCRF+PCF 518).

In certain embodiments, in a fortieth communication 1188 transmitted from the UE 524 to the AF+P-CSCF 522, when the destination party answers, the UE 524 sends a SIP 200 OK final response to the AF+P-CSCF 522.

In various embodiments, in a forty-first communication 1189 transmitted between the E-UTRA 506, the AMF 508, the MME 510, the SGW 512, the PGW-C+SMF 514, the PGW-U+UPF 516, the PCRF+PCF 518, the S-CSCF 520, the AF+P-CSCF 522, and the UE 524, upon receipt of the SIP 200 OK by the AF+P-CSCF 522, the AF+P-CSCF 522 indicates to PCRF+PCF 518 and the authorized media flows for this session is now enabled via PGW-C+SMF 514 and PGW-U+UPF 516, and the UE 524 starts the media flows for this session.

In certain embodiments, in a forty-second communication 1190 transmitted from the AF+P-CSCF 522 to the S-CSCF 520 and a forty-third communication 1191 transmitted from the S-CSCF 520 to the PCRF+PCF 518, the AF+P-CSCF 522 forwards the 200 OK to the S-CSCF 520, following the signaling path.

In various embodiments, in a forty-fourth communication 1192 transmitted from the PCRF+PCF 518 to the S-CSCF 520, a forty-fifth communication 1193 transmitted from the S-CSCF 520 to the AF+P-CSCF 522, and a forty-sixth communication 1194 transmitted from the AF+P-CSCF 522 to the UE 524, the session originator (e.g., the PCRF+PCF 518) responds to the 200 OK by sending a SIP ACK message to the S-CSCF 520 and it is forwarded to the terminating end along the signaling path.

In some configurations, there may be a network solution for EPS fallback from 5GS if a UE attempts to establish an IMS session for voice. In certain configurations, an AF may be subscribed to a UE's loss of bearer and the IP-CAN may change at the time of resource allocation. The subscription may be done in two different ways: 1) Service Based Interfaces ("SBI"): According to 3GPP TS29.514, the AF may employ Npcf_PolicyAuthorization_Subscribe service operation to subscribe to: the event that the losses the resource; and the event for the RAT type change; or 2) RX: According to 3GPP TS 29.214, the AF may employ Specific-Action AVP with an AAR command to PCF: with value INDICATION_OF_FAILED_RESOURCES_ALLOCATION (9) to request PCF providing notification when the resources associated to the corresponding service information cannot be allocated. This value in a RAR is used by the PCF to indicate to AF that the resources requested for a particular service information cannot be successfully allocated; and with value IP-CAN_CHANGE (6) to subscribe to IP-CAN change and RAT change notification. This value in a RAR is used by the PCF to indicate to AF that to indicate a change in the IP-CAN type or RAT type.

In certain embodiments, if a UE is served by a 5G System, the UE may have one or more ongoing PDU Sessions each including one or more QoS flows. A serving PLMN AMF may have sent an indication towards the UE during a Registration procedure that IMS voice over PS session is supported and the UE has registered in the IMS. If N26 is not supported, a serving PLMN AMF may send an indication towards the UE during the Registration procedure that interworking without N26 is supported.

Figure 12:
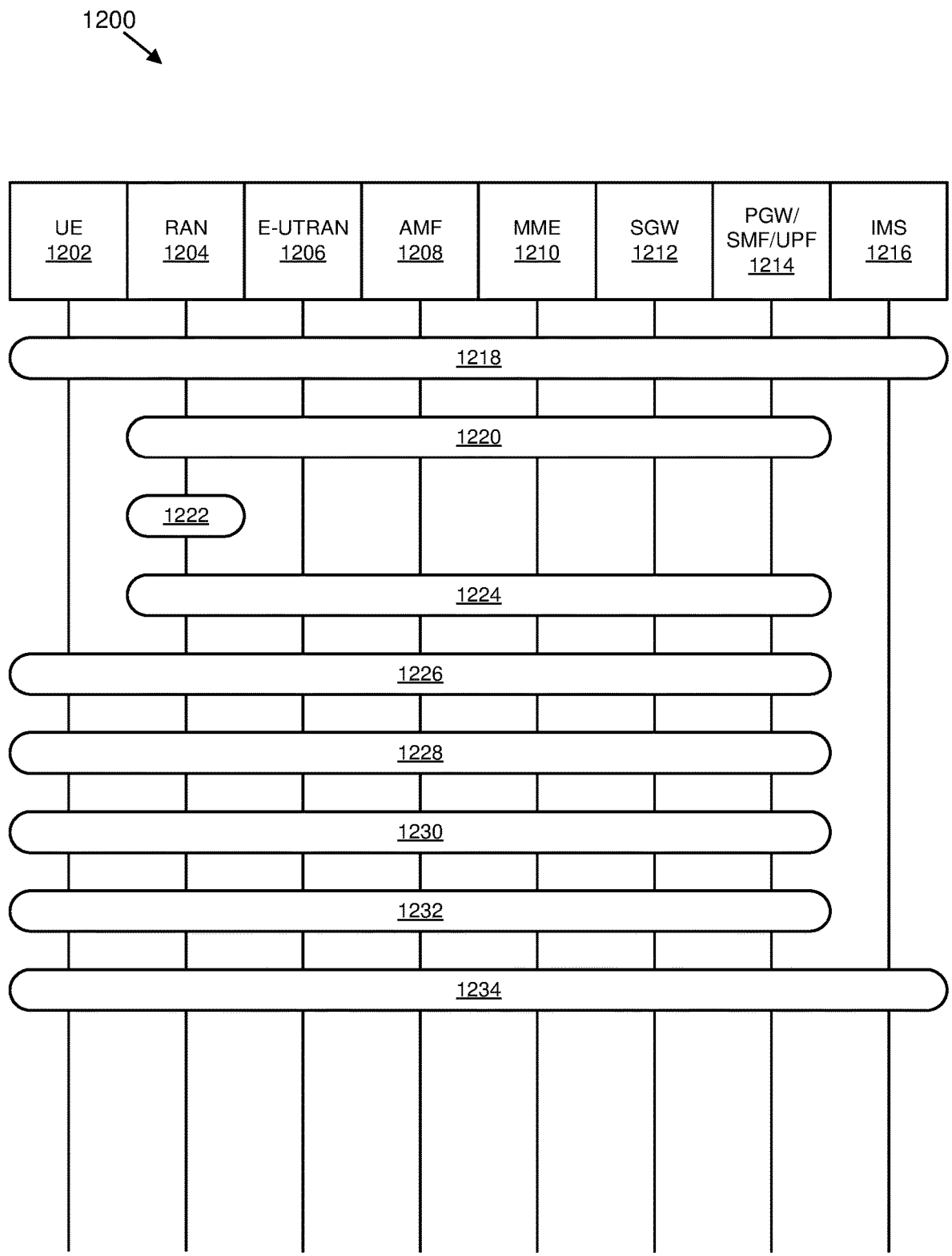
FIG. 12 is a schematic block diagram illustrating one embodiment of communications for EPS fallback for IMS voice.

FIG. 12 is a schematic block diagram illustrating one embodiment of communications 1200 for EPS fallback for IMS voice. The communications 1200 illustrated occur between a UE 1202, a RAN 1204 (e.g., NG-RAN), an E-UTRAN 1206, an AMF 1208, an MME 1210, a SGW 1212, a PGW/SMF/UPF 1214, and an IMS 1216. As may be appreciated, any of the communications 1200 described herein may include one or more messages.

In one embodiment, in a first communication 1218 transmitted between the UE 1202, the RAN 1204, the E-UTRAN 1206, the AMF 1208, the MME 1210, the SGW 1212, the PGW/SMF/UPF 1214, and the IMS 1216, the UE 1202 camps on the RAN 1204 in the 5GS and an IMS voice session establishment has been initiated.

In some embodiments, in a second communication 1220 transmitted between the RAN 1204, the E-UTRAN 1206, the AMF 1208, the MME 1210, the SGW 1212, and the PGW/SMF/UPF 1214, a network initiated PDU Session modification to setup QoS flow for voice reaches the RAN 1204.

In certain embodiments, the RAN 1204 is configured 1222 to support EPS fallback for IMS voice and decides to trigger fallback to EPS, taking into account the UE 1202 capabilities, an indication from the AMF 1208 that "Redirection for EPS fallback for voice is possible," a network configuration (e.g., N26 availability configuration), and radio conditions. If the RAN 1204 decides not to trigger fallback to EPS, then the procedure stops at this point and the following steps are not executed. In some embodiments, the RAN 1204 may initiate measurement report solicitation from the UE 1202 including the E-UTRAN 1206 as a target. In certain embodiments, if the AMF 1208 has indicated that "Redirection for EPS fallback for voice is not possible," then AN Release via inter-system redirection to EPS is not performed in step 1226.

In various embodiments, in a third communication 1224 transmitted between the RAN 1204, the E-UTRAN 1206, the AMF 1208, the MME 1210, the SGW 1212, and the PGW/SMF/UPF 1214, the RAN 1204 responds indicating a rejection of the PDU Session modification to setup QoS flow for IMS voice received in step 1220 by an N2 PDU Session Response message towards the PGW/SMF/UPF 1214 with an indication that mobility due to fallback for IMS voice is ongoing.

In some embodiments, in a fourth communication 1226 transmitted between the UE 1202, the RAN 1204, the E-UTRAN 1206, the AMF 1208, the MME 1210, the SGW 1212, and the PGW/SMF/UPF 1214, the RAN 1204 initiates either handover, or AN Release via inter-system redirection to EPS, taking into account the UE 1202 capabilities.

If the UE 1202 is connected to EPS, in certain embodiments, in a fifth communication 1228 transmitted between the UE 1202, the RAN 1204, the E-UTRAN 1206, the AMF 1208, the MME 1210, the SGW 1212, and the PGW/SMF/UPF 1214, if there is a 5GS to EPS handover, and if there is inter-system redirection to EPS with N26 interface, the UE 1202 initiates a TAU procedure; or, in various embodiments, in a sixth communication 1230 transmitted between the UE 1202, the RAN 1204, the E-UTRAN 1206, the AMF 1208, the MME 1210, the SGW 1212, and the PGW/SMF/UPF 1214, if there is inter-system redirection to EPS without N26 interface, and if the UE 1202 supports Request Type flag "handover" for PDN a connectivity request during the attach procedure and has received the indication that interworking without N26 is supported, then the UE 1202 initiates Attach with PDN connectivity request with request type "handover."

In some embodiments, in a seventh communication 1232 transmitted between the UE 1202, the RAN 1204, the E-UTRAN 1206, the AMF 1208, the MME 1210, the SGW 1212, and the PGW/SMF/UPF 1214, after completion of the mobility procedure to EPS, the PGW/SMF/UPF 1214 re-initiates the setup of the dedicated bearer for IMS voice.

In some embodiments, in an eighth communication 1234 transmitted between the UE 1202, the RAN 1204, the E-UTRAN 1206, the AMF 1208, the MME 1210, the SGW 1212, the PGW/SMF/UPF 1214, and the IMS 1216, the IMS voice session establishment is continued. At least for the duration of the voice call in EPS, the E-UTRAN is configured to not trigger any handover to 5GS.

Figure 13:
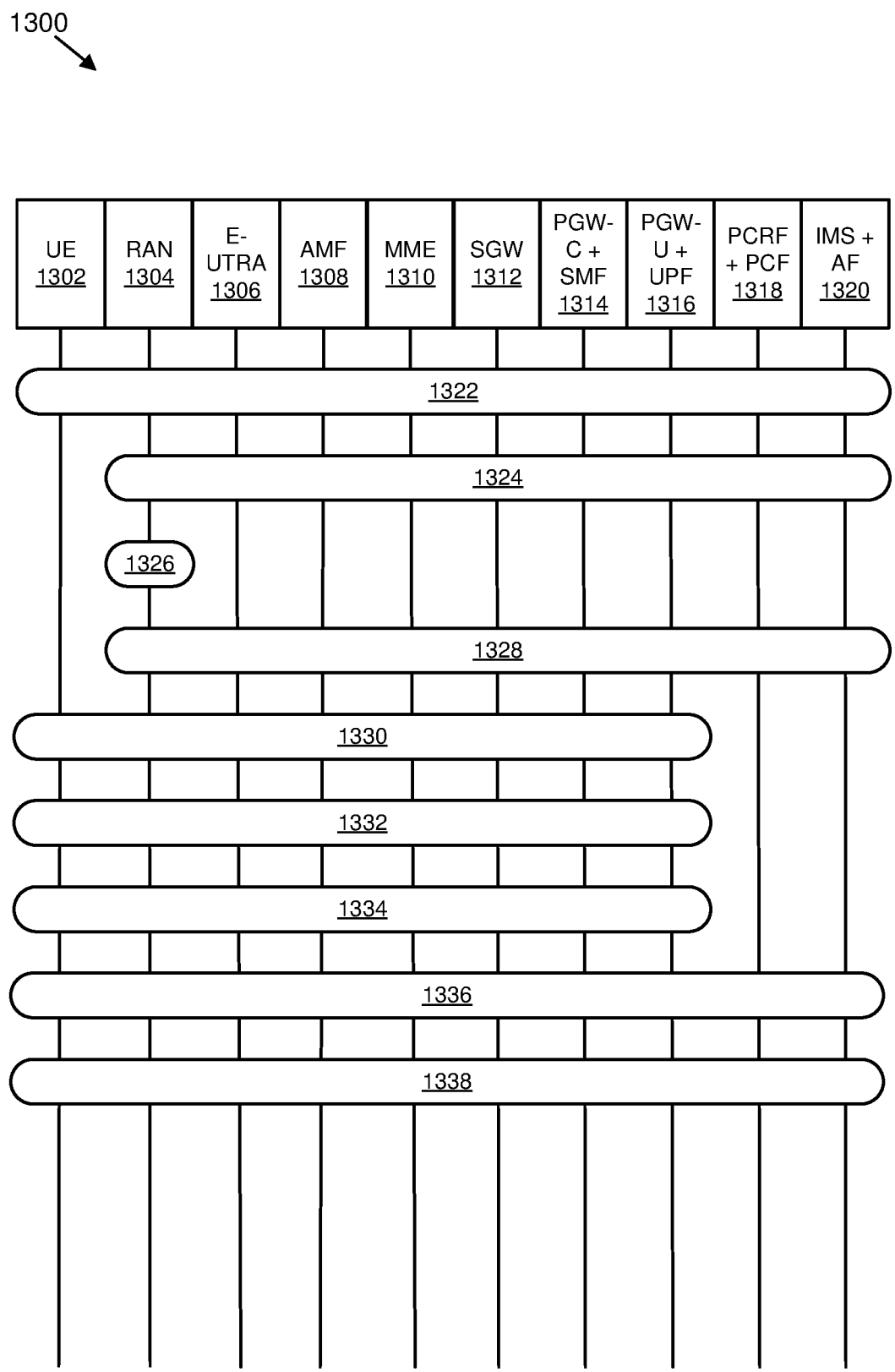
FIG. 13 is a schematic block diagram illustrating another embodiment of communications for EPS fallback for IMS voice.

FIG. 13 is a schematic block diagram illustrating another embodiment of communications 1300 for EPS fallback for IMS voice. The communications 1300 illustrated occur between a UE 1302, a RAN 1304 (e.g., NG-RAN), an E-UTRA 1306, an AMF 1308, an MME 1310, a SGW 1312, a PGW-C+SMF 1314, a PGW-U+UPF 1316, a PCRF+PCF 1318, and an IMS+AF 1320. As may be appreciated, any of the communications 1300 described herein may include one or more messages.

In one embodiment, in a first communication 1322 transmitted between the UE 1302, the RAN 1304, the E-UTRA 1306, the AMF 1308, the MME 1310, the SGW 1312, the PGW-C+SMF 1314, the PGW-U+UPF 1316, the PCRF+PCF 1318, and the IMS+AF 1320, the UE 1302 camps on the RAN 1304 in the 5GS and an IMS voice session establishment has been initiated.

In some embodiments, in a second communication 1324 transmitted between the RAN 1304, the E-UTRA 1306, the AMF 1308, the MME 1310, the SGW 1312, the PGW-C+SMF 1314, the PGW-U+UPF 1316, the PCRF+PCF 1318, and the IMS+AF 1320, a network initiated PDU Session modification to setup QoS flow for voice reaches the RAN 1304.

In certain embodiments, the RAN 1304 is configured 1326 to support EPS fallback for IMS voice and decides to trigger fallback to EPS, taking into account the UE 1302 capabilities, an indication from the AMF 1308 that "Redirection for EPS fallback for voice is possible," a network configuration (e.g., N26 availability configuration), and radio conditions. If the RAN 1304 decides not to trigger fallback to EPS, then the procedure stops at this point and the following steps are not executed. In some embodiments, the RAN 1304 may initiate measurement report solicitation from the UE 1302 including the E-UTRA 1306 as a target. In certain embodiments, if the AMF 1308 has indicated that "Redirection for EPS fallback for voice is not possible," then AN Release via inter-system redirection to EPS is not performed in step 1330.

In various embodiments, in a third communication 1328 transmitted between the RAN 1304, the E-UTRA 1306, the AMF 1308, the MME 1310, the SGW 1312, the PGW-C+SMF 1314, the PGW-U+UPF 1316, the PCRF+PCF 1318, and the IMS+AF 1320, the RAN 1304 responds indicating a rejection of the PDU Session modification to setup QoS flow for IMS voice received in step 1324 by an N2 PDU Session Response message towards the PGW-C+SMF 1314 with an indication that mobility due to fallback for IMS voice is ongoing.

In some embodiments, in a fourth communication 1330 transmitted between the UE 1302, the RAN 1304, the E-UTRA 1306, the AMF 1308, the MME 1310, the SGW 1312, the PGW-C+SMF 1314, and the PGW-U+UPF 1316, the RAN 1304 initiates either handover, or AN Release via inter-system redirection to EPS, taking into account the UE 1302 capabilities.

If the UE 1302 is connected to EPS, in certain embodiments, in a fifth communication 1332 transmitted between the UE 1302, the RAN 1304, the E-UTRA 1306, the AMF 1308, the MME 1310, the SGW 1312, the PGW-C+SMF 1314, and the PGW-U+UPF 1316, if there is a 5GS to EPS handover, and if there is inter-system redirection to EPS with N26 interface, the UE 1302 initiates a TAU procedure; or, in various embodiments, in a sixth communication 1334 transmitted between the UE 1302, the RAN 1304, the E-UTRA 1306, the AMF 1308, the MME 1310, the SGW 1312, the PGW-C+SMF 1314, and the PGW-U+UPF 1316, if there is inter-system redirection to EPS without N26 interface, and if the UE 1302 supports Request Type flag "handover" for PDN a connectivity request during the attach procedure and has received the indication that interworking without N26 is supported, then the UE 1302 initiates Attach with PDN connectivity request with request type "handover."

In some embodiments, in a seventh communication 1336 transmitted between the UE 1302, the RAN 1304, the E-UTRA 1306, the AMF 1308, the MME 1310, the SGW 1312, the PGW-C+SMF 1314, the PGW-U+UPF 1316, the PCRF+PCF 1318, and the IMS+AF 1320, after completion of the mobility procedure to EPS, the PGW-C+SMF 1314 re-initiates the setup of the dedicated bearer for IMS voice.

In some embodiments, in an eighth communication 1338 transmitted between the UE 1302, the RAN 1304, the E-UTRA 1306, the AMF 1308, the MME 1310, the SGW 1312, the PGW-C+SMF 1314, the PGW-U+UPF 1316, the PCRF+PCF 1318, and the IMS+AF 1320, the IMS voice session establishment is continued. At least for the duration of the voice call in EPS, the E-UTRAN is configured to not trigger any handover to 5GS.

Figure 14:
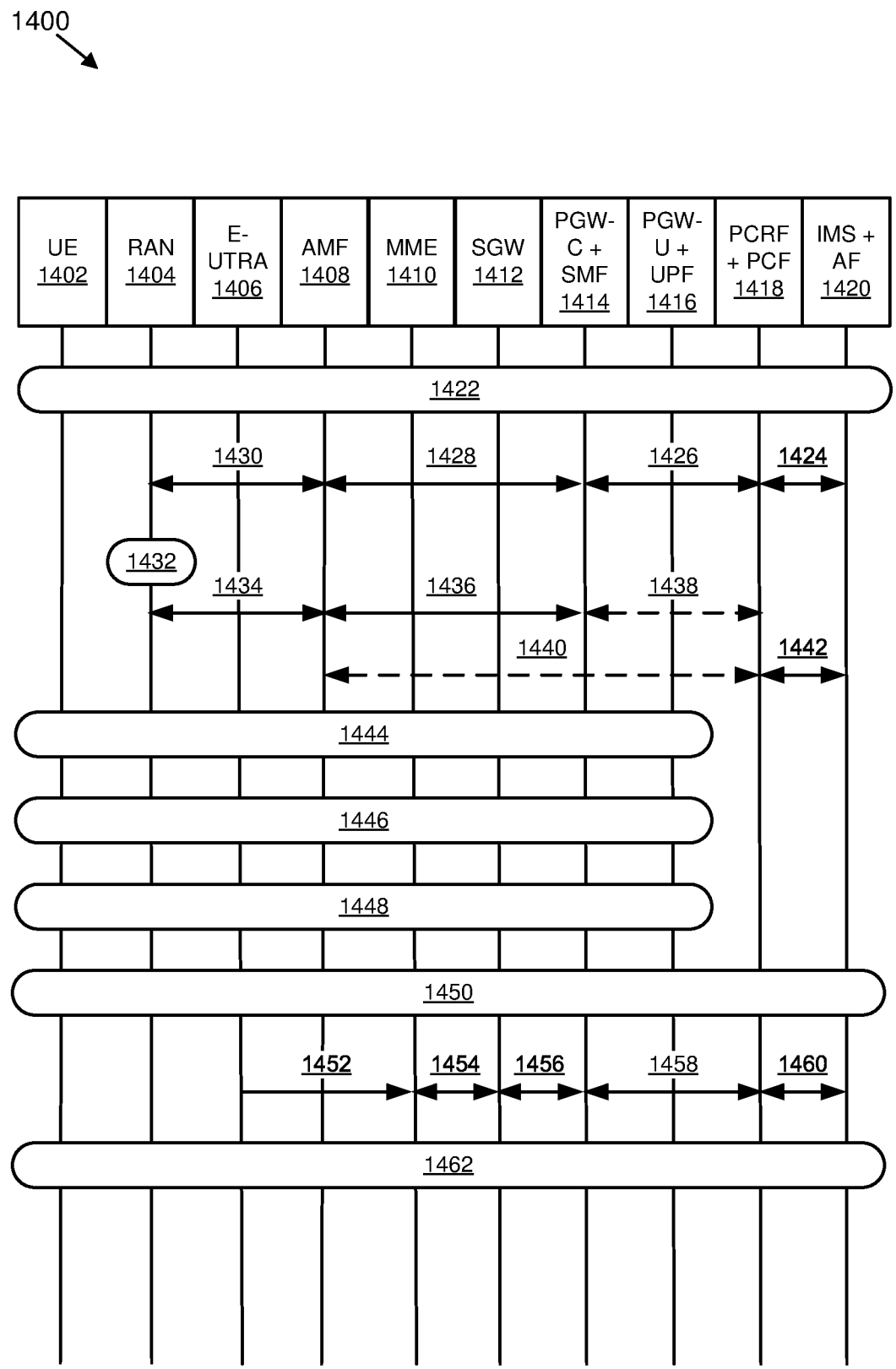
FIG. 14 is a schematic block diagram illustrating a further embodiment of communications for EPS fallback for IMS voice.

FIG. 14 is a schematic block diagram illustrating a further embodiment of communications 1400 for EPS fallback for IMS voice. The communications 1400 illustrated occur between a UE 1402, a RAN 1404 (e.g., NG-RAN), an E-UTRA 1406, an AMF 1408, an MME 1410, a SGW 1412, a PGW-C+SMF 1414, a PGW-U+UPF 1416, a PCRF+PCF 1418, and an IMS+AF 1420. As may be appreciated, any of the communications 1400 described herein may include one or more messages.

In one embodiment, in a first communication 1422 transmitted between the UE 1402, the RAN 1404, the E-UTRA 1406, the AMF 1408, the MME 1410, the SGW 1412, the PGW-C+SMF 1414, the PGW-U+UPF 1416, the PCRF+PCF 1418, and the IMS+AF 1420, the UE 1402 camps on the RAN 1404 in the 5GS and an IMS voice session establishment has been initiated.

In some embodiments, in a second communication 1424 transmitted between the PCRF+PCF 1418 and the IMS+AF 1420, the IMS+AF 1420 transmits the Npcf_PolicyAuthorization_Create request containing the IP address of the UE 1402 and the application identifier towards the PCRF+PCF 1418. The IMS+AF 1420 will receive the Npcf_PolicyAuthorization_Create reply. If the interface between the IMS+AF 1420 and PCRF+PCF 1418 is based on RX, the IMS+AF 1420 shall open an RX Diameter session with the PCRF+PCF 1418 for the AF session using an AA-Request command with the UE 1402 and session information, such as based on procedures in 3GPP TS 29.214.

In various embodiments, in a third communication 1426 transmitted between the PGW-C+SMF 1414 and the PCRF+PCF 1418, the PCRF+PCF 1418 employs a Npcf_SMPolicyControl_UpdateNotify request to provide the PGW-C+SMF 1414 (or SMF) the updated session management related policy for the PDU session. The PGW-C+SMF 1414 responds by Npcf_SMPolicyControl_UpdateNotify reply upon receipt of the request.

In certain embodiments, in a fourth communication 1428 transmitted between the AMF 1408 and the PGW-C+SMF 1414, the PGW-C+SMF 1414 invokes service operation to the AMF 1408 to transmit N2 SM information to the RAN 1404 (e.g., Namf_Communication_N1N2MessageTransfer (SM Context ID, N2 SM information (PDU Session ID, N3 tunnel information, QFI(s), QoS Profile(s), Session-AMBR)). It is assumed that the UE 1402 is in CM-CONNECTED state and the AMF 1408 has an established N2 transport association with the RAN 1404 (and therefor no Paging procedure is needed). The assumption that the UE 1402 is in CM-CONNECTED state is based on the fact that the UE 1402 and the IMS subsystem has exchanged IMS signaling messages (e.g., SIP messages) just before the establishment of the user plane connection as initiated in the steps 1424 and 1426.

In various embodiments, in a fifth communication 1430 transmitted between the RAN 1404 and the AMF 1408, the AMF 1408 sends an N2 interface message (e.g., PDU Session request) to the RAN 1404 to transmit the N2 SM information received from the PGW-C+SMF 1414 using PDU_Session_Resource_Modify Request, such as according to 3GPP TS 38.401.

In certain embodiments, the RAN 1404 is configured 1432 to support EPS fallback for IMS voice and decides to trigger fallback to EPS, taking into account the UE 1402 capabilities, an indication from the AMF 1408 that "Redirection for EPS fallback for voice is possible," a network configuration (e.g., N26 availability configuration), and radio conditions. If the RAN 1404 decides not to trigger fallback to EPS, then the procedure stops at this point and the following steps are not executed. In some embodiments, the RAN 1404 may initiate measurement report solicitation from the UE 1402 including the E-UTRA 1406 as a target. In certain embodiments, if the AMF 1408 has indicated that "Redirection for EPS fallback for voice is not possible," then AN Release via inter-system redirection to EPS is not performed in step 1444.

In some embodiments, in a sixth communication 1434 transmitted between the RAN 1404 and the AMF 1408, the RAN 1404 decides whether to reject the PDU session modification or new QoS flow establishment request from the PGW-C+SMF 1414 (e.g., the RAN 1404 may reject the N2 SM request from the PGW-C+SMF 1414 for QoS flow for voice service). The RAN 1404 may decide whether to make a rejection based on a configuration in the RAN 1404 to use E-UTRAN for voice services, and thus to use inter-RAT mobility. The RAN 1404 may send a QoS flow rejection indication to the PGW-C+SMF 1414 included in the N2 SM information container which is again included in the N2 message (e.g., N2 Session response message) transmitted to the AMF 1408. The RAN 1404 may also provide a reason for the rejected QoS flow establishment (e.g., non-supported 5QI and/or inter-system change needed). The RAN 1404 may send an indication to the AMF 1408 in the N2 Session response message or in a separate N2 message (e.g., a N2 request for AN resource release) that Inter-System Redirection is required and/or request for establishment of QoS Flow for an IMS voice failed. This has the meaning for the AMF 1408 to release the existing N1 connection with the UE 1402 to initiate re-direction to the E-UTRAN and/or EPC.

In various embodiments, in a seventh communication 1436 transmitted between the AMF 1408 and the PGW-C+SMF 1414, if received in step 1434, the AMF 1408 forwards the N2 SM information container to the PGW-C+SMF 1414. The AMF 1408 may also provide the reason for the rejection of the PGW-C+SMF 1414 (e.g., Idle state inter-RAT mobility). Such an indication may be a trigger for the PGW-C+SMF 1414 that a specific indication is needed towards the PGW-C+SMF 1414 to indicate that the UE 1402 is temporary not reachable. In addition to the exchange from the AMF 1408 to the PGW-C+SMF 1414 for the IMS session, the seventh communication 1436 is also performed with all PGW-C+SMFs allocated to the UE 1402 for each PDU Session of the UE 1402. For example, the AMF 1408 uses Nsmf_PDUSession_Update_SMContext service operation. The PGW-C+SMF 1414 sends a response towards the AMF 1408 by using Nsmf_PDUSession_Update_SMContext reply. The AMF 1408 may decide whether to perform a handover procedure or RRC release with redirection based on the availability of the N26 interface. For example, if the N26 interface is not deployed, the AMF 1408 decides to perform idle state mobility, i.e. RRC release with redirection. The AMF 1408 sends N2 UE Context Release Request and/or Command message to the RAN 1404.

In certain embodiments, in an optional eighth communication 1438 transmitted between the PGW-C+SMF 1414 and the PCRF+PCF 1418, after receiving a rejection from the RAN 1404 node for QoS flow establishment for voice service and an indication that inter-RAT mobility (e.g., EPS fallback in Idle state) is ongoing, the PGW-C+SMF 1414 initiates signaling towards the PCRF+PCF 1418 by invoking a Nsmf_EventExposure_Notify request and providing the event that generates the notification and the event information if the PCRF+PCF 1418 has subscribed by employing Nsmf_EventExposure_Subscribe for a type of event notification with the event trigger loss of access type transmission resources, for example, as noted in Table 6.1.3.5-1 of 3GPP TS 23.503. Upon receipt, the PCRF+PCF 1418 responds by sending a Nsmf_EventExposure_Notify reply. It should be noted that the PGW-C+SMF 1414 may inform the PCRF+PCF 1418 that inter-RAT mobility is ongoing in an Idle state and the UE 1402 is temporary not reachable.

In some embodiments, in an optional ninth communication 1440 transmitted between the AMF 1408 and the PCRF+PCF 1418, upon receipt of a rejection from the RAN 1404 for QoS flow establishment for voice service indicating that the inter-RAT is ongoing, the AMF 1408 initiates signaling towards the PCRF+PCF 1418 by invoking a Namf_EventExposure_Notify request and providing the event that generates the notification and the event information because the PCRF+PCF 1418 has subscribed by employing Namf_EventExposure_Subscribe for a type of event notification with the event trigger loss of access type transmission resources, for example, as noted in Table 6.1.3.5-1 of 3GPP TS 23.503. Upon receipt, the PCRF+PCF 1418 responds by sending a Namf_EventExposure_Notify reply. In various embodiments, the PCRF+PCF 1418 should not subscribe to the AMF 1408 and the PGW-C+SMF 1414 simultaneously and because the PCRF+PCF 1418 needs to subscribe to the PGW-C+SMF 1414 for the UE's 1402 E-UTRAN attachment, it is recommended to follow step 1438 if the PCRF+PCF 1418 subscribes to the PGW-C+SMF 1414 for the UE's 1402 loss of access transmission resources.

In certain embodiments, in a tenth communication 1442 transmitted between the PCRF+PCF 1418 and the IMS+AF 1420, the IMS+AF 1420 may subscribe to notification about application session context termination by employing Npcf_PolicyAuthorization_Subscribe service, such as according to 3GPP TS 29.514. The subscription may also be based on the communication system change, any system change, or any change that may occur making the UE 1402 unreachable. The PCRF+PCF 1418 sends a Notification about application session context termination by invoking a Npcf_PolicyAuthorization_Notify request to the IMS+AF 1420. Upon receipt, the IMS+AF 1420 responds by sending a Npcf_PolicyAuthorization_Notify reply. If RX, such as according to 3GPP TS 29.214, the IMS+AF 1420 may employ a Specific-Action AVP with an AAR command with value INDICATION_OF_FAILED_RESOURCES_ALLOCATION (9) to request that the PCRF+PCF 1418 provide notification if the resources associated to the corresponding service information cannot be allocated. This value in a RAR is used by the PCRF+PCF 1418 to indicate to the IMS+AF 1420 that the resources requested for a particular service information cannot be successfully allocated.

In some embodiments, in an eleventh communication 1444 transmitted between the UE 1402, the RAN 1404, the E-UTRA 1406, the AMF 1408, the MME 1410, the SGW 1412, the PGW-C+SMF 1414, and the PGW-U+UPF 1416, the RAN 1404 initiates either handover, or AN Release via inter-system redirection to EPS, taking into account the UE 1402 capabilities.

If the UE 1402 is connected to EPS, in certain embodiments, in a twelfth communication 1446 transmitted between the UE 1402, the RAN 1404, the E-UTRA 1406, the AMF 1408, the MME 1410, the SGW 1412, the PGW-C+SMF 1414, and the PGW-U+UPF 1416, if there is a 5GS to EPS handover, and if there is inter-system redirection to EPS with N26 interface, the UE 1402 initiates a TAU procedure; or, in various embodiments, in a thirteenth communication 1448 transmitted between the UE 1402, the RAN 1404, the E-UTRA 1406, the AMF 1408, the MME 1410, the SGW 1412, the PGW-C+SMF 1414, and the PGW-U+UPF 1416, if there is inter-system redirection to EPS without N26 interface, and if the UE 1402 supports Request Type flag "handover" for PDN a connectivity request during the attach procedure and has received the indication that interworking without N26 is supported, then the UE 1402 initiates Attach with PDN connectivity request with request type "handover."

In some embodiments, in a fourteenth communication 1450 transmitted between the UE 1402, the RAN 1404, the E-UTRA 1406, the AMF 1408, the MME 1410, the SGW 1412, the PGW-C+SMF 1414, the PGW-U+UPF 1416, the PCRF+PCF 1418, and the IMS+AF 1420, after completion of the mobility procedure to EPS, the PGW-C+SMF 1414 re-initiates the setup of the dedicated bearer for IMS voice.

In certain embodiments, in a fifteenth communication 1452 transmitted from the E-UTRA 1406 to the MME 1410, the E-UTRA 1406 may transmit an attach complete message to the MME 1410.

In various embodiments, in a sixteenth communication 1454 transmitted between the MME 1410 and the SGW 1412, a modify bearer request message and/or a modify bearer response message may be sent and/or received.

In some embodiments, in a seventeenth communication 1456 transmitted between the SGW 1412 and the PGW-C+SMF 1414, a modify bearer request message and/or a modify bearer response message may be sent and/or received.

In certain embodiments, in an eighteenth communication 1458 transmitted between the PGW-C+SMF 1414 and the PCRF+PCF 1418, the MME 1410 may determine the PGW-C+SMF 1414 address for the Create Session Request based on the APN received from the UE 1402 and the subscription profile received from an HSS+UDM. The PGW-C+SMF 1414 uses the PDU Session ID to correlate the transferred PDN connection with the PDU Session in 5GC. After the E-UTRAN establishment, the PGW-C+SMF 1414 initiates signaling towards the PCRF+PCF 1418 by invoking a Nsmf_EventExposure_Notify request and providing the event that generates the notification and the event information because the PCRF+PCF 1418 has subscribed by employing Nsmf_EventExposure_Subscribe for a type of event notification with the event trigger change in type of Access Type of the PDU session, for example, as noted in Table 6.1.3.5-1 of 3GPP TS 23.503. Upon receipt, the PCRF+PCF 1418 responds by sending Nsmf_EventExposure_Notify reply.

In various embodiments, in a nineteenth communication 1460 transmitted between the PCRF+PCF 1418 and the IMS+AF 1420, the IMS+AF 1420 may subscribe to the radio access type change by employing Npcf_PolicyAuthorization_Subscribe service, such as according to 3GPP TS 29.514. The PCRF+PCF 1418 notifies a PDU Session Modification by invoking a Npcf_PolicyAuthorization_Notify request to the IMS+AF 1420. Upon receipt, the IMS+AF 1420 responds by sending a Npcf_PolicyAuthorization_Notify reply. If RX, according to 3GPP TS 29.214, the IMS+AF 1420 may employ Specific-Action AVP with an AAR command with a value IP-CAN_CHANGE (6) to subscribe to IP-CAN change and RAT change notification. This value in a RAR is used by the PCF to indicate to AF that to indicate a change in the IP-CAN type or RAT type.

In some embodiments, in a twentieth communication 1462 transmitted between the UE 1402, the RAN 1404, the E-UTRA 1406, the AMF 1408, the MME 1410, the SGW 1412, the PGW-C+SMF 1414, the PGW-U+UPF 1416, the PCRF+PCF 1418, and the IMS+AF 1420, the IMS voice session establishment is continued. At least for the duration of the voice call in EPS, the E-UTRAN is configured to not trigger any handover to 5GS.

Figure 15:
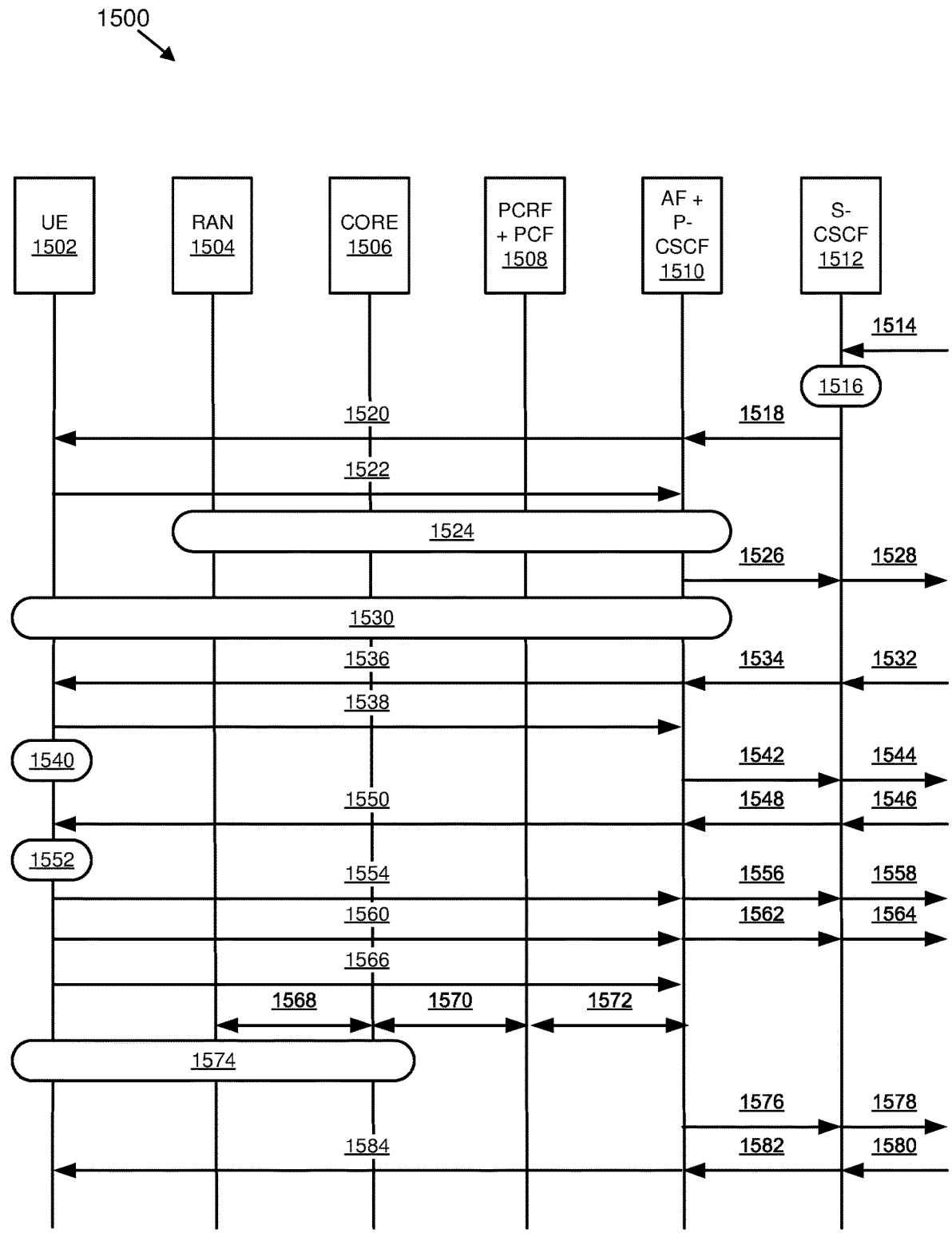
FIG. 15 is a schematic block diagram illustrating yet another embodiment of communications for EPS fallback for IMS voice.

FIG. 15 is a schematic block diagram illustrating yet another embodiment of communications 1500 for EPS fallback for IMS voice. The communications 1500 illustrated occur between a UE 1502, a RAN 1504 (e.g., NG-RAN), a CORE 1506 (e.g., core network), a PCRF+PCF 1508, an AF+P-CSCF 1510, and a S-CSCF 1512. As may be appreciated, any of the communications 1500 described herein may include one or more messages.

In one embodiment, in a first communication 1514 transmitted from an originating party to the S-CSCF 1512, the originating party sends a SIP INVITE request containing an initial SDP offer to the S-CSCF 1512.

In certain embodiments, the S-CSCF 1512 validates 1516 the service profile and invokes any termination service logic required for a user corresponding to the originating party. This includes authorization of the requested SDP based on the user's subscription for multi-media services.

In various embodiments, in a second communication 1518 transmitted from the S-CSCF 1512 to the AF+P-CSCF 1510, the S-CSCF 1512 remembers (e.g., from a registration procedure) the AF+P-CSCF 1510 (e.g., the next hop P-CSCF) for the UE 1502. The S-CSCF 1512 forwards the SIP INVITE request to the AF+P-CSCF 1510 in the visited network.

In some embodiments, in a third communication 1520 transmitted from the AF+P-CSCF 1510 to the UE 1502, if the AF+P-CSCF 1510 determines that the termination is for an MPS session, the AF+P-CSCF 1510 derives the session information and invokes dynamic policy sending the derived session information to the PCRF+PCF 1508. The AF+P-CSCF 1510 remembers (e.g., from the registration procedure) the UE 1502 address, and forwards the INVITE to the UE 1502.

In certain embodiments, in a fourth communication 1522 transmitted from the UE 1502 to the AF+P-CSCF 1510, the UE 1502 determines the subset of the media flows proposed by the originating endpoint that it supports, and responds with an Offer Response message back to the originator. The SDP may represent one or more media for a multi-media session. This response is sent to the AF+P-CSCF 1510.

In various embodiments, in a fifth communication 1524 transmitted between the RAN 1504, the CORE 1506, the PCRF+PCF 1508, and the AF+P-CSCF 1510, the AF+P-CSCF 1510 authorizes the resources necessary for this session by informing the PCRF+PCF 1508 about the UE 1502 IP address and an application identifier. The PCRF+PCF 1508 conveys the PDU session modification to the CORE 1506 which requests the RAN 1504 for the new QoS flow establishment for the PDU session modification. The RAN 1504 decides to reject the new QoS flow establishment and send the rejection indication towards the CORE 1506. The CORE 1506 sends the UE's 1502 loss of access type transmission resources towards the PCRF+PCF 1508 which informs the AF+P-CSCF 1510 about this.

In some embodiments, in a sixth communication 1526 transmitted from the AF+P-CSCF 1510 to the S-CSCF 1512 (e.g., concurrently with the fifth communication 1524), the AF+P-CSCF 1510 forwards the Offer Response message in a SIP 183 session in a progress response to the S-CSCF 1512.

In certain embodiments, in a seventh communication 1528 transmitted from the S-CSCF 1512 to the originating party, the S-CSCF 1512 forwards the Offer Response message in the SIP 183 session in progress in response to the originating party (e.g., originating UE).

In various embodiments, in an eighth communication 1530 transmitted between the UE 1502, the RAN 1504, the CORE 1506, the PCRF+PCF 1508, and the AF+P-CSCF 1510, a procedure for 5GS to EPS handover with N26 may be performed such as described in subclause 4.11.1.2.1 of 3GPP TS 23.502 and a procedure for 5GS to EPS redirection may be performed such as described in subclause 4.11.1.3.2 of 3GPP TS 23.502. Subclause 4.11.2.2 in 3GPP TS 23.502 describes inter-system redirection to EPS without an N26 interface. If the UE 1502 supports Request Type flag "handover" for PDN connectivity request during the attach procedure, such as described in clause 5.3.2.1 of 3GPP TS 23.401, and has received an indication that interworking without N26 is supported, then the UE 1502 initiates Attach with PDN connectivity request with request type "handover." Upon completion of the mobility procedure to EPS, the CORE 1506 re-initiates to establish the dedicated bearer for the IMS session and notifies the PCRF+PCF 1508 about the new access type. The PCRF+PCF 1508 informs the AF+P-CSCF 1510 about the UE's 1502 new access type of the PDU session.

In some embodiments, in a ninth communication 1532 transmitted from the originating party to the S-CSCF 1512, the originating party sends a Response Confirmation as a SIP PRACK message to the S-CSCF 1512. The Response Confirmation may also contain SDP. This may be the same SDP as in the Offer Response sent in the fourth communication 1522 or a subset. If new media are defined by this SDP, a new authorization (e.g., as described in the fifth communication 1524) may be done by the AF+P-CSCF 1510 and the PCRF+PCF 1508 following an eleventh communication 1536. The originating party (e.g., UE) is free to continue to offer new media on this operation or on subsequent exchanges using the Update method. Each offer and/or answer exchange will cause the AF+P-CSCF 1510 and PCRF+PCF 1508 to repeat Authorization again (e.g., as described in the fifth communication 1524).

In certain embodiments, in a tenth communication 1534 transmitted from the S-CSCF 1512 to the AF+P-CSCF 1510, the S-CSCF 1512 forwards the Response Confirmation as a SIP PRACK message to the AF+P-CSCF 1510.

In various embodiments, in an eleventh communication 1536 transmitted from the AF+P-CSCF 1510 to the UE 1502, by this time the AF+P-CSCF 1510 is aware of a possible UE's 1502 loss of access type transmission resource and, therefore, an ongoing inter-RAT mobility from 5GS to EPS. If the AF+P-CSCF 1510 has not received the information about the UE's 1502 new Access Type of the PDU session, it may temporary hold-on the IMS signaling until at least the default bearer is established in the target RAT and/or system and the AF+P-CSCF 1510 receives a confirmation about the UE's 1502 new Access Type. The AF+P-CSCF 1510 may also retry if it does not receive the acknowledgement for the Response Confirmation by the terminating the UE 1502, SIP 200 OK response.

In some embodiments, in a twelfth communication 1538 transmitted from the UE 1502 to the AF+P-CSCF 1510, the UE 1502 responds to the Response Confirmation with an acknowledgement as a SIP 200 OK response. If Optional SDP is contained in the Response Confirmation, the acknowledgement (e.g., the SIP 200 OK response) will also contain an SDP response. If the SDP has changed, the AF+P-CSCF 1510 authorizes that the resources are allowed to be used. By this time the UE 1502 is now on the EPS access technology, therefore, it shall insert the new access technology in the PANI header field in the SIP 200 OK response.

In certain embodiments, depending on the bearer establishment mode selected for the IP CAN session, resource reservation shall be initiated 1540 either by the UE 1502 or by the IP CAN itself. The UE 1502 initiates the reservation procedures for the resources needed for this session. Otherwise, the IP CAN initiates the reservation of required resources after the fifth communication 1524.

In various embodiments, in a thirteenth communication 1542 transmitted from the AF+P-CSCF 1510 to the S-CSCF 1512 and in a fourteenth communication 1544 transmitted from the S-CSCF 1512 to the originating party, the acknowledgement (e.g., 200 OK response) is forwarded from the AF+P-CSCF 1510 to the originating party (e.g., originating end point).

In some embodiments, in a fifteenth communication 1546 transmitted from the originating party to the S-CSCF 1512, in a sixteenth communication 1548 transmitted from the S-CSCF 1512 to the AF+P-CSCF 1510, and in a seventeenth communication 1550 transmitted from the AF+P-CSCF 1510 to the UE 1502, if the originating party has completed its resource reservation, the originating party sends the successful Resource Reservation message as a SIP UPDATE message towards the S-CSCF 1512. The S-CSCF 1512 forwards the message toward the UE 1502 along the signaling path.

In certain embodiments, the UE 1502 alerts 1552 the destination user of an incoming session setup attempt.

In various embodiments, in an eighteenth communication 1554 transmitted from the UE 1502 to the AF+P-CSCF 1510, in a nineteenth communication 1556 transmitted from the AF+P-CSCF 1510 to the S-CSCF 1512, and in a twentieth communication 1558 transmitted from the S-CSCF 1512 to the originating party, the UE 1502 responds to the successful resource reservation by a SIP 200 OK response and the message is forwarded to the originating party.

In some embodiments, in a twenty-first communication 1560 transmitted from the UE 1502 to the AF+P-CSCF 1510, in a twenty-second communication 1562 transmitted from the AF+P-CSCF 1510 to the S-CSCF 1512, and in a twenty-third communication 1564 transmitted from the S-CSCF 1512 to the originating party, the UE 1502 may alert the user and wait for an indication from the user before completing the session. If so, it indicates this to the originating party by a provisional SIP 180 ringing response indicating Ringing. This message is sent to the AF+P-CSCF 1510 and along the signaling path to the originating party.

In certain embodiments, in a twenty-fourth communication 1566 transmitted from the UE 1502 to the AF+P-CSCF 1510, the UE 1502 transmits the SIP 200 OK to the AF+P-CSCF 1510.

In various embodiments, in a twenty-fifth communication 1568 between the RAN 1504 and the CORE 1506, in a twenty-sixth communication 1570 between the CORE 1506 and the PCRF+PCF 1508, and in a twenty-seventh communication 1572 between the PCRF+PCF 1508 and the AF+P-CSCF 1510, the AF+P-CSCF 1510 indicates to the PCRF+PCF 1508 and the authorized media flows for this session is now enabled via the CORE 1506.

In some embodiments, in a twenty-eighth communication 1574 between the UE 1502, the RAN 1504, and the CORE 1506, the UE 1502 starts the media flows for this session.

In certain embodiments, in a twenty-ninth communication 1576 transmitted from the AF+P-CSCF 1510 to the S-CSCF 1512 and in a thirtieth communication 1578 transmitted from the S-CSCF 1512 to the originating party, the AF+P-CSCF 1510 forwards the 200 OK to the S-CSCF 1512 following the signaling path.

In various embodiments, in a thirty-first communication 1580 transmitted from the originating party to the S-CSCF 1512, in a thirty-second communication 1582 transmitted from the S-CSCF 1512 to the AF+P-CSCF 1510, and in a thirty-third communication 1584 transmitted from the AF+P-CSCF 1510 to the UE 1502, the originating party responds to the 200 OK by sending a SIP ACK message the S-CSCF 1512 and it is forwarded to the UE 1502 along the signaling path.

Figure 16:
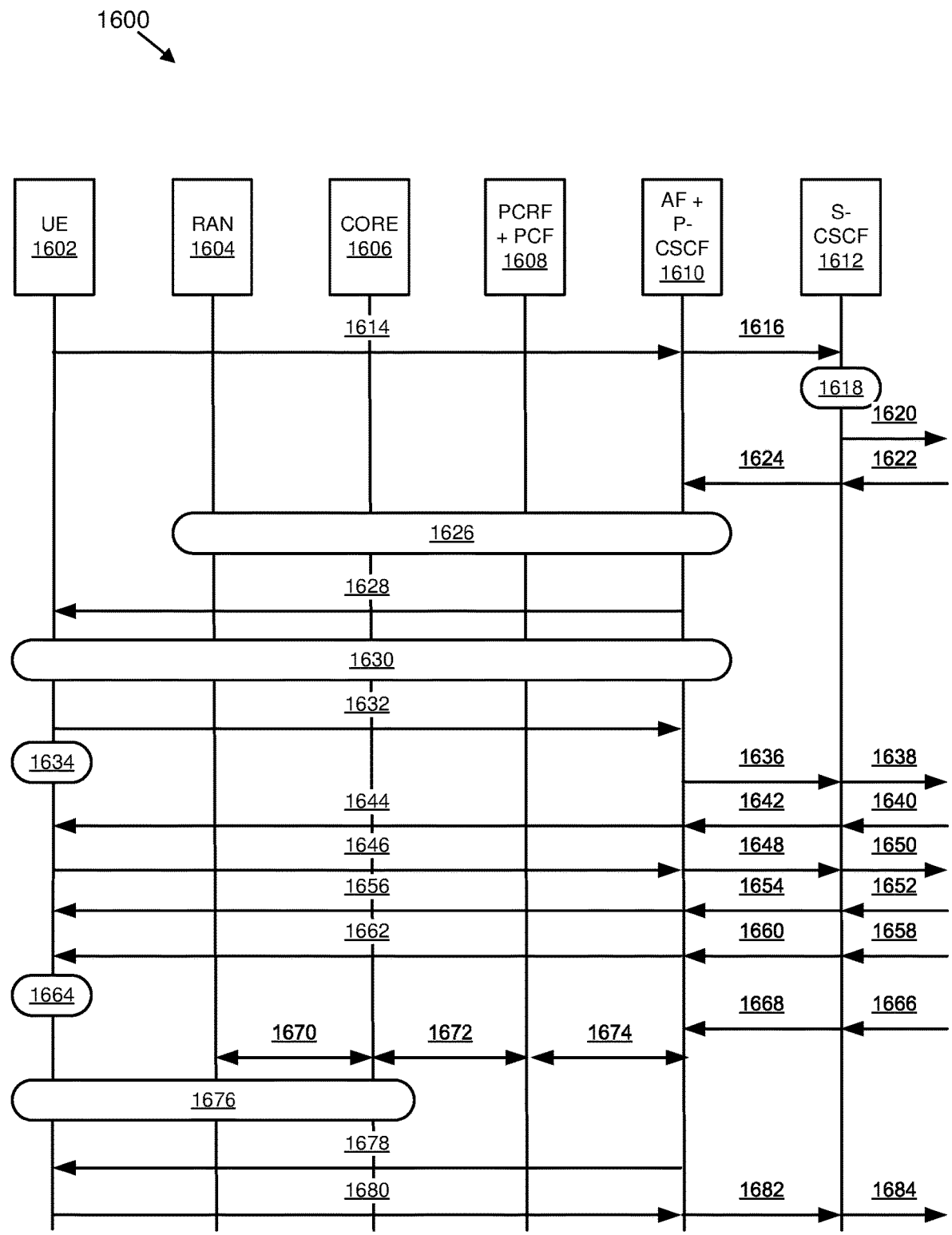
FIG. 16 is a schematic block diagram illustrating yet a further embodiment of communications for EPS fallback for IMS voice.

FIG. 16 is a schematic block diagram illustrating yet a further embodiment of communications 1600 for EPS fallback for IMS voice. The communications 1600 illustrated occur between a UE 1602, a RAN 1604 (e.g., NG-RAN), a CORE 1606 (e.g., core network), a PCRF+PCF 1608, an AF+P-CSCF 1610, and a S-CSCF 1612. As may be appreciated, any of the communications 1600 described herein may include one or more messages.

In one embodiment, in a first communication 1614 transmitted from the UE 1602 to the AF+P-CSCF 1610, the UE 1602 sends a SIP INVITE request containing an initial SDP offer towards the AF+P-CSCF 1610.

In certain embodiments, in a second communication 1616 transmitted from the AF+P-CSCF 1610 to the S-CSCF 1612, the AF+P-CSCF 1610 forwards the SIP INVITE request towards the S-CSCF 1612.

In various embodiments, the S-CSCF 1612 validates 1618 the service profile and invokes any service logic required for a corresponding user. This includes authorization of the requested SDP based on the user's subscription for multimedia services.

In some embodiments, in a third communication 1620 transmitted from the S-CSCF 1612 to a terminating UE, the S-CSCF 1612 forwards the SIP INVITE message request to the terminating UE.

In certain embodiments, in a fourth communication 1622 transmitted from the terminating UE to the S-CSCF 1612, the terminating UE determines the subset of the media flows proposed by an originating endpoint that it supports, and responds with an Offer Response message back to the originator. The SDP may represent one or more media for a multi-media session. This response is sent to the S-CSCF 1612 and is targeted for the originating UE 1602.

In various embodiments, in a fifth communication 1624 transmitted from the S-CSCF 1612 to the AF+P-CSCF 1610, the S-CSCF 1612 forwards a 183 session in progress response towards the AF+P-CSCF 1610.

In some embodiments, in a sixth communication 1626 transmitted between the RAN 1604, the CORE 1606, the PCRF+PCF 1608, and the AF+P-CSCF 1610, the AF+P-CSCF 1610 authorizes the resources necessary for this session by informing the PCRF+PCF 1608 about the UE 1602 IP address and an application identifier. The PCRF+PCF 1608 conveys the PDU session modification to the CORE 1606 which sends a request to the RAN 1604 for the new QoS flow establishment for the PDU session modification. The RAN 1604 decides to reject the new QoS flow establishment and sends the rejection indication towards the CORE 1606. The CORE 1606 sends the UE's 1602 loss of access type transmission resources towards the PCRF+PCF 1608 which informs the AF+P-CSCF 1610 about this.

In certain embodiments, in a seventh communication 1628 transmitted from the AF+P-CSCF 1610 to the UE 1602, the AF+P-CSCF 1610 forwards the 183 session in progress response towards the UE 1602.

In various embodiments, in an eighth communication 1630 transmitted between the UE 1602, the RAN 1604, the CORE 1606, the PCRF+PCF 1608, and the AF+P-CSCF 1610, a procedure for the 5GS to EPS handover with N26 may be performed such as described in subclause 4.11.1.2.1 of 3GPP TS 23.502 and a procedure for 5GS to EPS redirection may be performed such as described in subclause 4.11.1.3.2 of 3GPP TS 23.502. Subclause 4.11.2.2 in 3GPP TS 23.502 describes inter-system redirection to EPS without N26 interface. If the UE 1602 supports Request Type flag "handover" for PDN connectivity request during the attach procedure, such as described in clause 5.3.2.1 of 3GPP TS 23.401, and has received an indication that interworking without N26 is supported, then the UE 1602 initiates Attach with PDN connectivity request with request type "handover." Upon completion of the mobility procedure to EPS, the CORE 1606 re-initiates to establish the dedicated bearer for the IMS session and notifies the PCRF+PCF 1608 about the new access type. The PCRF+PCF 1608 informs the AF+P-CSCF 1610 about the UE's 1602 new access type of the PDU session.

In some embodiments, in a ninth communication 1632 transmitted from the UE 1602 to the AF+P-CSCF 1610, the UE 1602 constructs a Response Confirmation as a SIP PRACK message. The Response Confirmation may also comprise SDP. It may be the same SDP as in the Offer response received in the seventh communication 1628 or a subset. If new media are defined by this SDP, a new authorization (e.g., as in the sixth communication 1626) will be done by the AF+P-CSCF 1610 and the PCRF+PCF 1608 following the ninth communication 1632. The UE 1602 is free to continue to offer new media on this operation or on subsequent exchanges using the Update method. Each offer and/or answer exchange will cause the AF+P-CSCF 1610 and the PCRF+PCF 1608 to repeat the Authorization step (e.g., as in the sixth communication 1626) again. Because the UE 1602 is now connected to the EPS access technology, it shall insert the new access technology in the PANI header field in the SIP PRACK message.

Depending on the bearer establishment mode selected for the IP CAN session, resource reservation shall be initiated 1634 either by the UE 1602 or by the IP CAN itself. The UE 1602 initiates the reservation procedures for the resources needed for this session. Otherwise, the IP CAN initiates the reservation of required resources after the sixth communication 1626.

In certain embodiments, in a tenth communication 1636 transmitted from the AF+P-CSCF 1610 to the S-CSCF 1612, by this time the AF+P-CSCF 1610 is aware of the possible UE's 1602 loss of access type transmission resource and therefore an ongoing inter-RAT mobility from 5GS to EPS. If the AF+P-CSCF 1610 has not received the information about the UE's 1602 new Access Type of the PDU session from the PCRF+PCF 1608, it will now get the information once the AF+P-CSCF 1610 receives the SIP PRACK message with PANI header which identify EPS as the RAT type. The AF+P-CSCF 1610 forward the SIP PRACK message towards the S-CSCF 1612.

In various embodiments, in an eleventh communication 1638 transmitted from the S-CSCF 1612 to the terminating UE, the S-CSCF 1612 updates the UE's 1602 RAT type and forwards the SIP PRACK message towards the terminating UE.

In some embodiments, in a twelfth communication 1640 transmitted from the terminating UE to the S-CSCF 1612 and in a thirteenth communication 1642 transmitted from the S-CSCF 1612 to the AF+P-CSCF 1610, the terminating UE responds to the Response Confirmation with an acknowledgement as a SIP 200 OK response. If Optional SDP is contained in the Response Confirmation, the acknowledgement (e.g., SIP 200 OK response) will also contain an SDP response. If the SDP has changed, the AF+P-CSCF 1610 authorizes that the resources are allowed to be used.

In various embodiments, in a fourteenth communication 1644 transmitted from the AF+P-CSCF 1610 to the UE 1602, the acknowledgement (e.g., 200 OK response) is forwarded from the AF+P-CSCF 1610 to the UE 1602.

In certain embodiments, in a fifteenth communication 1646 transmitted from the UE 1602 to the AF+P-CSCF 1610, in a sixteenth communication 1648 transmitted from the AF+P-CSCF 1610 to the S-CSCF 1612, and in a seventeenth communication 1650 transmitted from the S-CSCF 1612 to the terminating UE, after the UE 1602 has completed its resource reservation, it sends the successful Resource Reservation message as a SIP UPDATE message towards the AF+P-CSCF 1610. The AF+P-CSCF 1610 forwards the message toward the S-CSCF 1612 and then toward the terminating UE along the signaling path.

In some embodiments, in a eighteenth communication 1652 transmitted from the terminating UE to the S-CSCF 1612, in a nineteenth communication 1654 transmitted from the S-CSCF 1612 to the AF+P-CSCF 1610, and in a twentieth communication 1656 transmitted from the AF+P-CSCF 1610 to the UE 1602, the terminating UE responds to the successful resource reservation by an SIP 200 OK response and the message is forwarded to the UE 1602.

In various embodiments, in a twenty-first communication 1658 transmitted from the terminating UE to the S-CSCF 1612, in a twenty-second communication 1660 transmitted from the S-CSCF 1612 to the AF+P-CSCF 1610, and in a twenty-third communication 1662 transmitted from the AF+P-CSCF 1610 to the UE 1602, the terminating UE may alert a user and wait for an indication from the user before completing the session. If the terminating UE alerts the user, the terminating UE may indicate this to the UE 1602 by a provisional SIP 180 ringing response indicating Ringing.

In certain embodiments, the UE 1602 informs 1664 the user about alerting the destination user for the incoming session setup attempt.

In some embodiments, in a twenty-fourth communication 1666 transmitted from the terminating UE to the S-CSCF 1612 and in a twenty-fifth communication 1668 transmitted from the S-CSCF 1612 to the AF+P-CSCF 1610, the S-CSCF 1612 receives an 200 OK response for the session establishment from the terminating UE and forwards it to the AF+P-CSCF 1610.

In various embodiments, upon receipt of the SIP 200 OK by the AF+P-CSCF 1610, in a twenty-sixth communication 1670 between the RAN 1604 and the CORE 1606, in a twenty-seventh communication 1672 between the CORE 1606 and the PCRF+PCF 1608, and in a twenty-eighth communication 1674 between the PCRF+PCF 1608 and the AF+P-CSCF 1610, the AF+P-CSCF 1610 indicates to the PCRF+PCF 1608 and the authorized media flows for this session is now enabled via the CORE 1606.

In certain embodiments, in a twenty-ninth communication 1676 between the UE 1602, the RAN 1604, and the CORE 1606, the UE 1602 starts the media flows for this session.

In some embodiments, in a thirtieth communication 1678 between the AF+P-CSCF 1610 and the UE 1602, the AF+P-CSCF 1610 forwards the 200 OK towards the UE 1602.

In various embodiments, in a thirty-first communication 1680 transmitted from the UE 1602 to the AF+P-CSCF 1610, in a thirty-second communication 1682 transmitted from the AF+P-CSCF 1610 to the S-CSCF 1612, and in a thirty-third communication 1684 transmitted from the S-CSCF 1612 to the terminating UE, the UE 1602 responds to the 200 OK by sending a SIP ACK message to the S-CSCF 1612 and it is forwarded to the terminating UE along the signaling path.

Figure 17:
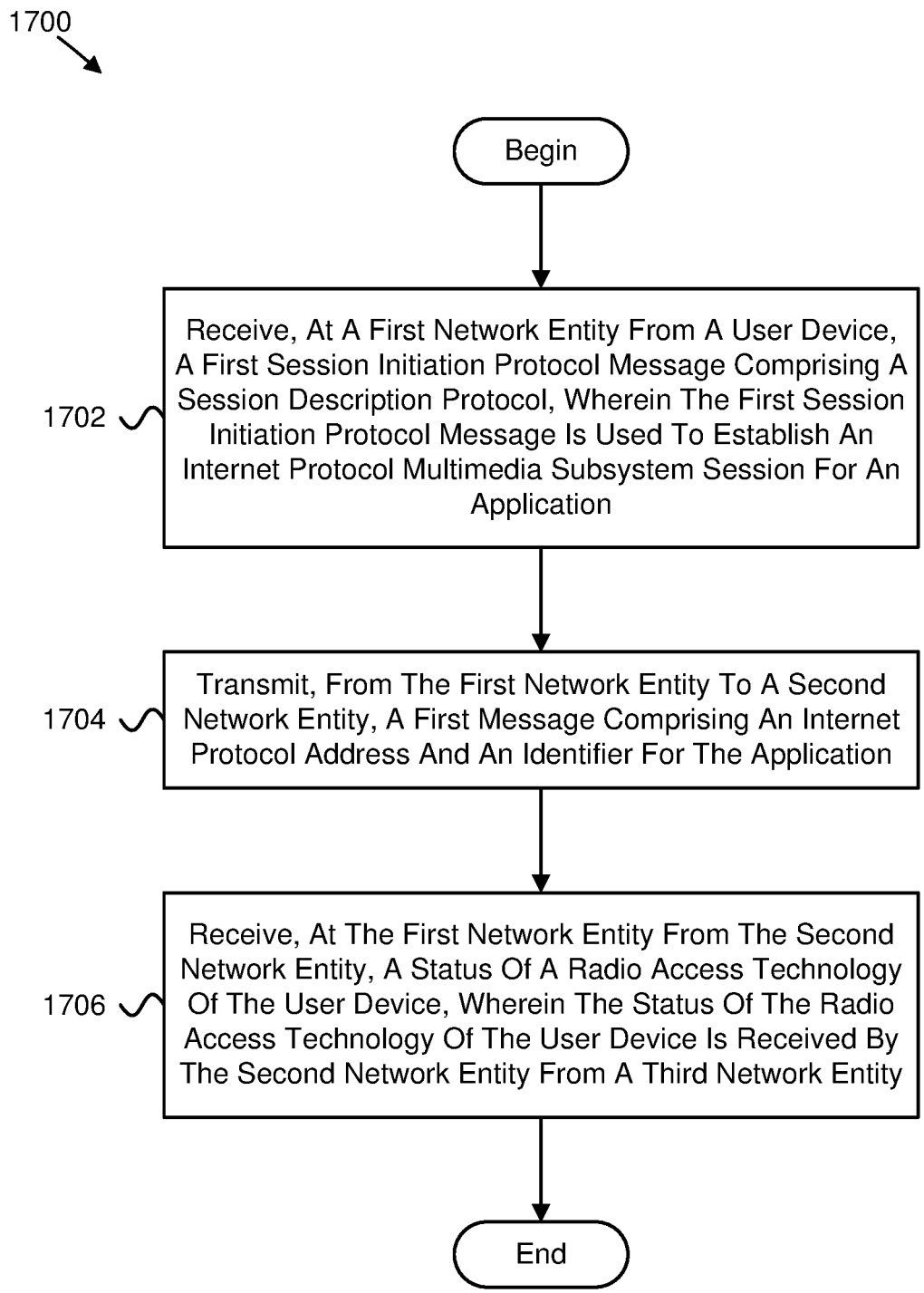
FIG. 17 is a flow chart diagram illustrating one embodiment of a method for establishing an IP multimedia subsystem session.

FIG. 17 is a flow chart diagram illustrating one embodiment of a method 1700 for establishing an IP multimedia subsystem session. In some embodiments, the method 1700 is performed by an apparatus, such as the network unit 104. In certain embodiments, the method 1700 may be performed by a processor executing program code, for example, a microcontroller, a microprocessor, a CPU, a GPU, an auxiliary processing unit, a FPGA, or the like.

The method 1700 may include receiving 1702, at a first network entity (e.g., network unit 104) from a user device (e.g., remote unit 102), a first session initiation protocol message comprising a session description protocol, wherein the first session initiation protocol message is used to establish an internet protocol multimedia subsystem session for an application. In certain embodiments, the method 1700 includes transmitting 1704, from the first network entity to a second network entity (e.g., network unit 104), a first message comprising an internet protocol address and an identifier for the application. In various embodiments, the method 1700 includes receiving 1706, at the first network entity from the second network entity, a status of a radio access technology of the user device, wherein the status of the radio access technology of the user device is received by the second network entity from a third network entity.

In certain embodiments, the status of the radio access technology of the user device is selected from a group comprising: a loss of the radio access technology; and another radio access technology corresponding to the user device transmitting the first session initiation protocol message. In some embodiments, in response to the status of the radio access technology of the user device comprising a loss of the radio access technology, the method 1700 comprises not transmitting a second session initiation protocol message.

In various embodiments, the method 1700 further comprises anticipating, by the first network entity, a new radio access technology for the user device, wherein the new radio access technology is different from the radio access technology. In one embodiment, the new radio access technology comprises evolved universal mobile telecommunications system terrestrial radio access technology. In certain embodiments, the radio access technology comprises next generation radio access technology.

In some embodiments, the first network entity comprises a proxy call session control function and an application function. In various embodiments, the second network entity comprises a policy control function. In one embodiment, the third network entity comprises a base station.

In certain embodiments, the second network entity transmits a second message to the third network entity, and the second message comprises an update to a protocol data unit session. In some embodiments, the update to the protocol data unit session is related to a policy. In various embodiments, the method 1700 further comprises storing the first session initiation protocol message at the first network entity.

Figure 18:
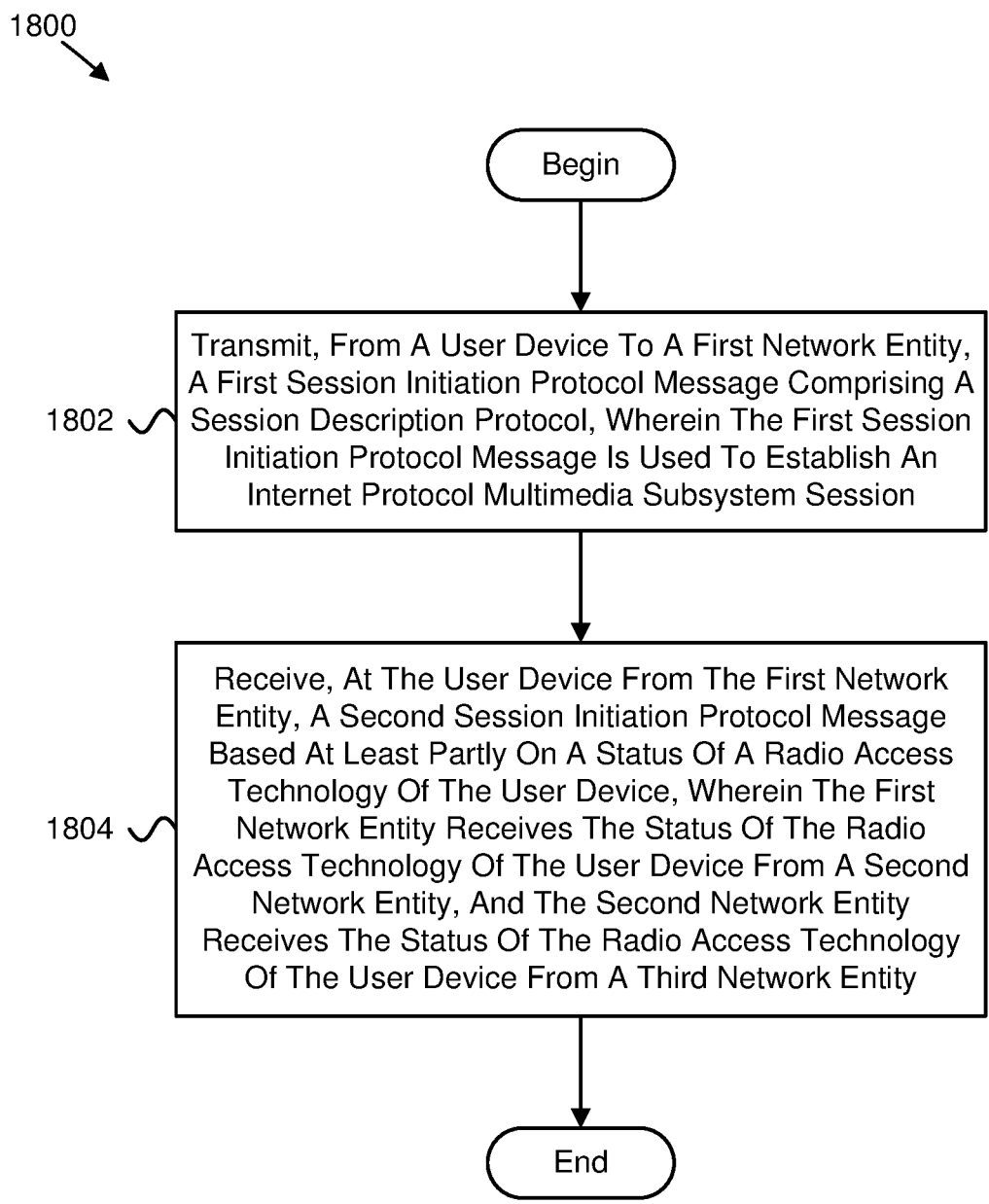
FIG. 18 is a flow chart diagram illustrating another embodiment of a method for establishing an IP multimedia subsystem session.

FIG. 18 is a flow chart diagram illustrating one embodiment of a method 1800 for establishing an IP multimedia subsystem session. In some embodiments, the method 1800 is performed by an apparatus, such as the remote unit 102. In certain embodiments, the method 1800 may be performed by a processor executing program code, for example, a microcontroller, a microprocessor, a CPU, a GPU, an auxiliary processing unit, a FPGA, or the like.

The method 1800 may include transmitting 1802, from a user device (e.g., remote unit 102) to a first network entity (e.g., network unit 104), a first session initiation protocol message comprising a session description protocol, wherein the first session initiation protocol message is used to establish an internet protocol multimedia subsystem session. In various embodiments, the method 1800 includes receiving 1804, at the user device from the first network entity, a second session initiation protocol message based at least partly on a status of a radio access technology of the user device, wherein the first network entity receives the status of the radio access technology of the user device from a second network entity, and the second network entity receives the status of the radio access technology of the user device from a third network entity (e.g., network unit 104).

In certain embodiments, the status of the radio access technology of the user device is selected from a group comprising: a loss of the radio access technology; and another radio access technology corresponding to the user device transmitting the first session initiation protocol message. In some embodiments, in response to the status of the radio access technology of the user device comprising a loss of the radio access technology, the method 1800 comprises not receiving the second session initiation protocol message. In various embodiments, the first network entity anticipates a new radio access technology for the user device, and the new radio access technology is different from the radio access technology.

In one embodiment, the new radio access technology comprises evolved universal mobile telecommunications system terrestrial radio access technology. In certain embodiments, the radio access technology comprises next generation radio access technology. In some embodiments, the first network entity comprises a proxy call session control function and an application function.

In various embodiments, the second network entity comprises a policy control function. In one embodiment, the third network entity comprises a base station. In certain embodiments, the second network entity transmits a second message to the third network entity, and the second message comprises an update to a protocol data unit session. In some embodiments, the update to the protocol data unit session is related to a policy.

In one embodiment, a method comprises: receiving, at a first network entity from a user device, a first session initiation protocol message comprising a session description protocol, wherein the first session initiation protocol message is used to establish an internet protocol multimedia subsystem session for an application; transmitting, from the first network entity to a second network entity, a first message comprising an internet protocol address and an identifier for the application; and receiving, at the first network entity from the second network entity, a status of a radio access technology of the user device, wherein the status of the radio access technology of the user device is received by the second network entity from a third network entity.

In certain embodiments, the status of the radio access technology of the user device is selected from a group comprising: a loss of the radio access technology; and another radio access technology corresponding to the user device transmitting the first session initiation protocol message.

In some embodiments, in response to the status of the radio access technology of the user device comprising a loss of the radio access technology, the method comprises not transmitting a second session initiation protocol message.

In various embodiments, the method further comprises anticipating, by the first network entity, a new radio access technology for the user device, wherein the new radio access technology is different from the radio access technology.

In one embodiment, the new radio access technology comprises evolved universal mobile telecommunications system terrestrial radio access technology.

In certain embodiments, the radio access technology comprises next generation radio access technology.

In some embodiments, the first network entity comprises a proxy call session control function and an application function.

In various embodiments, the second network entity comprises a policy control function.

In one embodiment, the third network entity comprises a base station.

In certain embodiments, the second network entity transmits a second message to the third network entity, and the second message comprises an update to a protocol data unit session.

In some embodiments, the update to the protocol data unit session is related to a policy.

In various embodiments, the method further comprises storing the first session initiation protocol message at the first network entity.

In one embodiment, an apparatus comprises a first network entity, wherein the apparatus comprises: a receiver that receives, at the first network entity from a user device, a first session initiation protocol message comprising a session description protocol, wherein the first session initiation protocol message is used to establish an internet protocol multimedia subsystem session for an application; and a transmitter that transmits, from the first network entity to a second network entity, a first message comprising an internet protocol address and an identifier for the application; wherein the receiver receives, at the first network entity from the second network entity, a status of a radio access technology of the user device, wherein the status of the radio access technology of the user device is received by the second network entity from a third network entity.

In certain embodiments, the status of the radio access technology of the user device is selected from a group comprising: a loss of the radio access technology; and another radio access technology corresponding to the user device transmitting the first session initiation protocol message.

In some embodiments, in response to the status of the radio access technology of the user device comprising a loss of the radio access technology, the transmitter does not transmit a second session initiation protocol message.

In various embodiments, the apparatus further comprises a processor that anticipates a new radio access technology for the user device, wherein the new radio access technology is different from the radio access technology.

In one embodiment, the new radio access technology comprises evolved universal mobile telecommunications system terrestrial radio access technology.

In certain embodiments, the radio access technology comprises next generation radio access technology.

In some embodiments, the first network entity comprises a proxy call session control function and an application function.

In various embodiments, the second network entity comprises a policy control function.

In one embodiment, the third network entity comprises a base station.

In certain embodiments, the second network entity transmits a second message to the third network entity, and the second message comprises an update to a protocol data unit session.

In some embodiments, the update to the protocol data unit session is related to a policy.

In various embodiments, the apparatus further comprises a memory that stores the first session initiation protocol message at the first network entity.

In one embodiment, a method comprises: transmitting, from a user device to a first network entity, a first session initiation protocol message comprising a session description protocol, wherein the first session initiation protocol message is used to establish an internet protocol multimedia subsystem session; and receiving, at the user device from the first network entity, a second session initiation protocol message based at least partly on a status of a radio access technology of the user device, wherein the first network entity receives the status of the radio access technology of the user device from a second network entity, and the second network entity receives the status of the radio access technology of the user device from a third network entity.

In certain embodiments, the status of the radio access technology of the user device is selected from a group comprising: a loss of the radio access technology; and another radio access technology corresponding to the user device transmitting the first session initiation protocol message.

In some embodiments, in response to the status of the radio access technology of the user device comprising a loss of the radio access technology, the method comprises not receiving the second session initiation protocol message.

In various embodiments, the first network entity anticipates a new radio access technology for the user device, and the new radio access technology is different from the radio access technology.

In one embodiment, the new radio access technology comprises evolved universal mobile telecommunications system terrestrial radio access technology.

In certain embodiments, the radio access technology comprises next generation radio access technology.

In some embodiments, the first network entity comprises a proxy call session control function and an application function.

In various embodiments, the second network entity comprises a policy control function.

In one embodiment, the third network entity comprises a base station.

In certain embodiments, the second network entity transmits a second message to the third network entity, and the second message comprises an update to a protocol data unit session.

In some embodiments, the update to the protocol data unit session is related to a policy.

In one embodiment, an apparatus comprises a user device, wherein the apparatus comprises: a transmitter that transmits, from a user device to a first network entity, a first session initiation protocol message comprising a session description protocol, wherein the first session initiation protocol message is used to establish an internet protocol multimedia subsystem session; and a receiver that receives, at the user device from the first network entity, a second session initiation protocol message based at least partly on a status of a radio access technology of the user device, wherein the first network entity receives the status of the radio access technology of the user device from a second network entity, and the second network entity receives the status of the radio access technology of the user device from a third network entity.

In certain embodiments, the status of the radio access technology of the user device is selected from a group comprising: a loss of the radio access technology; and another radio access technology corresponding to the user device transmitting the first session initiation protocol message.

In some embodiments, in response to the status of the radio access technology of the user device comprising a loss of the radio access technology, the receiver does not receive the second session initiation protocol message.

In various embodiments, the first network entity anticipates a new radio access technology for the user device, and the new radio access technology is different from the radio access technology.

In one embodiment, the new radio access technology comprises evolved universal mobile telecommunications system terrestrial radio access technology.

In certain embodiments, the radio access technology comprises next generation radio access technology.

In some embodiments, the first network entity comprises a proxy call session control function and an application function.

In various embodiments, the second network entity comprises a policy control function.

In one embodiment, the third network entity comprises a base station.

In certain embodiments, the second network entity transmits a second message to the third network entity, and the second message comprises an update to a protocol data unit session.

In some embodiments, the update to the protocol data unit session is related to a policy.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
receiving, at a first network entity from a user device, a first session initiation protocol message comprising a session description protocol, wherein the first session initiation protocol message is used to establish an internet protocol multimedia subsystem session for an application;
transmitting, from the first network entity to a second network entity, a first message comprising an internet protocol address and an identifier for the application;
receiving, at the first network entity from the second network entity, a status of a radio access technology of the user device; and
transmitting, from the first network entity to the user device, a second session initiation protocol provisional response acknowledgement message based at least partly on the status of the radio access technology of the user device, wherein the second session initiation protocol provisional response acknowledgement message confirms the session description protocol or provides a change to the session description protocol.

2. The method of claim 1, wherein the status of the radio access technology of the user device is selected from a group comprising:
a loss of the radio access technology; and
another radio access technology corresponding to the user device transmitting the first session initiation protocol message.

3. The method of claim 2, wherein, in response to the status of the radio access technology of the user device comprising a loss of the radio access technology, not transmitting the second session initiation protocol provisional response acknowledgement message.

4. The method of claim 1, further comprising anticipating, by the first network entity, a new radio access technology for the user device, wherein the new radio access technology is different from the radio access technology.

5. The method of claim 4, wherein the new radio access technology comprises evolved universal mobile telecommunications system terrestrial radio access technology.

6. The method of claim 5, wherein the radio access technology comprises next generation radio access technology.

7. The method of claim 1, wherein the first network entity comprises a proxy call session control function and an application function.

8. The method of claim 1, wherein the second network entity comprises a policy control function.

9. The method of claim 1, wherein the second network entity transmits a second message to a third network entity, and the second message comprises an update to a protocol data unit session.

10. The method of claim 9, wherein the third network entity comprises a base station.

11. The method of claim 9, wherein the update to the protocol data unit session is related to a policy.

12. An apparatus comprising a first network entity, the apparatus comprising:
a receiver that receives, at the first network entity from a user device, a first session initiation protocol message comprising a session description protocol, wherein the first session initiation protocol message is used to establish an internet protocol multimedia subsystem session for an application; and a transmitter that transmits, from the first network entity to a second network entity, a first message comprising an internet protocol address and an identifier for the application;

wherein:

the receiver receives, at the first network entity from the second network entity, a status of a radio access technology of the user device; and the transmitter transmits, from the first network entity to the user device, a second session initiation protocol provisional response acknowledgement message based at least partly on the status of the radio access technology of the user device, wherein the second session initiation protocol provisional response acknowledgement message confirms the session description protocol or provides a change to the session description protocol.

13. The apparatus of claim 12, further comprising a memory, wherein, in response to the status of the radio access technology indicating a loss of the radio access technology, the memory stores a received session initiation protocol message at the first network entity until the radio access technology is reconnected.

14. A method comprising:

transmitting, from a user device to a first network entity, a first session initiation protocol message comprising a session description protocol, wherein the first session initiation protocol message is used to establish an internet protocol multimedia subsystem session; and receiving, at the user device from the first network entity, a second session initiation protocol provisional response acknowledgement message based at least partly on a status of a radio access technology of the user device, wherein the second session initiation protocol provisional response acknowledgement message confirms the session description protocol or provides a change to the session description protocol.

15. The method of claim 14, wherein the status of the radio access technology of the user device is selected from a group comprising:

a loss of the radio access technology; and another radio access technology corresponding to the user device transmitting the first session initiation protocol message.

16. The method of claim 15, wherein, in response to the status of the radio access technology of the user device comprising a loss of the radio access technology, not receiving the second session initiation protocol provisional response acknowledgement message.

17. The method of claim 14, wherein the first network entity anticipates a new radio access technology for the user device, and the new radio access technology is different from the radio access technology.

18. The method of claim 17, wherein the new radio access technology comprises evolved universal mobile telecommunications system terrestrial radio access technology.

19. An apparatus comprising a user device, the apparatus comprising:

a transmitter that transmits, from a user device to a first network entity, a first session initiation protocol message comprising a session description protocol, wherein the first session initiation protocol message is used to establish an internet protocol multimedia subsystem session; and a receiver that receives, at the user device from the first network entity, a second session initiation protocol provisional response acknowledgement message based at least partly on a status of a radio access technology of the user device, wherein the second session initiation protocol provisional response acknowledgement message confirms the session description protocol or provides a change to the session description protocol.

20. The apparatus of claim 19, wherein the status of the radio access technology of the user device is selected from a group comprising:

a loss of the radio access technology; and another radio access technology corresponding to the user device transmitting the first session initiation protocol message.

* * * * *